US 12,447,078 B2

(12) United States Patent
Sommer et al.

(10) Patent No.: US 12,447,078 B2
(45) Date of Patent: Oct. 21, 2025

(54) PATIENT SUPPORT SYSTEM INCLUDING EXPANDABLE PATIENT SUPPORT AND CONTROL ASSEMBLY WITH DISPLAY HAVING ANIMATIONS FOR INSTRUCTING A USER

(71) Applicant: Stryker Corporation, Kalamazoo, MI (US)

(72) Inventors: Bradley Sommer, Lagrange, OH (US); Seyed Behrad Ghodsi, Paw Paw, MI (US); Andrew John Engelkemier, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 280 days.

(21) Appl. No.: 18/009,110

(22) PCT Filed: Sep. 29, 2021

(86) PCT No.: PCT/US2021/052572
§ 371 (c)(1),
(2) Date: Dec. 8, 2022

(87) PCT Pub. No.: WO2022/072440
PCT Pub. Date: Apr. 7, 2022

(65) Prior Publication Data
US 2023/0248597 A1    Aug. 10, 2023

Related U.S. Application Data

(60) Provisional application No. 63/084,806, filed on Sep. 29, 2020.

(51) Int. Cl.
*A61G 7/018* (2006.01)
*A61G 7/057* (2006.01)

(52) U.S. Cl.
CPC ......... *A61G 7/018* (2013.01); *A61G 7/05769* (2013.01); *A61G 2203/20* (2013.01)

(58) Field of Classification Search
CPC ............... A61G 7/018; A61G 7/05769; A61G 2203/20; A61G 7/002; A61G 2203/16;
(Continued)

(56) References Cited

U.S. PATENT DOCUMENTS 6,671,911 B1  1/2004  Hill et al.
7,028,358 B2  4/2006  Liu
(Continued)

OTHER PUBLICATIONS

Arjohuntleigh Getinge Group, "MaxxAir ETS Maintenance Manual", 310815-AH Rev A, Jan. 2016, 56 pages.
(Continued)

*Primary Examiner* — David R Hare
*Assistant Examiner* — George Samuel Gines
(74) *Attorney, Agent, or Firm* — Howard & Howard Attorneys PLLC

(57) ABSTRACT

A patient support system is provided for use on a litter of a patient support apparatus. The patient support system includes an expandable patient support and a control assembly connectable to the expandable patient support. The control assembly includes a user interface with a display and a controller configured to display a predetermined sequence of graphical animations on the display to graphically instruct a user to perform a plurality of tasks after the user selects a new width for the expandable patient support on the user interface.

13 Claims, 74 Drawing Sheets

(58) Field of Classification Search
CPC .............. A61G 13/129; A61G 2203/30; A61G 2203/42; A61G 7/005; A61G 7/015; A61G 7/0509; A61G 7/0514; A61G 7/0524; A47C 19/04; A47C 20/08; A61B 5/1115; A61B 5/4809; A61B 5/6891; G05B 19/042; G05B 19/0426; G05B 2219/2608
USPC .......................................................... 5/613
See application file for complete search history.

(56) References Cited

U.S. PATENT DOCUMENTS

| | | | |
|---|---|---|---|
| 7,198,076 | B2 | 4/2007 | Wu |
| 7,225,488 | B2 | 6/2007 | Wu |
| 7,363,663 | B2 | 4/2008 | Chambers et al. |
| 7,571,500 | B2 | 8/2009 | Wu |
| 8,122,546 | B2 | 2/2012 | Chambers et al. |
| 8,650,686 | B2 | 2/2014 | Biggie et al. |
| 8,745,784 | B2 | 6/2014 | Cole et al. |
| 8,832,886 | B2 | 9/2014 | Riley et al. |
| 10,188,569 | B2 | 1/2019 | Elku et al. |
| 10,426,680 | B2 | 10/2019 | Williams et al. |
| 10,507,147 | B2 | 12/2019 | Bobey et al. |
| 2006/0204361 | A1 | 9/2006 | Xie |
| 2007/0136949 | A1* | 6/2007 | Richards ............ A61G 7/0507 5/624 |
| 2007/0163045 | A1* | 7/2007 | Becker ................ A61G 7/015 5/616 |
| 2008/0282472 | A1* | 11/2008 | Hornbach ............. A61G 7/05 5/616 |
| 2014/0026325 | A1 | 1/2014 | Guthrie |
| 2018/0214326 | A1* | 8/2018 | Lacasse ................ A61G 7/018 |
| 2018/0374577 | A1* | 12/2018 | Bhimavarapu ........ G16H 40/67 |
| 2020/0100963 | A1* | 4/2020 | O'Leary .............. A61G 13/129 |
| 2020/0400149 | A1 | 12/2020 | Huang et al. |
| 2021/0045950 | A1 | 2/2021 | Connell et al. |
| 2022/0346671 | A1 | 11/2022 | Herbst et al. |

OTHER PUBLICATIONS

Arjohuntleigh Getinge Group, "MaxxAir ETS Mattress Replacement System User Guide", 310115-AH Rev B, Aug. 2014, 24 pages.
Arjohuntleigh Getinge Group, "MaxxAir ETS Quick Reference Guide", 08.MX_00EN-01, Jun. 2020, 2 pages.
Blake Medical Distribution, "Power Pro Elite User Manual", 2020, 5 pages.
Hill-Rom, "Compella Bariatric Bed System User Manual", 178951 REV 1, Product No. P7800A, 2020, 128 pages.
International Search Report for Application No. PCT/US2021/052572 dated Jan. 21, 2022, 2 pages.
Stryker, "Arise 1000EX Low Air Loss Therapy Mattress Operations/Maintenance Manual", 2236-009-001 Rev B, May 2009, 30 pages.
Stryker, "Introducing IsoTour Gel Support Surface Brochure", Mkt Lit-1692 Rev A, Nov. 2018, 6 pages.
Stryker, "IsoAir 2940 Operation/Maintenance Manual", AO-SM-70-INT Rev. 5.00, Feb. 2017, 54 pages.
Stryker, "IsoAir 2940 Service Manual", AO-SM-70-SR Rev 1.0, Nov. 2016, 144 pages.
Stryker, "MV3 Bariatric Bed Operations Manual", Ref 5900, 5900-009-001 Rev E.0, May 2020, 54 pages.

* cited by examiner

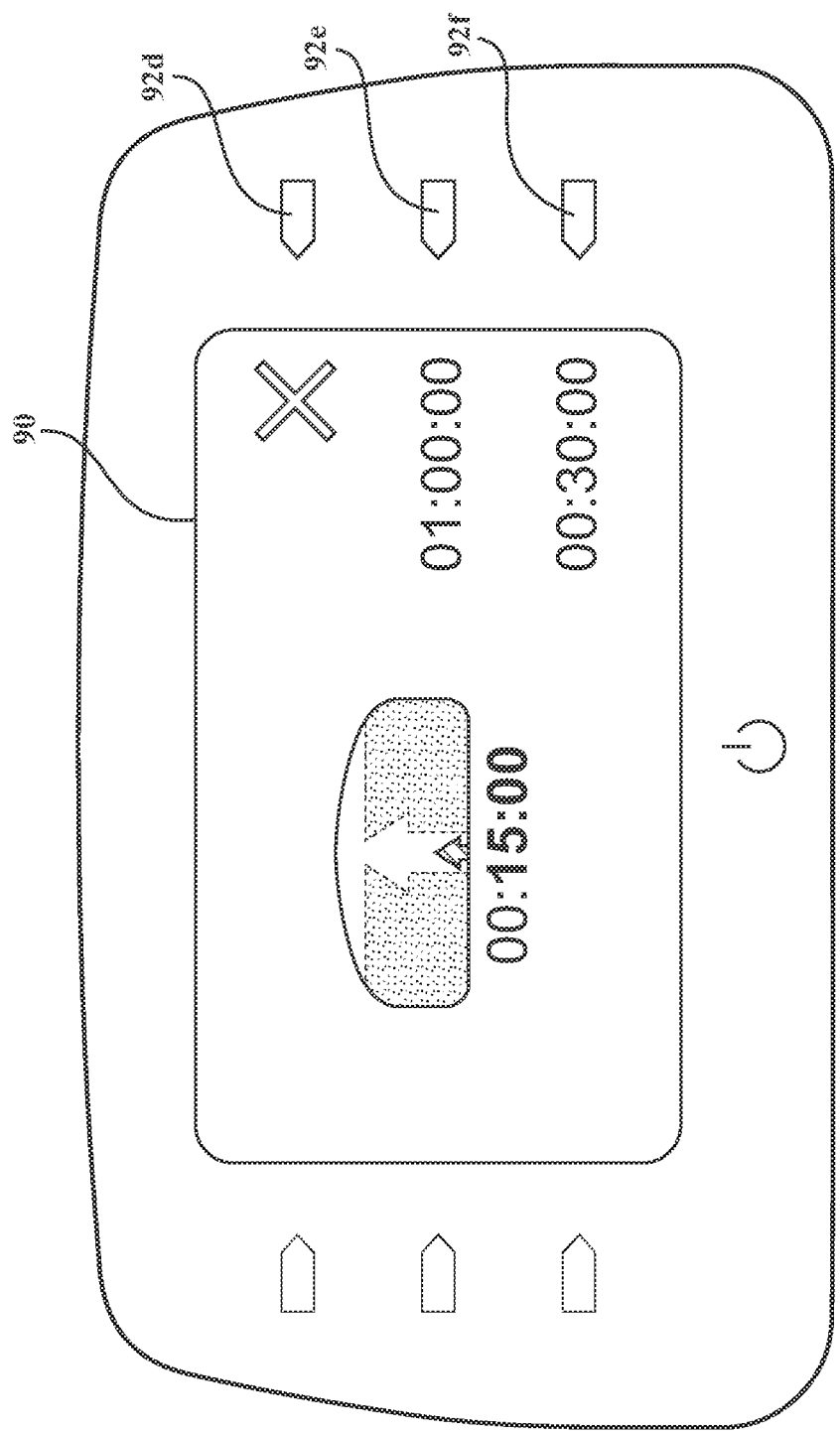

PATIENT SUPPORT SYSTEM INCLUDING EXPANDABLE PATIENT SUPPORT AND CONTROL ASSEMBLY WITH DISPLAY HAVING ANIMATIONS FOR INSTRUCTING A USER

CROSS-REFERENCE TO RELATED APPLICATION

The subject patent application claims priority to and all the benefits of U.S. Provisional Patent Application No. 63/084,806, filed on Sep. 29, 2020, the entire contents and disclosure of which is hereby incorporated by reference in its entirety.

BACKGROUND

A patient support system including an expandable patient support (e.g., an expandable mattress) is often used in conjunction with a patient support apparatus (e.g., a hospital bed) to accommodate patients of different sizes. The expandable patient support, and the patient support apparatus on which it is arranged, can typically be configured to expand/collapse to a plurality of different widths. A plurality of tasks must usually be performed before the expandable patient support can be expanded/collapsed. There is a need for systems and methods that address such tasks.

SUMMARY

The present disclosure provides a patient support system for use on a litter of a patient support apparatus, the patient support system may include: an expandable patient support including: a main patient support section having opposing sides and a main patient support surface; and an auxiliary patient support section having an auxiliary patient support surface, the auxiliary patient support section being expandable away from one of the opposing sides of the main patient support section to expand an overall width of the expandable patient support from a first width to a second width; and a control assembly connectable to the expandable patient support, the control assembly including: an expander operatively coupled to the auxiliary patient support section to expand the auxiliary patient support section; a user interface having a display; and a controller to be coupled to the expander and the user interface, where the controller is configured to display a predetermined sequence of graphical animations on the display to graphically instruct a user to perform a plurality of tasks after the user selects the second width on the user interface and before the controller operates the expander to expand the overall width of the expandable patient support from the first width to the second width, where the controller is configured to instruct the user to perform the plurality of tasks by displaying each of the graphical animations of the predetermined sequence at least once before the controller operates the expander to expand the overall width of the expandable patient support.

The present disclosure also provides a method for reconfiguring a patient support system for use on a litter of a patient support apparatus, the patient support system including an expandable patient support having a main patient support section with a main patient support surface and an auxiliary patient support section with an auxiliary patient support surface, and a control assembly including an expander to expand the auxiliary patient support section, and a user interface having a display, the method may include the steps of: receiving a user selection to expand an overall width of the expandable patient support from a first width to a second width; displaying a predetermined sequence of graphical animations on the display to graphically instruct a user to perform a plurality of tasks after the user selects the second width on the user interface; and expanding the overall width of the expandable patient support from the first width to the second width after displaying the predetermined sequence of graphical animations, where the user is instructed to perform the plurality of tasks by displaying each of the graphical animations of the predetermined sequence at least once before expanding the overall width of the expandable patient support to the second width.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
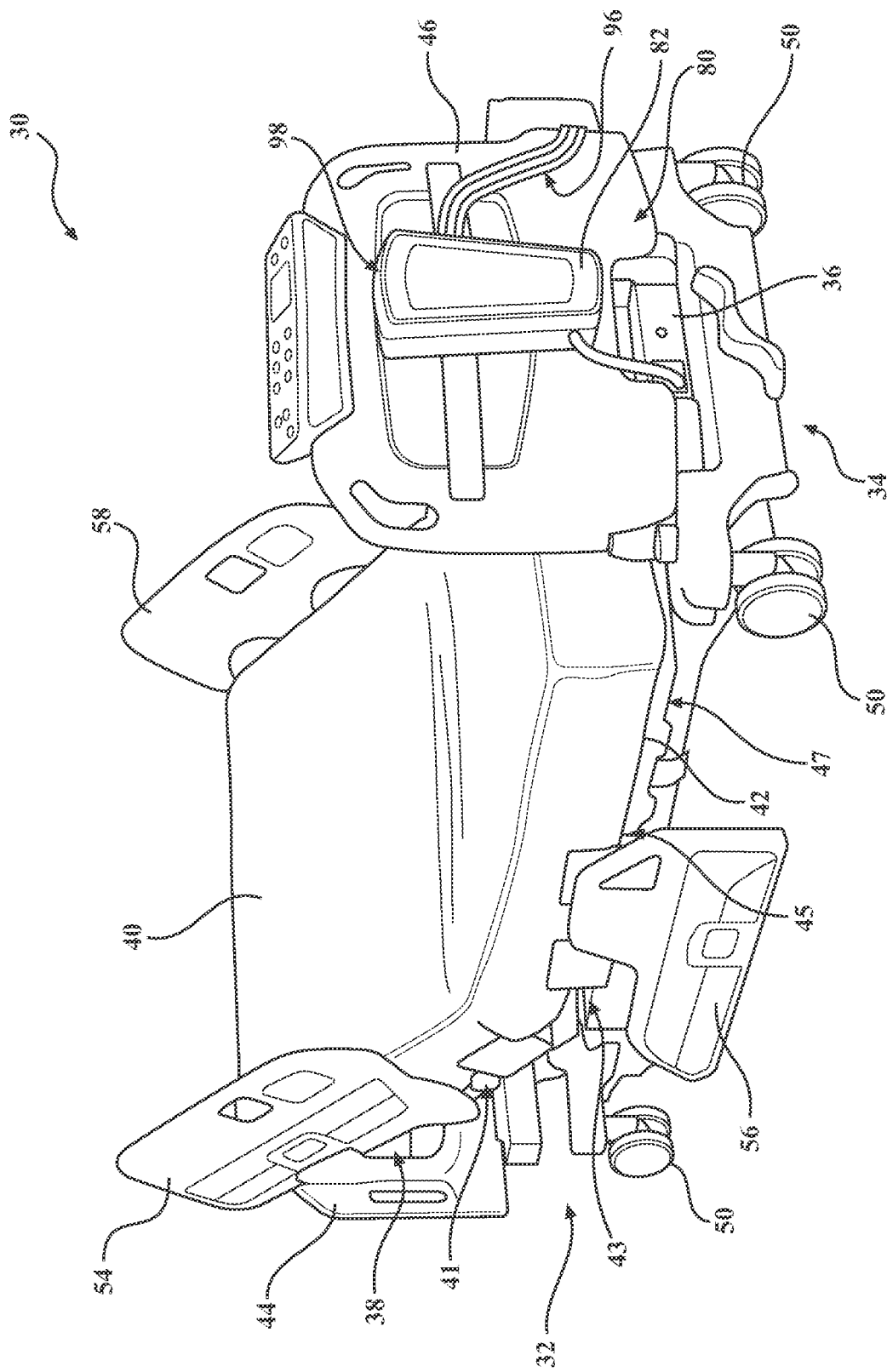
FIG. 1 is a perspective view of a patient support apparatus and a patient support system, the patient support system including an expandable patient support and a control assembly.

Referring to FIG. 1, a patient support apparatus 30 is shown for supporting a patient in a health care setting. The patient support apparatus 30 illustrated in FIG. 1 is a hospital bed. In some embodiments, however, the patient support apparatus 30 may be a stretcher, cot, table, wheelchair, or similar apparatus utilized in the care of a patient.

A support structure 32 provides support for the patient. The support structure 32 illustrated in FIG. 1 includes a base 34 and a support frame 36. The support structure 32 also includes a patient support deck 38 disposed on the support frame 36. The patient support deck 38 includes several deck sections, some of which articulate (e.g., pivot) relative to the support frame 36, such as a back section 41 (also referred to as a fowler section), a seat section 43, a thigh section 45, and a foot section 47. More or fewer deck sections may be present in some embodiments. The patient support deck 38 provides a patient support surface 42 upon which the patient is supported. Collectively, the support frame 36 and the patient support deck 38 form a litter of the patient support apparatus 30.

An expandable patient support 40 (e.g., an expandable mattress) is disposed on the patient support deck 38. The expandable patient support 40 provides a secondary patient support surface upon which the patient is supported. The expandable patient support 40 is expandable/collapsible to a plurality of different widths to accommodate patients of different sizes, as will be described further below. In the version shown, the expandable patient support 40 is capable of being configured in widths of 36 inches, 42 inches, and 48 inches. More, fewer, or different widths are also contemplated. The base 34, support frame 36, patient support deck 38, and patient support surfaces 42 each have a head end and a foot end corresponding to designated placement of the patient's head and feet on the patient support apparatus 30. The construction of the support structure 32 may take on any known or conventional design and is not limited to that specifically set forth above.

A headboard 44 and a footboard 46 are coupled to the support frame 36. In some embodiments, when the headboard 44 and footboard 46 are included, the headboard 44 and footboard 46 may be coupled to other locations on the patient support apparatus 30, such as the base 34. In still further embodiments, the patient support apparatus 30 does not include the headboard 44 and/or the footboard 46.

Wheels 50 are coupled to the base 34 to facilitate transport over the floor surfaces. The wheels 50 are arranged in each of four quadrants of the base 34 adjacent to corners of the base 34. In the embodiment shown, the wheels 50 are caster wheels able to rotate and swivel relative to the support structure 32 during transport.

Side rails 54, 56, 58, 60 are coupled to the support structure 32, such as by being coupled directly to the support frame 36 and/or the patient support deck 38. The side rails 54, 56, 58, 60 are thus indirectly supported by the base 34. A first side rail 54 is positioned at a right head end of the patient support apparatus 30. The first side rail 54 is coupled to the back section 41 of the patient support deck 38. A second side rail 56 is positioned at a right foot end of patient support apparatus 30. The second side rail 56 is coupled to the support frame 36. A third side rail 58 is positioned at a left head end of the patient support apparatus 30. The third side rail 58 is coupled to the back section 41 of the patient support deck 38. A fourth side rail 60 is positioned at a left foot end of the patient support apparatus 30. The fourth side rail 60 is coupled to the support frame 36.

It should be appreciated that the side rails 54, 56, 58, 60 may be mounted to other parts of the patient support apparatus 30. In some cases, all of the side rails 54, 56, 58, 60 are mounted to the support frame 36. In other cases, all of the side rails 54, 56, 58, 60 are mounted to the patient support deck 38. If the patient support apparatus 30 is a stretcher or a cot, there may be fewer side rails.

Figure 2:
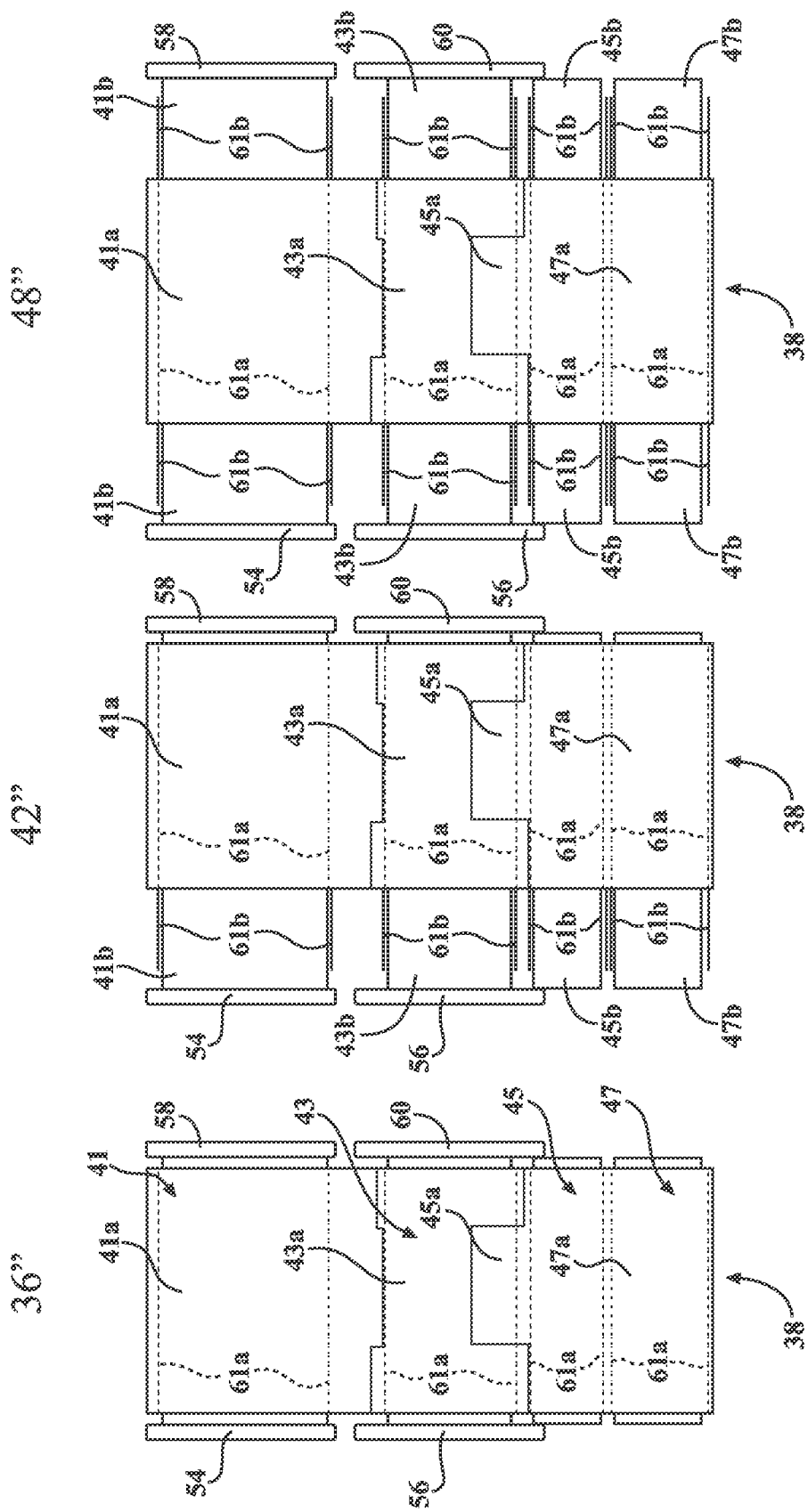
FIGS. 2A-2C are top, schematic views illustrating expansion of deck sections and side rails of the patient support apparatus to different widths.

Referring to FIGS. 2A-2C, the patient support deck 38 is shown in more detail. The patient support deck 38 is expandable/collapsible to a plurality of different widths. In the version shown, the patient support deck 38 is capable of being configured in widths of 36 inches, 42 inches, and 48 inches. More, fewer, or different widths are also contemplated. In order to reconfigure the patient support deck 38 to a different width, each of the deck sections 41, 43, 45, 47 are expanded/collapsed as needed. These may be expanded/collapsed collectively, or some of the deck sections 41, 43, 45, 47 may be separately and independently expanded/collapsed. In the version shown, the back section 41, seat section 43, thigh section 45, and foot section 47, are independently and separately expandable/collapsible. In some versions, the thigh/foot sections 45, 47 expand/collapse together. Prior to expanding the expandable patient support 40, all the deck sections 41, 43, 45, 47 are expanded to accommodate the new width of the expandable patient support 40. Such expansion is shown in the transition from FIG. 2A to FIG. 2C. First slides 61a may be fixed to a center portion 41a, 43a, 45a, 47a of each deck section 41, 43, 45, 47 and second, complementary slides 61b (e.g., such as complementary drawer slides) may be fixed to expandable/collapsible wing portions 41b, 43b, 45b, 47b of each deck section 41, 43, 45, 47 so that the wing portions 41b, 43b, 45b, 47b are able to slide relative to their associated center portion 41a, 43a, 45a, 47a (e.g., similar to a drawer on a desk, cabinet, etc.) during expansion/collapse of the deck sections 41, 43, 45, 47. Other sliding mechanisms are also contemplated. Pivoting mechanisms may also be used to pivot the wing sections when expanding/collapsing the deck sections. Mechanisms for enabling a user to expand/collapse the patient support deck 38 are shown, for example, in U.S. Pat. No. 10,188,569, entitled "Patient Support Usable With Bariatric Patients," filed on Dec. 29, 2016, and in U.S. patent application Ser. No. 16/916,660, entitled "Patient Support With Deck Width Monitoring And Control," filed on Jun. 30, 2020, both of which are hereby incorporated herein by reference in their entirety.

Figure 3:
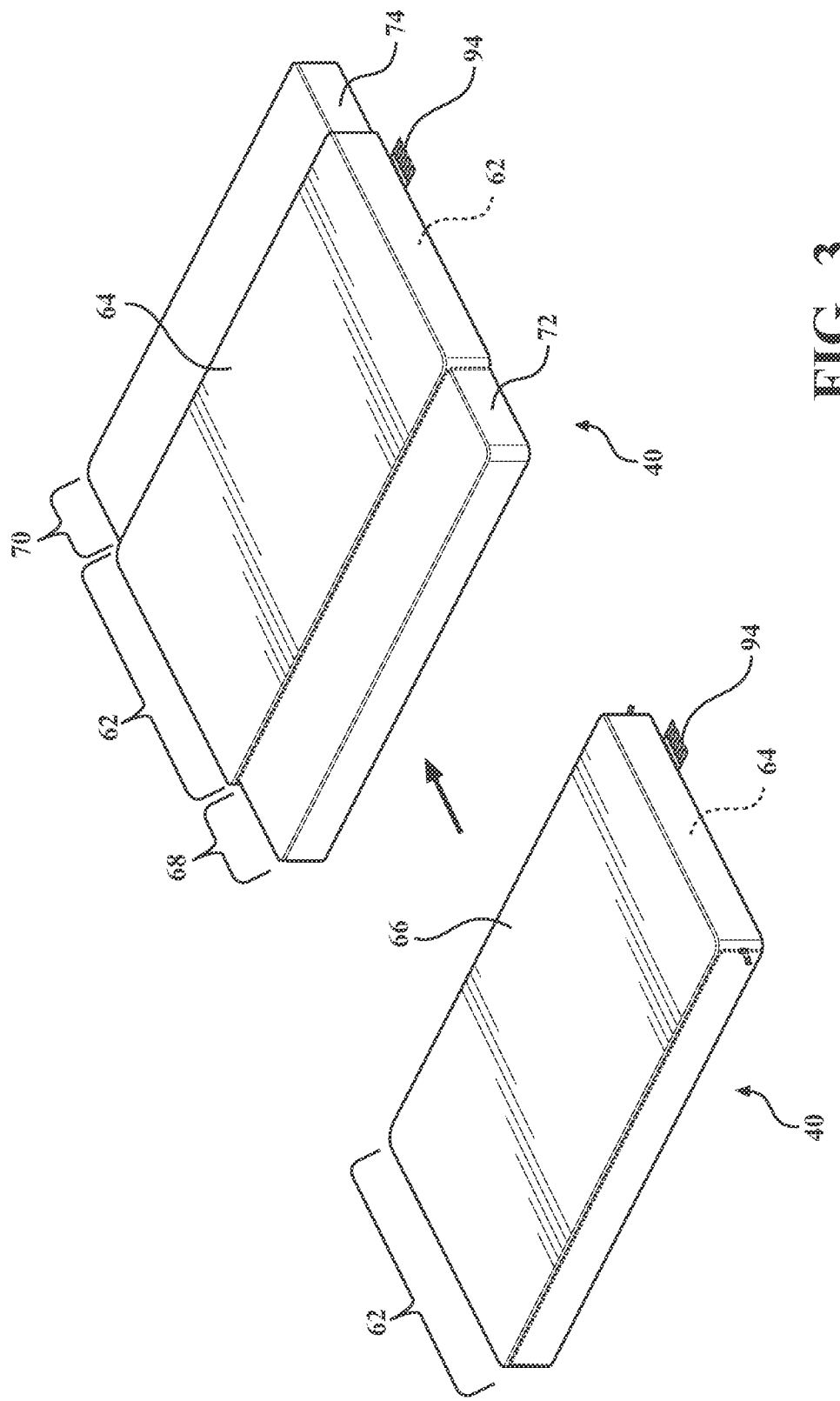
FIG. 3 shows perspective views of the expandable patient support in collapsed and expanded configurations.

The expandable patient support 40 is supported on the patient support deck 38 of the patient support apparatus 30. In some versions, as shown in FIG. 3, the expandable patient support 40 is an expandable mattress for supporting the patient when positioned on the patient support apparatus 30. The expandable patient support 40 may include a main patient support section 62 having a main patient support surface. The main patient support section 62 includes a crib assembly 64 and a cover assembly 66 disposed over the crib assembly 64. In other words, the crib assembly 64 is disposed partially or entirely within the cover assembly 66. The crib assembly may be formed of one or more layers/pieces of foam, one or more inflatable bladders, combinations thereof, and the like that are concealed and contained within the cover assembly 66. The cover assembly 66 may surround the crib assembly 64 on all sides and may include one or more cover layers, such as medical grade cover layers suitable for use on such patient supports.

The expandable patient support 40 includes a first auxiliary patient support section 68 with a first auxiliary patient support surface and a second auxiliary patient support section 70 with a second auxiliary patient support surface. The first and second auxiliary patient support sections 68, 70 are expandable from respective first and second sides of the main patient support section 62 when expanding the expandable patient support 40 to the different widths. FIG. 3 illustrates the expandable patient support 40, for example, expanded from 36 inches to 48 inches. When collapsed to 36 inches, the first and second auxiliary patient support sections 68, 70 are contained within the cover assembly 66 adjacent to the crib assembly 64 of the main patient support section 62. In some versions, each of the first and second auxiliary patient support sections 68, 70 include one or more inflatable bladders 72, 74 that can be inflated to expand the first and/or second auxiliary patient support sections 68, 70 away from the main patient support section 62. Both the first and second auxiliary patient support sections 68, 70 are expanded away from the main patient support section 62 in the expanded configuration shown in FIG. 3, e.g., by inflating the one or more inflatable bladders 72, 74 associated with each of the first and second auxiliary patient support sections 68, 70. In some versions, linear actuators can be used to expand/collapse the first and second auxiliary patient support sections 68, 70, or other forms of expanders are possible to expand/collapse the first and second auxiliary patient support sections 68, 70.

FIGS. 4-8 illustrate one example of expanding the expandable patient support 40. For instance, the cover assembly 66 may include additional flaps 76 of flexible cover material on both sides of the main patient support section 62. The flaps 76 are fastened to the main patient support section 62 via one or more fastening elements 78, such as zippers, straps, connectors, fasteners, clips, clamps, hook-and-loop-type fasteners, the like. These flaps 76 define pouches or pockets in sides of the main patient support section 62 that, when closed, contain the first and second auxiliary patient support sections 68, 70. When the one or more fastening elements 78 are released (e.g., unzipped in the version shown), the flaps 76 are placed in their open state to open the pouch/pocket to reveal the first and second auxiliary patient support sections 68, 70. In the version shown, both longitudinal sides of the main patient support section 62 include the flaps 76 that are zipped to the cover assembly 66 to close the pouches/pockets and unzipped from the cover assembly 66 to open the pouches/pockets to reveal the inflatable bladder 72, 74 of each of the first and second auxiliary patient support sections 68, 70.

Figure 4:
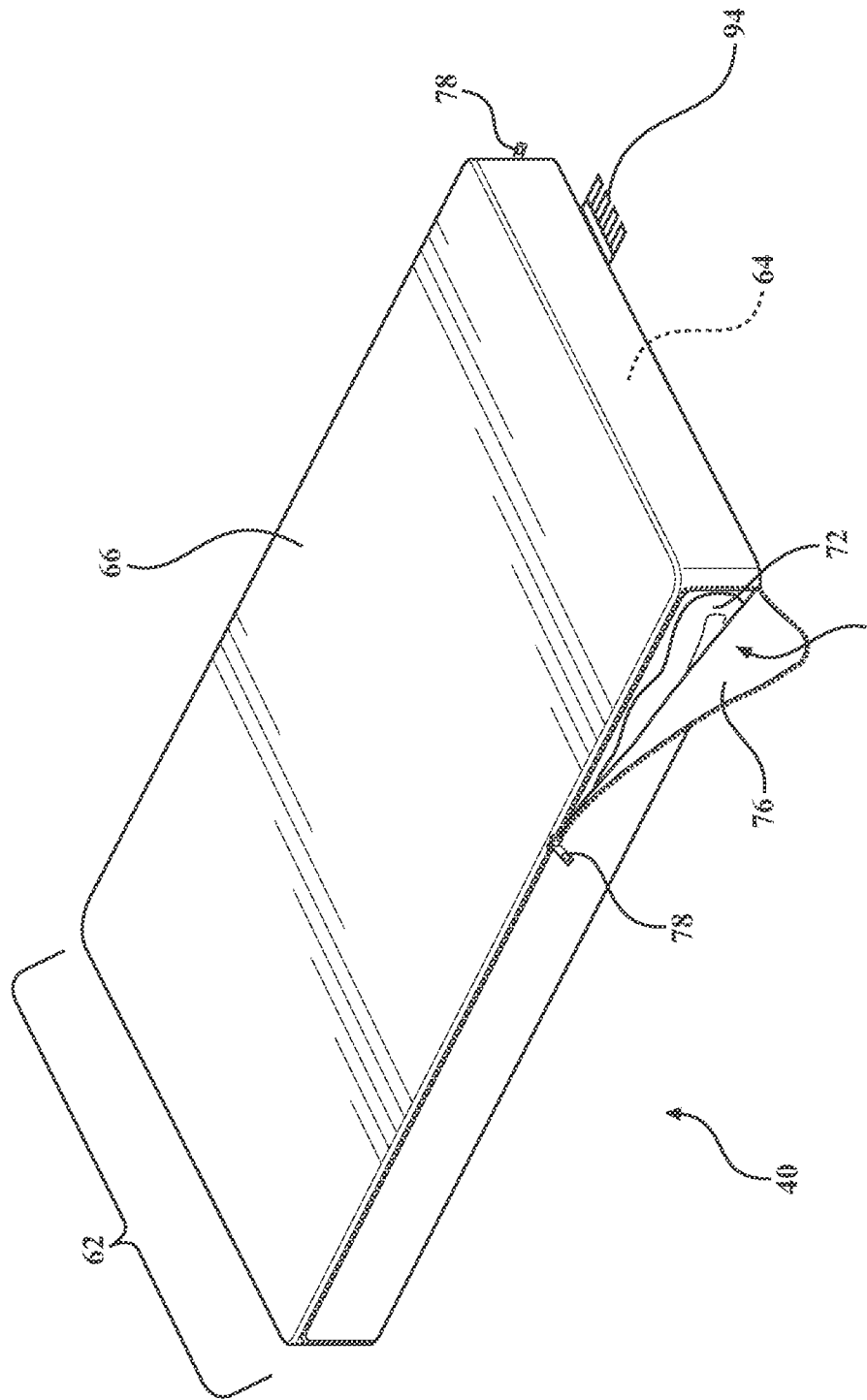
FIGS. 4-8 illustrate expansion of the expandable patient support.
Figure 5:
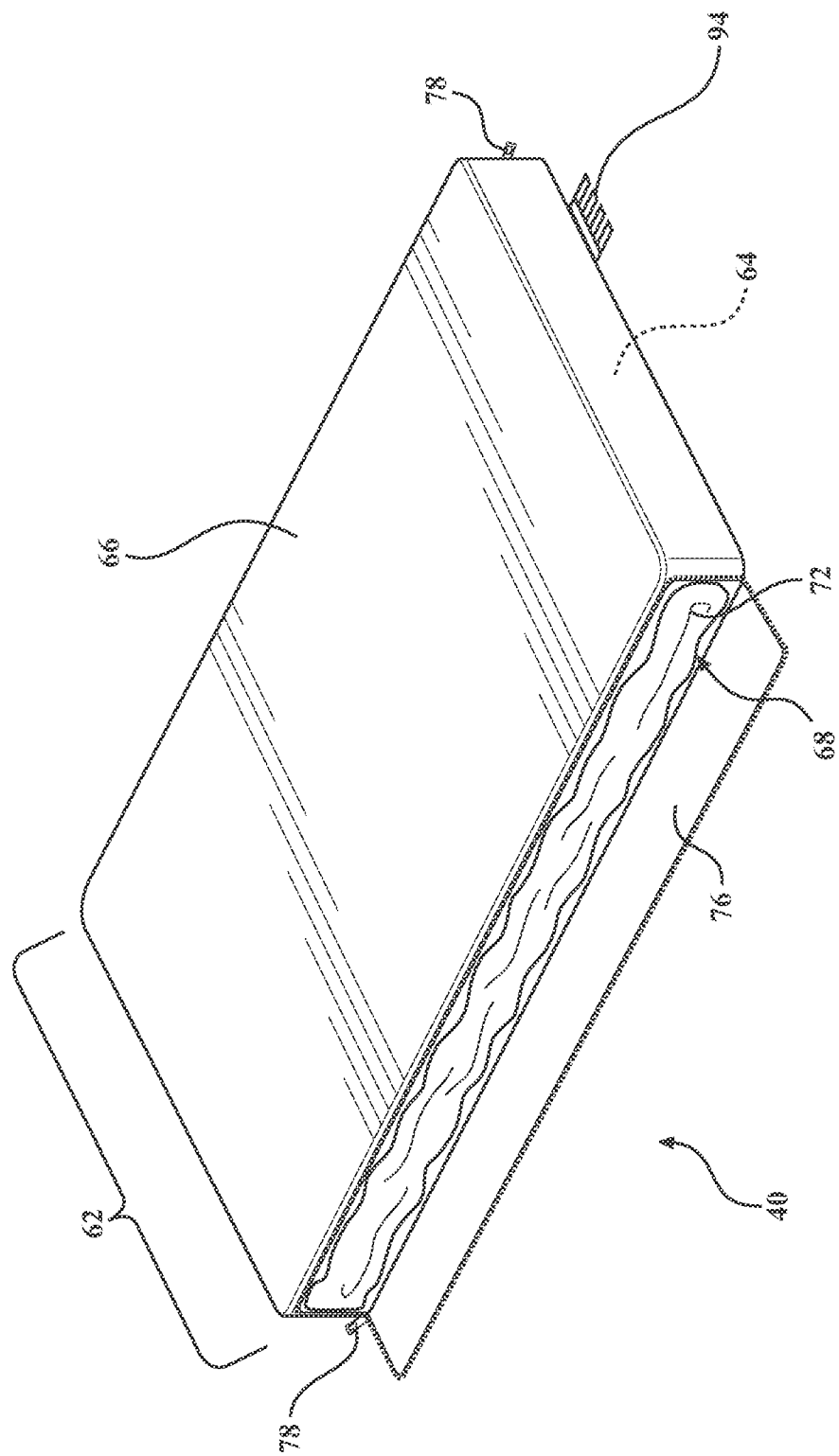
Figure 6:
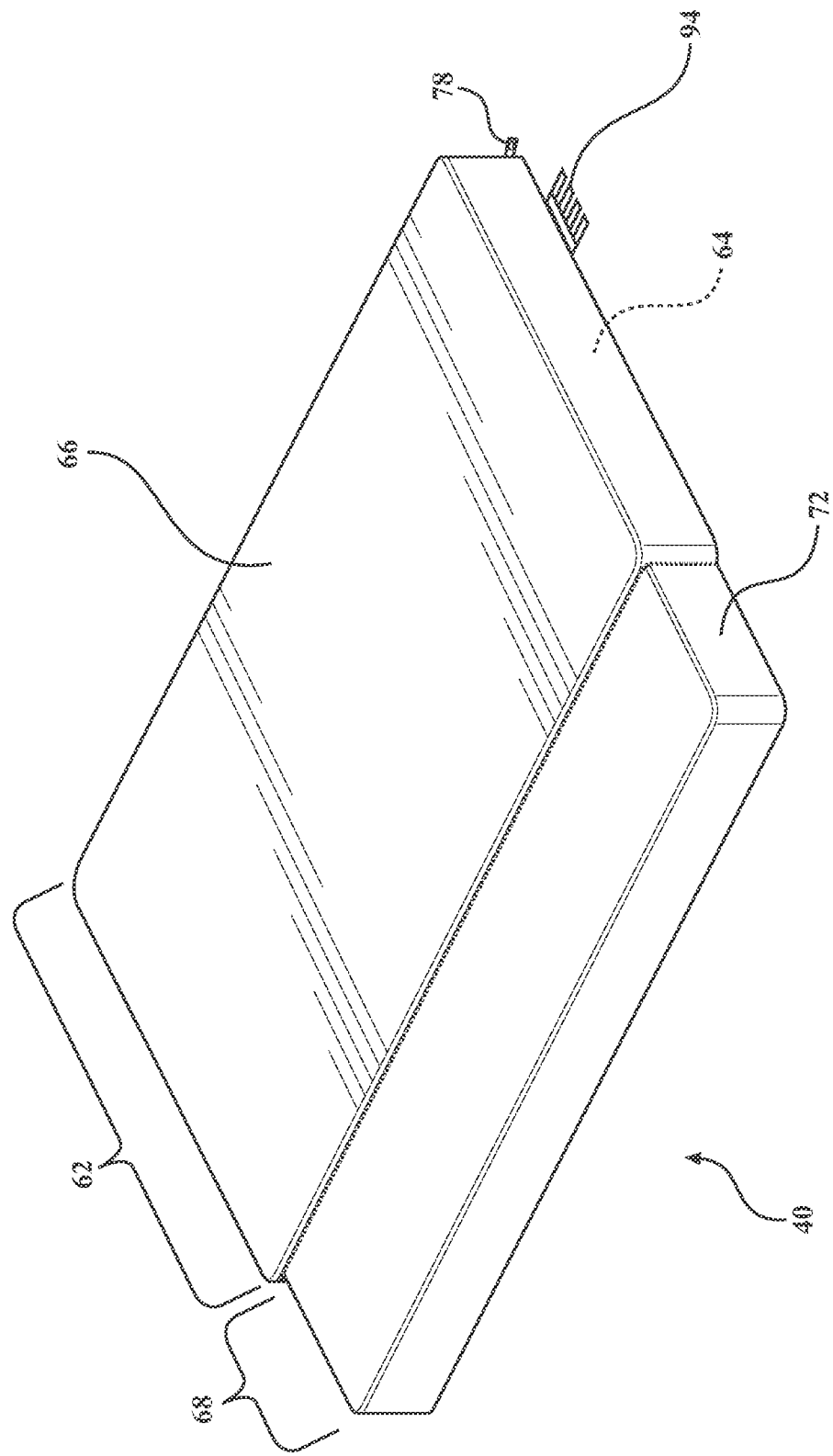
Figure 7:
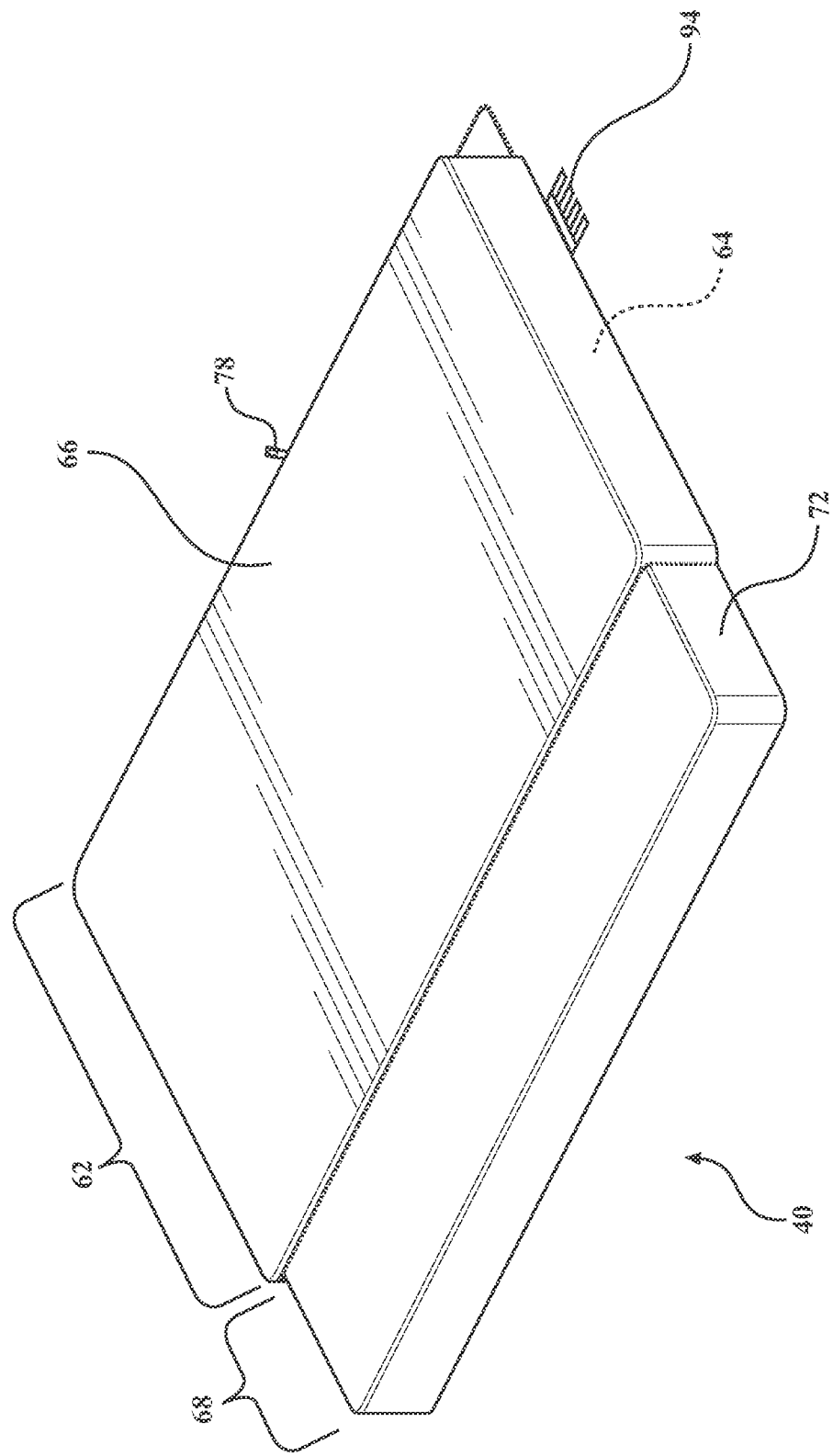
Figure 8:
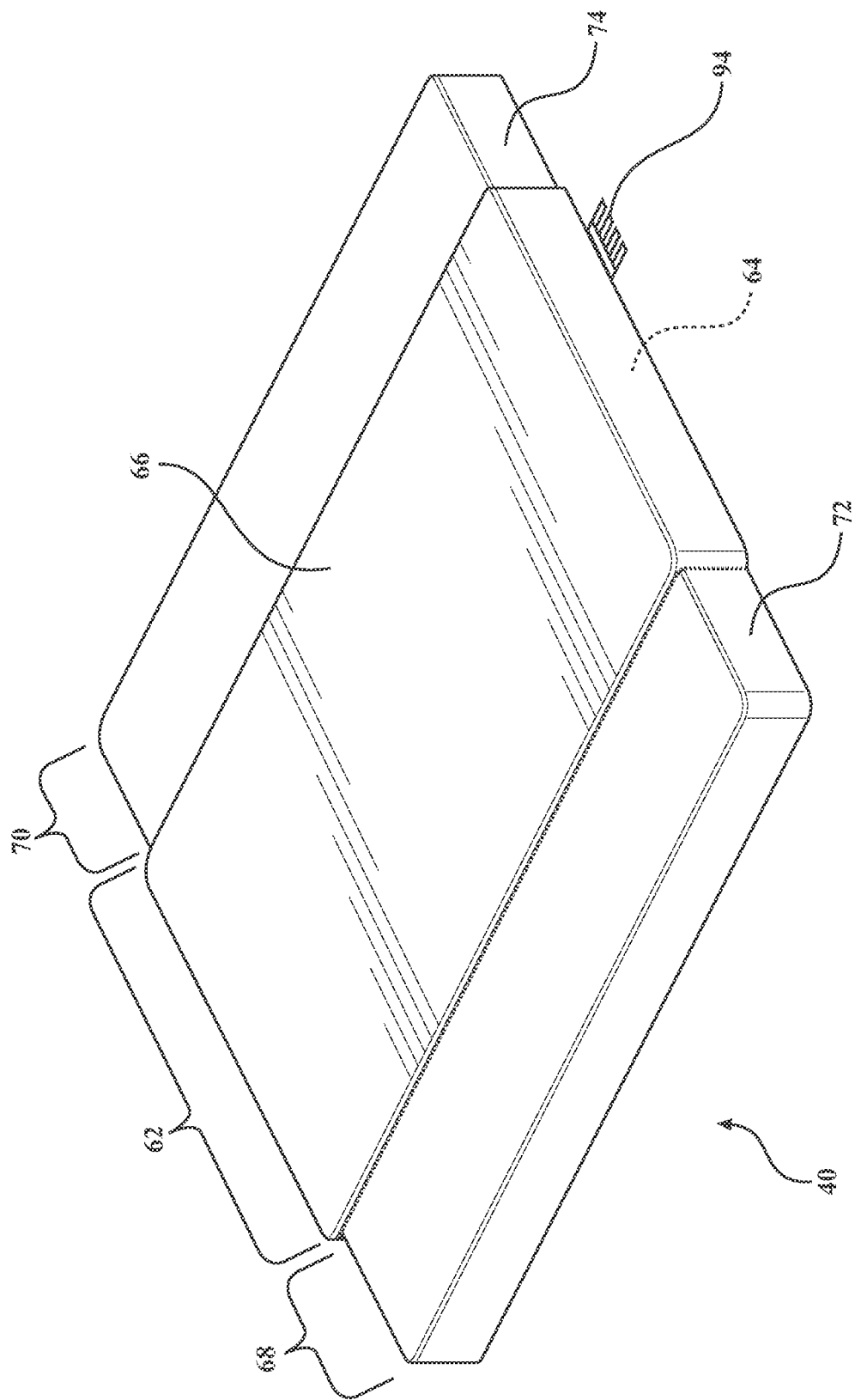

When neither of the first and second auxiliary patient support sections 68, 70 are expanded as shown in FIG. 4, the expandable patient support 40 is in a fully collapsed configuration (e.g., 36 inches). When the first auxiliary patient support section 68 is fully expanded as shown in FIG. 6, the expandable patient support 40 is in an intermediate configuration (e.g., 42 inches). When both the first and second auxiliary patient support sections 68, 70 are expanded as shown in FIG. 8, the expandable patient support 40 is in a fully expanded configuration (e.g., 48 inches).

Figure 9:
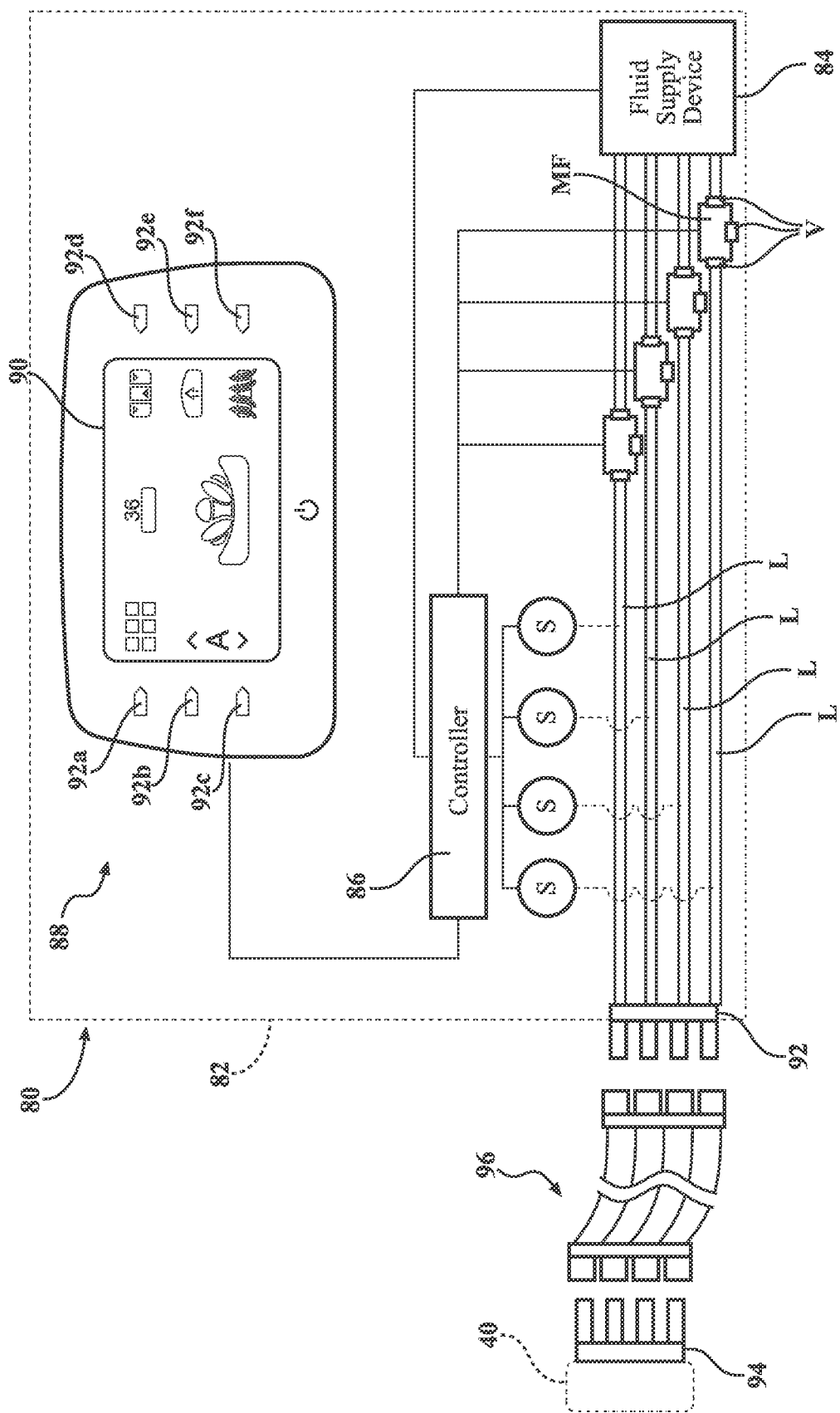
FIG. 9 is a schematic view of the control assembly and illustrates fluid routing.

Referring to FIG. 9, a control assembly 80 is shown to control operation of the expandable patient support 40. Collectively, the expandable patient support 40 and the control assembly 80 form a patient support system. The control assembly 80, in the version shown, includes a housing 82 and an expander in the form of a fluid supply device 84 disposed within the housing 82 (see also FIG. 1). The fluid supply device 84 may comprise a pump, fan, blower, or the like, and associated motor or motors, for supplying fluid (e.g., air, water, other liquids, etc.) to the expandable patient support 40.

A controller 86 is operatively coupled to the fluid supply device 84 to control operation of the fluid supply device 84. The controller 86 may include one or more microprocessors for processing instructions or for processing algorithms stored in memory to control operation of the fluid supply device 84 to supply fluid to the expandable patient support 40. Additionally, or alternatively, the controller 86 may include one or more microcontrollers, field programmable gate arrays, systems on a chip, discrete circuitry, graphics drivers, and/or other suitable hardware, software, or firmware that is capable of carrying out the functions described herein. The controller 86 may be carried on-board the control assembly 80 or may be remotely located. In some embodiments, the controller 86 is disposed inside the housing 82. Power to the fluid supply device 84, the controller 86, and other electronic components of the control assembly 80 may be provided by a battery power supply or an external power source. For example, the fluid supply device 84 may comprise a DC switchable power supply so that in different geographic regions, the same control assembly 80 may be employed with a different power cord. In other words, the control assembly 80 may be plugged into any voltage and be operational.

In some versions, the controller 86 includes an internal clock to keep track of time. In some versions, the internal clock is a microcontroller clock. The microcontroller clock may include a crystal resonator, a ceramic resonator, a resistor capacitor (RC), oscillator, or a silicon oscillator. Examples of other internal clocks other than those disclosed herein are fully contemplated. The internal clock may be implemented in hardware, software, or both. In some embodiments, memory, microprocessors, and microcontroller clock cooperate to send signals to and operate the various components shown in FIG. 9 to meet predetermined timing parameters. These predetermined timing parameters are discussed in more detail below.

A user interface 88 is operatively coupled to the controller 86 to enable a user, such as a caregiver, to provide input to operate the fluid supply device 84. The user interface 88 may include, for example, a touchscreen, push buttons, gesture sensors, piezoelectric elements, or the like to receive user input and generate corresponding input signals to be transmitted to the controller 86 to control operation of the fluid supply device 84 based on the input signals. The user interface 88 may further include a display 90 operatively coupled to the controller 86. The display 90 may be a light-emitting diode (LED) display, an electroluminescent display (ELD), a liquid crystal display (LCD), an organic light-emitting diode (OLED) display, or any other suitable display. The controller 86 generates and outputs graphical representations (e.g., images) and graphical animations of the various therapies, instructions, warnings, and the like on the display 90, as described further below. These graphical representations/animations may be stored as graphic information/images in memory of the controller 86 in any suitable format for being output onto the display 90 by the controller 86.

A supply connector 92 is coupled to the housing 82 for connecting the fluid supply device 84 to the expandable patient support 40. The supply connector 92 has a plurality of supply ports to provide fluid communication between the fluid supply device 84 and the one or more inflatable bladders of the main patient support section 62 and the one or more inflatable bladders 72, 74 of the first and second auxiliary patient support sections 68, 70. One of the ports is also to provide fluid communication between the fluid supply device 84 and fluid distribution tubing on the main patient support section 62 for providing low air loss (LAL) functionality to help reduce pressure ulcers on the patient. The supply connector 92 is configured to be operatively coupled to a device connector 94 attached to the expandable patient support 40. The device connector 94 has a plurality of ports to be fluidly coupled to the plurality of ports on the supply connector 92. A fluid supply line 96 operatively couples the supply connector 92 to the device connector 94. The fluid supply line 96 includes couplings and a plurality of conduits (four shown). The fluid supply line 96 may be configured so that the supply connector 92 is connected to the device connector 94 in a predetermined configuration so that the appropriate ports are connected to the appropriate inflatable bladders of the patient support sections 62, 68, 70, and the LAL tubing of the expandable patient support 40.

One or more sensors S, such as pressure sensors, are coupled to the controller 86 and in communication with their respective fluid supply lines L to measure pressure within the inflatable bladders of the patient support sections 62, 68, 70 to which the supply lines L are connected, for example, or to measure pressure in the low air loss system. For instance, the controller 86 may monitor pressure in the inflatable bladder 72 of the first auxiliary patient support section 68 and/or the inflatable bladder 74 of the second auxiliary patient support section 70, via their respective supply lines L, to determine when they are fully expanded/inflated or fully collapsed/deflated. The controller 86 may monitor pressure within the one or more inflatable bladders of the main patient support section 62 to determine the current pressure in the one or more inflatable bladders and adjust the pressure as desired.

One suitable arrangement of valves V is shown in FIG. 9 for opening/closing fluid communication between the fluid supply device 84 and the expandable patient support 40 and between the expandable patient support 40 and atmosphere. For example, the fluid supply device 84 is shown supplying fluid to four separate manifolds MF that each include three valves on three ports (only one manifold MF is labeled). In this case, one valve V opens/closes fluid communication with the fluid supply device 84, one valve V opens/closes fluid communication with atmosphere, and one valve V opens/closes fluid communication with the respective supply line L coupled to the respective inflatable bladder(s) of the patient support section 62, 68, or 70, or the low air loss tubing. However, other arrangements of the fluid supply device 84, valves V, sensors S, and supply lines L are possible. In some versions, for example, a single manifold with valving may be provided in the control assembly 80. In some versions, the port to atmosphere may be connected to a separate vacuum pump to pull fluid (e.g., air) out of the respective auxiliary patient support sections 68, 70 of the expandable patient support 40, such as when the user wishes to collapse the auxiliary patient support sections 68, 70.

FIGS. 10A through 48 illustrate views of the user interface 88, including various screenshots of the display 90. These screenshots illustrate examples of display output for user operation of the control assembly 80 and the expandable patient support 40. Notably, no translatable text is present on the display 90 in many of these screenshots, only symbols are used in conjunction with time parameters to communicate functions and content. As a result, the user interface 88 is configured to be universally acceptable regardless of language. User-selectable buttons 92a-92f may be buttons on a touchscreen, membrane-type switches surrounding the display 90, piezoelectric elements, other sensors, or the like.

Figure 10A:
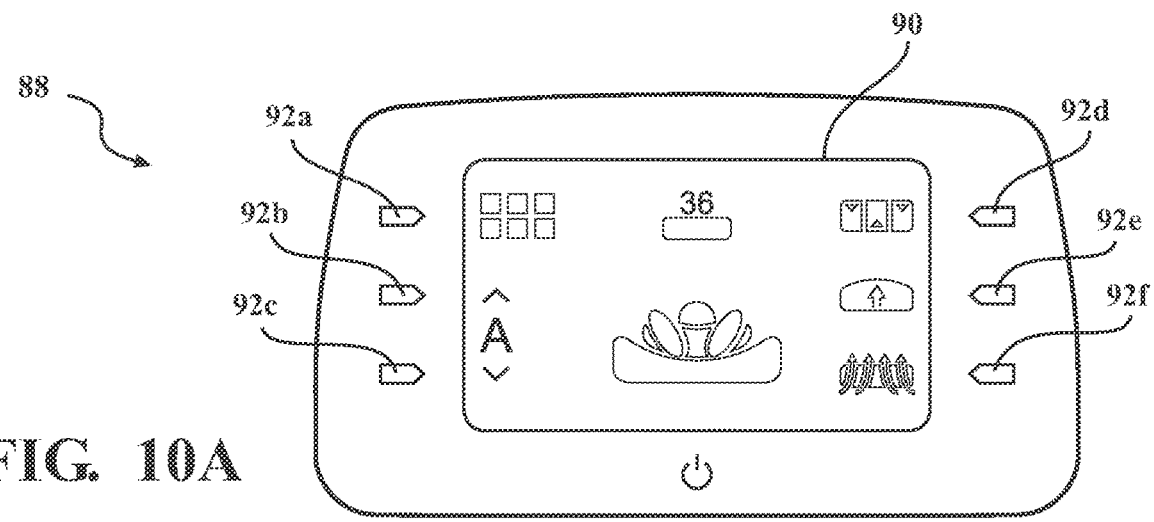
FIGS. 10A-10C illustrate home screens on a user interface when the expandable patient support is at a plurality of different widths.
Figure 10B:
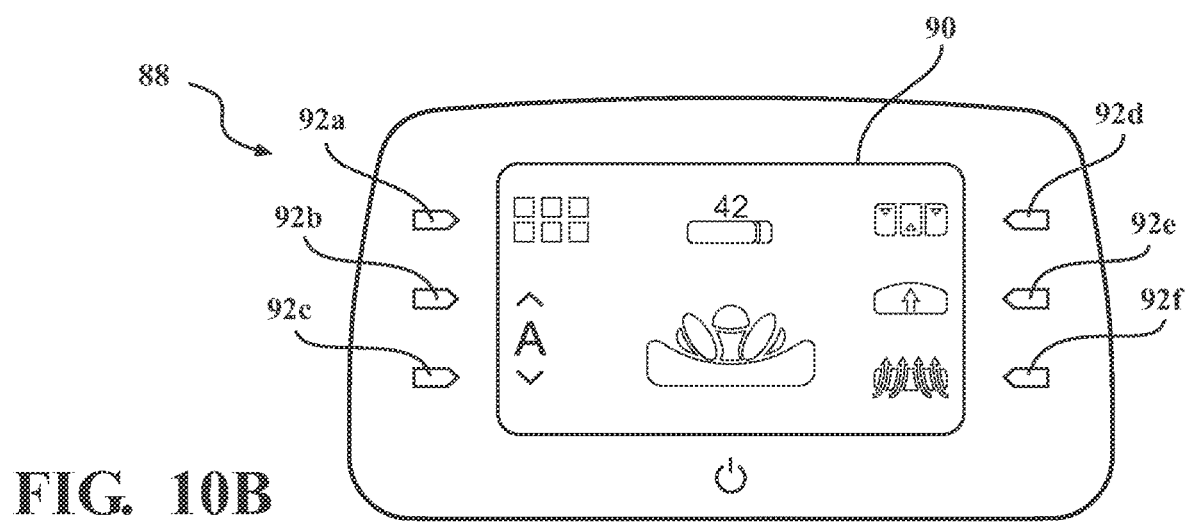
Figure 10C:
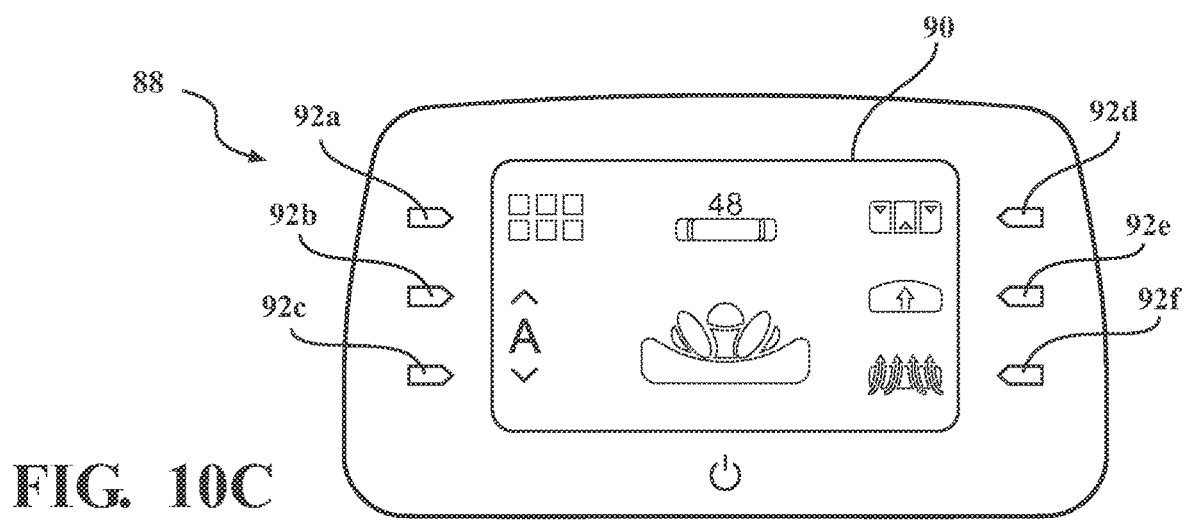

FIGS. 10A through 10C illustrates home screens on the display 90 that provide the user with options for selecting various functionalities of the patient support system, including: (i) selecting a mode menu with button 92a; (ii) manually increasing or decreasing firmness of the expandable patient support 40 via buttons 92b, 92c, which in turn would cause the controller 86 to increase/decrease the firmness by operating the fluid supply device 84; (iii) activating/deactivating an alternating low pressure (ALP) system with button 92d, which, when activated, would cause the controller 86 to alternate pressures in the expandable patient support 40 between relatively lower and higher values; (iv) activating/deactivating a maximum inflation function via button 92e, which, when activated, would cause the controller 86 to operate the fluid supply device 84 to supply fluid to the expandable patient support 40 until pressures are at a maximum value, and hold that maximum value for a predetermined amount of time (also selectable by the user); and (v) activating/deactivating the low air loss (LAL) function with button 92f, which, when activated would cause the controller 86 to operate the fluid supply device 84 to supply fluid to the LAL tubing on the expandable patient support 40. Also displayed on these home screens is the current width setting for the expandable patient support 40.

Figure 11:
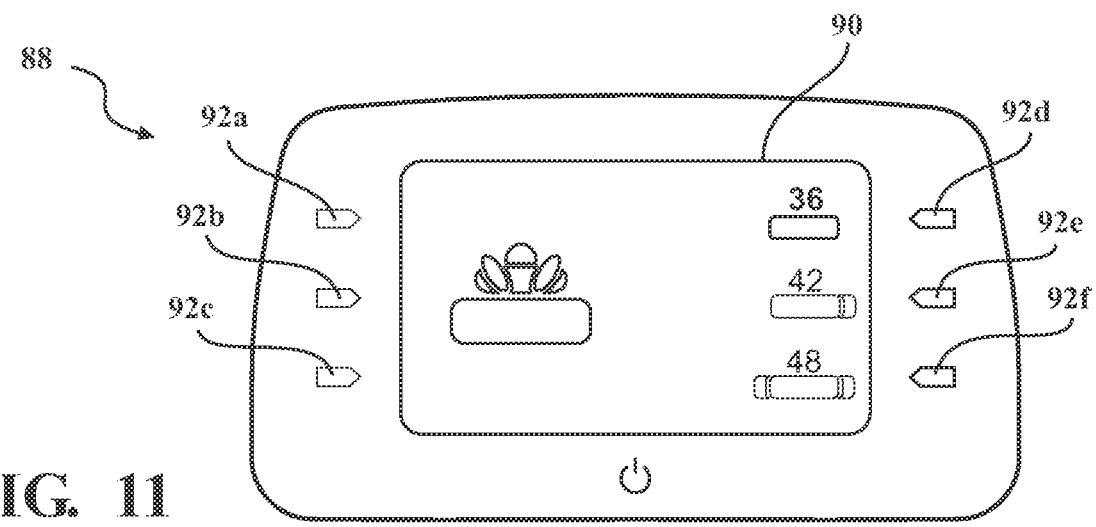
FIG. 11 illustrates a width selection screen of the user interface that is displayed when the control assembly is initially powered-up.

FIG. 11 illustrates a width selection menu in which the user can select from among the various width settings for the expandable patient support 40. This screen is presented to the user upon start-up of the control assembly 80 (e.g., when a power button is activated after being shut down). The screen shows the current width setting being highlighted in a color (e.g., green), while the other width settings remain grayed-out. If one of the other width settings are selected (e.g., via buttons 92e, 92f), then the controller 86 would initiate a workflow associated with instructing the user how to prepare for changing the width of the expandable patient support 40.

Figure 12:
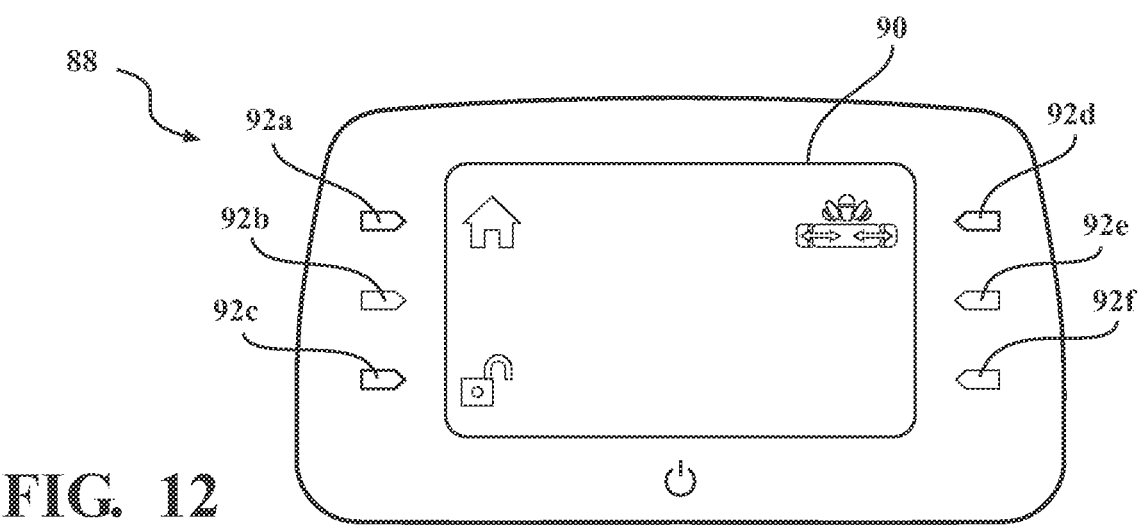
FIG. 12 illustrates a mode menu screen of the user interface that is accessible from the home screens.
Figure 13A:
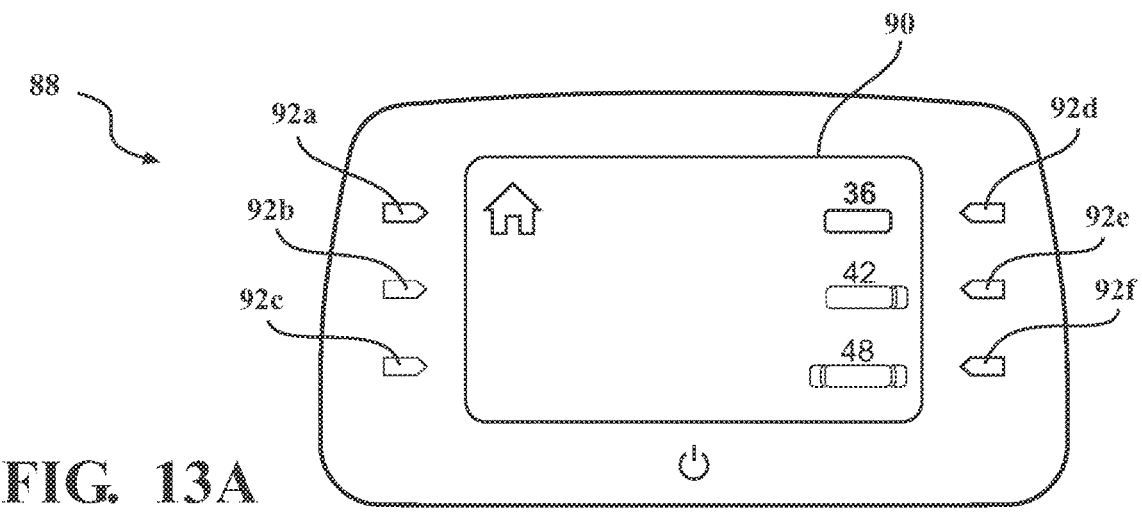
FIGS. 13A-13C illustrate a width selection screen of the user interface that is accessible from the mode menu screen of the user interface.
Figure 13B:
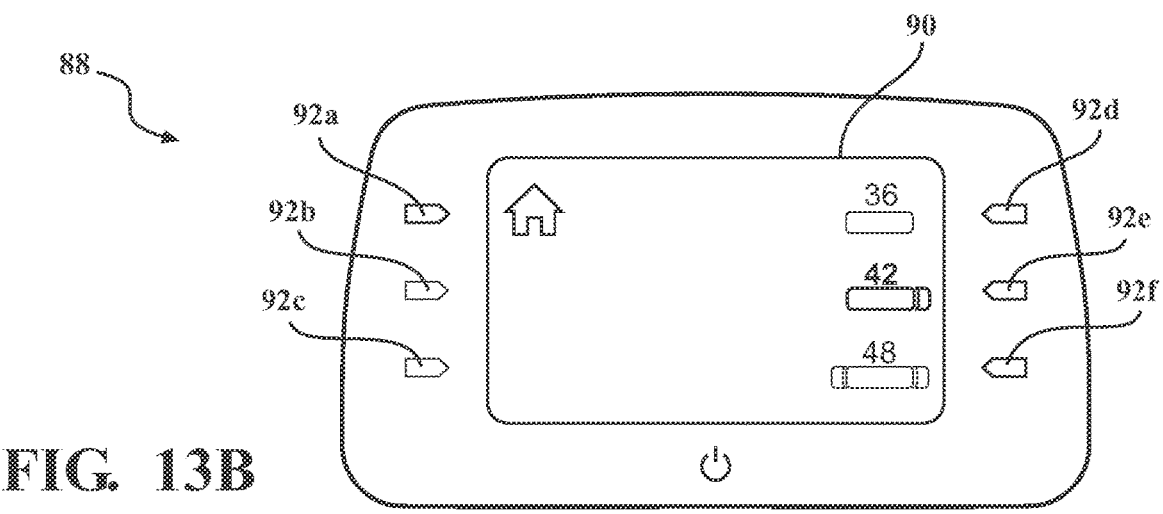
Figure 13C:
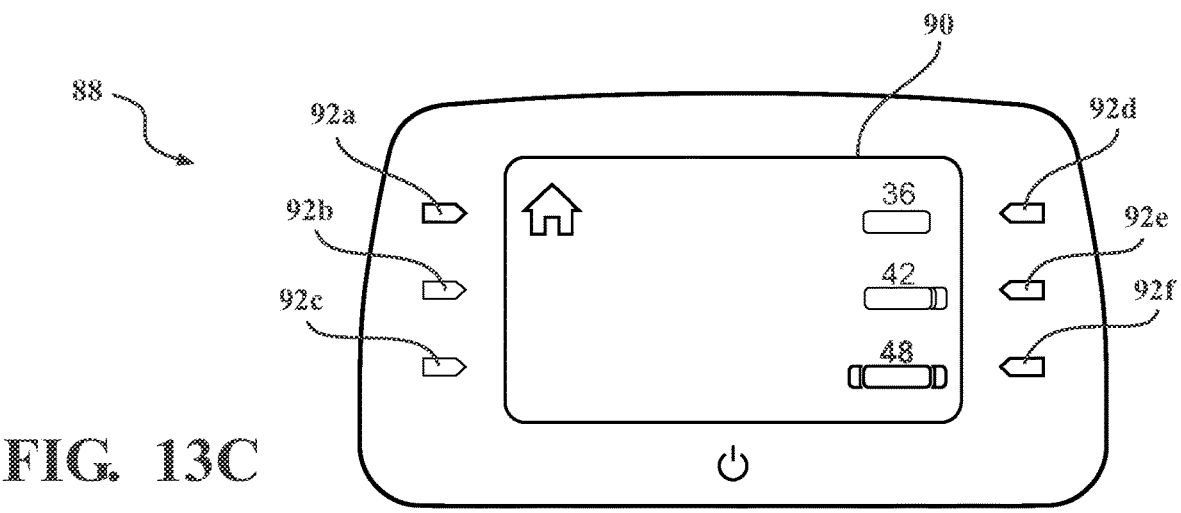

FIG. 12 illustrates the mode menu that is accessible from the home screens shown in FIGS. 10A-10C (e.g., via the button 92a in FIGS. 10A-10C). The mode menu provides the user with options to select from: (i) returning to the home screen via button 92a; (ii) activating/deactivating a lock function via the button 92c; and (iii) accessing another width selection menu via the button 92d. FIGS. 13A-13C illustrate the width selection menus that are displayed by the controller 86 in response to the user selecting the width selection menu via the button 92d in FIG. 12. These screenshots show that the display 90 is generally the same, except that the current width selection is highlighted in a color (e.g., green), while the others remain grayed-out. If one of the other width settings are selected, then the controller 86 would initiate a workflow associated with instructing the user how to prepare for changing the width of the expandable patient support 40.

FIGS. 14A-14C, 15A-15C, and 16A-16C illustrate a predetermined sequence of graphical animations that the controller 86 generates on the display 90 to graphically instruct a user to perform a plurality of tasks after the user selects a width of 48 inches (e.g., a new width) on the user interface 88 in FIG. 13A (e.g., the current width is 36 inches) and before the controller 86 operates the fluid supply device 84 to expand the overall width of the expandable patient support 40 from the old width to the new width. The controller 86 instructs the user to perform the plurality of tasks by displaying (e.g., playing) each of the graphical animations of the predetermined sequence completely at least once before the controller 86 operates the fluid supply device 84 to expand the overall width of the expandable patient support 40.

Figure 14A:
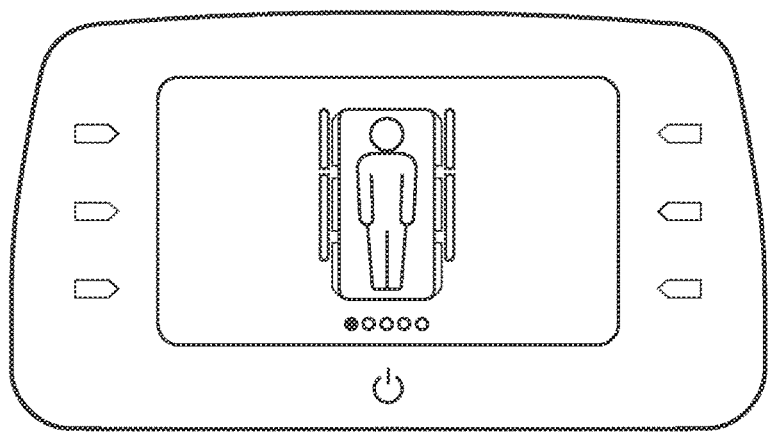
FIGS. 14A-14C illustrate a patient offloading animation displayed on the user interface in preparation for expanding the expandable patient support, for example, from 36 inches to 48 inches.
Figure 14B:
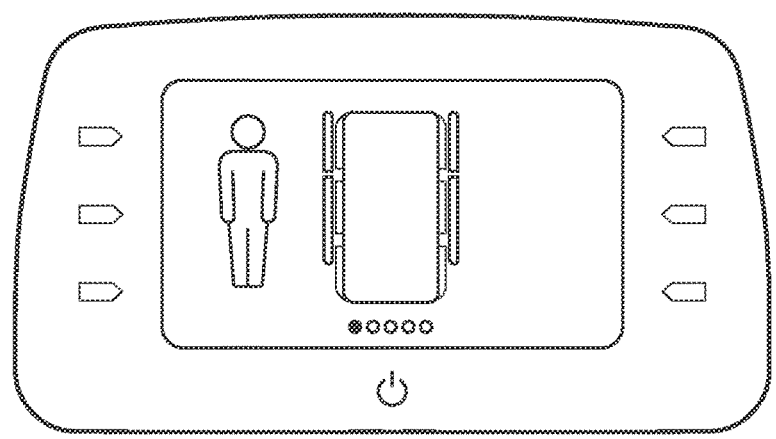
Figure 14C:
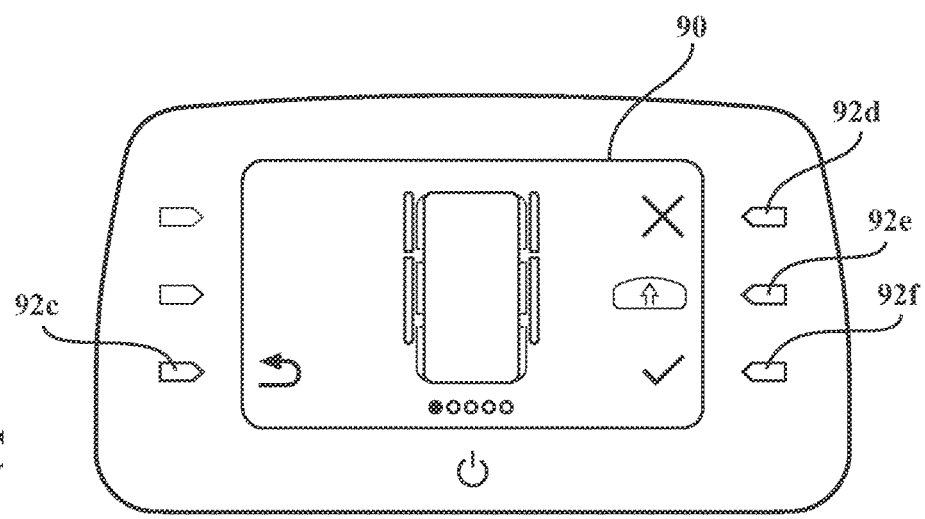

Referring to FIGS. 14A-14C, the predetermined sequence of graphical animations includes a patient offloading animation to instruct the user to move the patient off the main patient support surface of the main patient support section 62. The patient offloading animation starts in FIG. 14A with the controller 86 displaying a patient image representing a patient on the main patient support surface. The controller 86, then animates the patient image by displaying one or more patient images in sequence (e.g., in sequential frames or sets of frames) at varying distances from the main patient support surface until the patient image is depicted off the main patient support surface, as shown in FIG. 14B. The controller 86 then removes the patient image altogether in the next portion of the animation, as shown in FIG. 14C. After the patient image is at least depicted off the main patient support surface (FIG. 14B), and at least one complete cycle of the patient offloading animation is fully executed and displayed, the controller 86 prompts the user for input, to confirm that the actual patient is off the main patient support surface. Thus, the controller 86 displays at least one complete cycle of animation to instruct the user before the controller 86 seeks input from the user to confirm that the task has been completed. This input includes selection via the button 92f adjacent to a check mark image displayed by the controller 86. Alternatively, the user can cancel the operation by selecting button 92d adjacent to an image of an X displayed by the controller 86. The user also has the option of initiating operation of the maximum inflation function via button 92e. The controller 86 initiates and displays one or more additional loops of the patient offloading animation while waiting for the input from the user to confirm that the patient is off the main patient support surface.

Figure 15A:
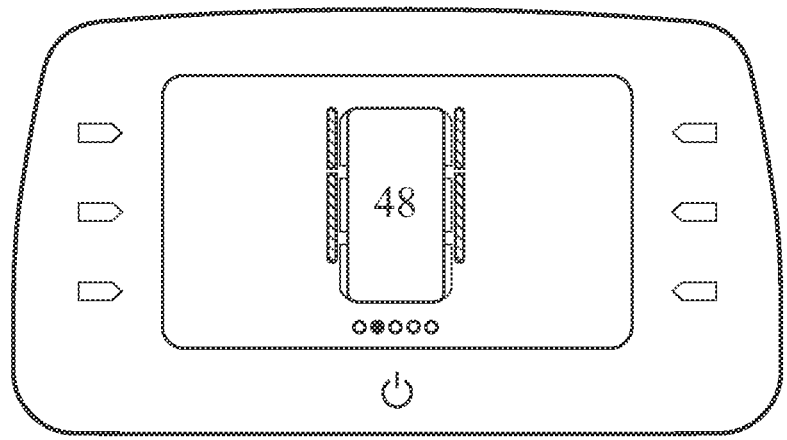
FIGS. 15A-15C illustrate a deck expansion animation displayed on the user interface in preparation for expanding the expandable patient support, for example, from 36 inches to 48 inches.
Figure 15B:
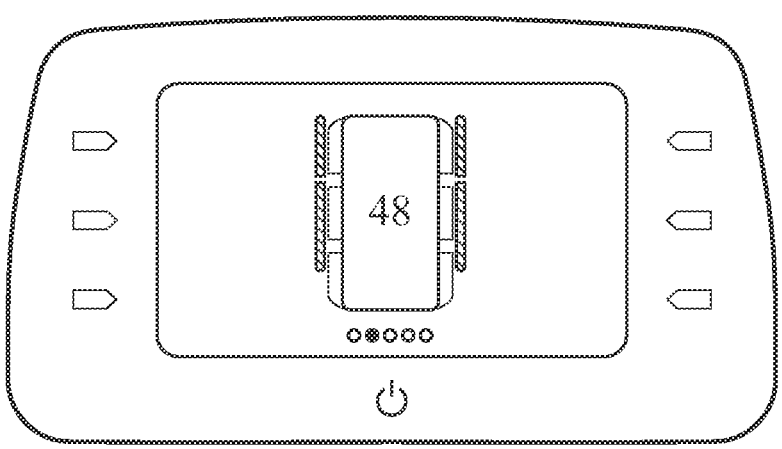
Figure 15C:
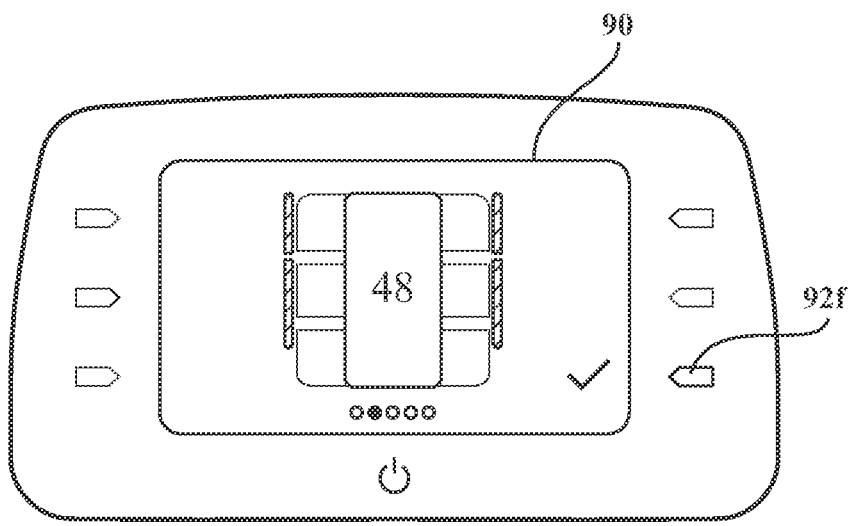

Referring to FIGS. 15A-15C, the predetermined sequence of graphical animations includes a deck expansion animation to instruct the user to expand the deck sections 41, 43, 45, 47 (see FIG. 2) of the patient support deck 38 (e.g., part of the litter) to accommodate the expandable patient support 40 once at the new width. The deck expansion animation starts in FIG. 15A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence (e.g., in sequential frames or sets of frames) at varying degrees of expansion (e.g., see FIG. 15B) until the deck/side rail image illustrates complete expansion of the patient support deck 38 and side rails 54, 56, 58, 60, as shown in FIG. 14C. After the deck/side rail image is depicted as being completely expanded, and at least one complete cycle of the deck expansion animation is fully executed and displayed, the controller 86 prompts the user for input, to confirm that the actual deck sections 41, 43, 45, 47 and associated side rails 54, 56, 58, 60 have been expanded to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92f adjacent to a check mark image displayed by the controller 86. The controller 86 initiates and displays one or more additional loops of the deck expansion animation while waiting for the input from the user to confirm that the deck sections 41, 43, 45, 47 and side rails 54, 56, 58, 60 have been expanded to their required widths.

Figure 16A:
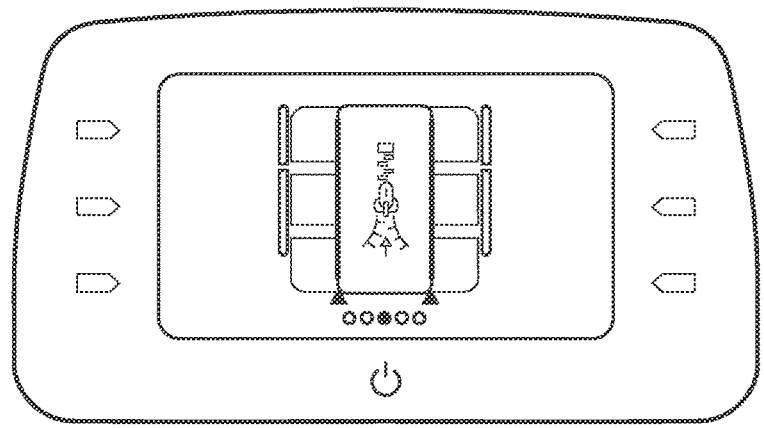
FIGS. 16A-16C illustrate a fastener release animation displayed on the user interface in preparation for expanding the expandable patient support, for example, from 36 inches to 48 inches.
Figure 16B:
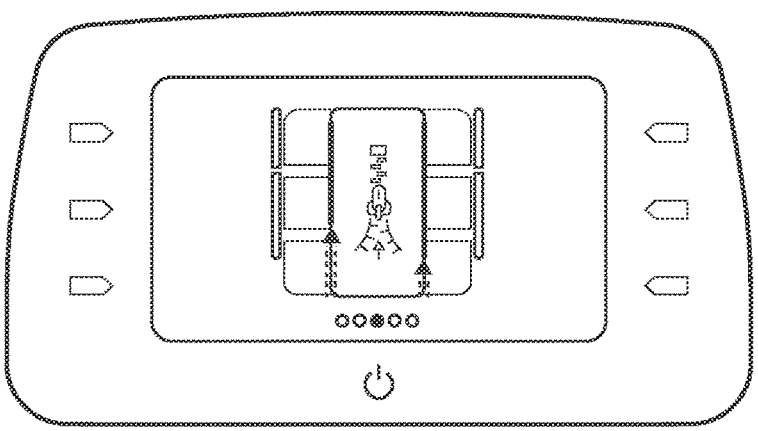
Figure 16C:
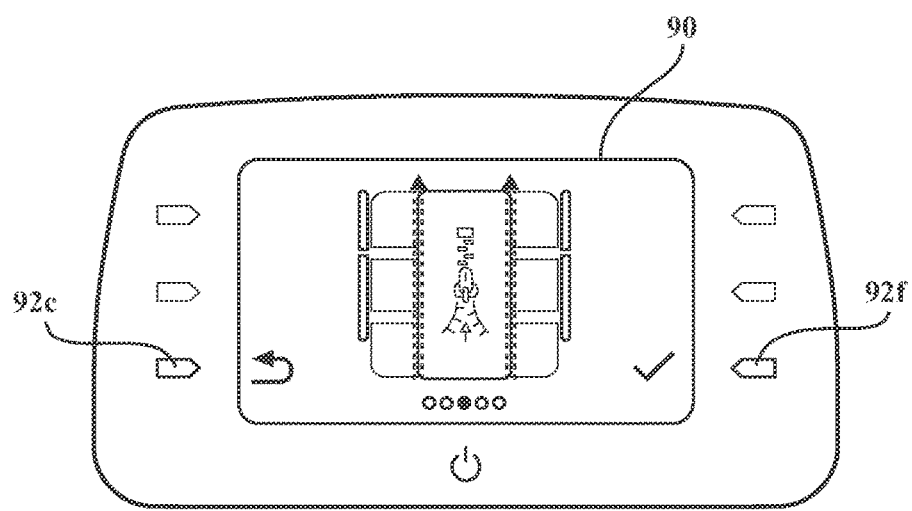

Referring to FIGS. 16A-16C, the predetermined sequence of graphical animations includes a fastener release animation to instruct the user to release the one or more fastening elements 78 to allow the auxiliary patient support sections 68, 70 to expand away from the main patient support section 62. The fastener release animation starts in FIG. 16A with the controller 86 displaying a plurality of fastening element images representing the current state of the fastening elements 78. For instance, the images represent zippers on both the left and right sides of the main patient support section 62 (see orange lines and zipper sliders of the zippers represented as orange triangles). The images also include an image depicting the teeth of the zipper being released (see arrow) and the zipper slider in more detail (between the orange lines). The controller 86, then animates the plurality of fastening element images by displaying the plurality of fastening element images in sequence at varying degrees of release (e.g., see FIG. 16B) until the fastening element images illustrate complete release of the auxiliary patient support sections 68, 70, as shown in FIG. 16C. More specifically, the orange lines representing the zippers in their engaged states on the left and right sides of the main patient support section 62 transition from orange, solid lines, to green dotted lines in the sequence of images to show releasing of the zippers. Also, the more detailed images of the teeth of the zipper are depicted in different positions in sequential images (e.g., in sequential frames or sets of frames) so that it appears to the user that the zipper slider is moving to unzip the zippers. After the fastening element images are depicted as being completely released, and at least one complete cycle of the fastener release animation is fully executed and displayed, the controller 86 prompts the user for input, to confirm that the actual fastening elements 78 have been released. Thus, the controller 86 displays at least one complete cycle of animation to instruct the user before the controller 86 seeks input from the user to confirm that the task has been completed. This input includes selection via the button 92f adjacent to a check mark image displayed by the controller 86. The user also has the option of returning to the width selection menu via button 92c. The controller 86 initiates and displays one or more additional loops of the fastener release animation while waiting for the input from the user to confirm that the fastening elements 78 have been released.

Figure 17A:
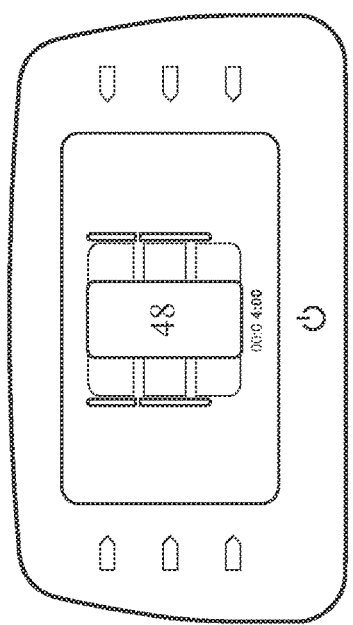
FIGS. 17A-17E illustrate an auxiliary section expansion animation displayed on the user interface when expanding the expandable patient support, for example, from 36 inches to 48 inches.
Figure 17B:
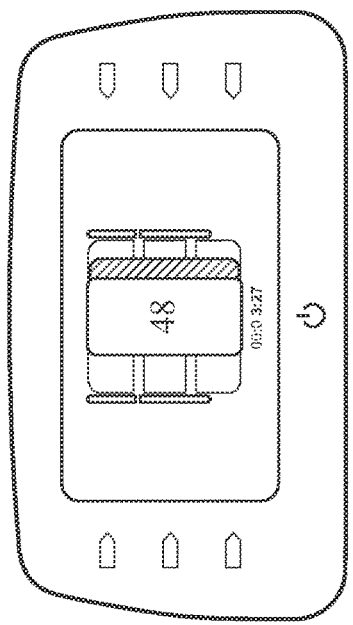
Figure 17C:
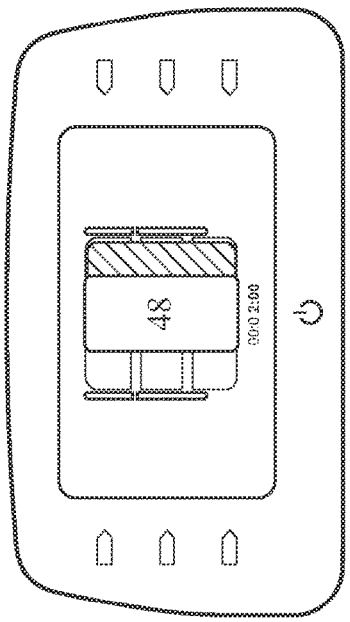
Figure 17D:
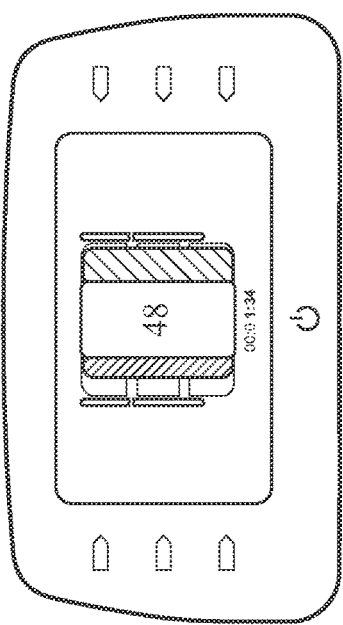
Figure 17E:
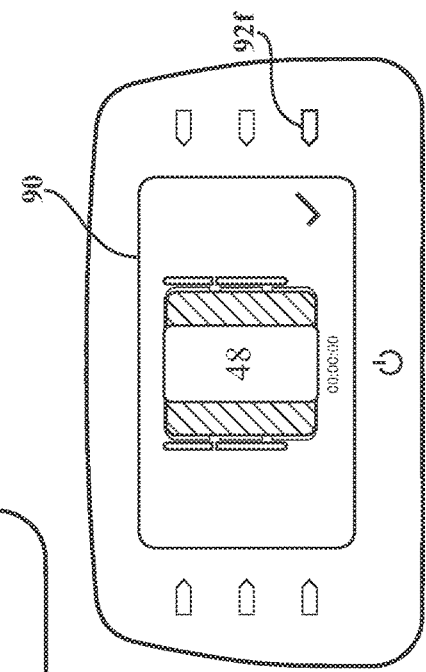

Referring to FIGS. 17A-17E, the controller 86 is programmed to also display an auxiliary section expansion animation to graphically depict expansion of the auxiliary patient support sections 68, 70 away from the main patient support section 62. The deck expansion animation starts in FIG. 17A with the controller 86 displaying an expandable patient support image representing the current state of the expandable patient support 40 (e.g., at 36 inches). The controller 86, then animates the expandable patient support image by displaying one or more auxiliary patient support section images in sequence (e.g., in sequential frames or sets of frames) at varying degrees of expansion (e.g., see FIGS. 17B-17D) until the auxiliary patient support section images illustrate complete expansion of the expandable patient support 40, as shown in FIG. 17E. The controller 86 also displays elapsed time (e.g., from 4 minutes) during the animation. After the expandable patient support 40 image is depicted as being completely expanded, and at least one complete cycle of the auxiliary section expansion animation is fully executed and displayed, the controller 86 prompts the user for input, to confirm that the auxiliary patient support sections 68, 70 are fully expanded away from the main patient support section 62. This input includes selection via the button 92f adjacent to a check mark image displayed by the controller 86. The controller 86 initiates and displays one or more additional loops of the auxiliary section expansion animation while waiting for the input from the user to confirm that the auxiliary patient support sections 68, 70 have been expanded to their required widths.

Figure 18A:
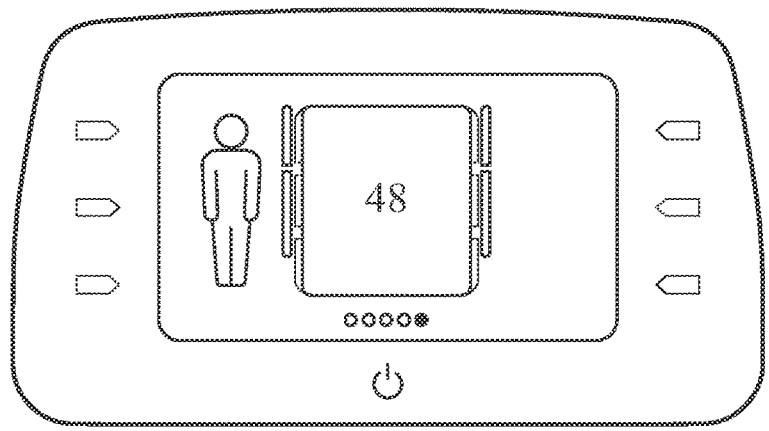
FIGS. 18A-18C illustrate a patient loading animation displayed on the user interface after expanding the expandable patient support, for example, from 36 inches to 48 inches.
Figure 18B:
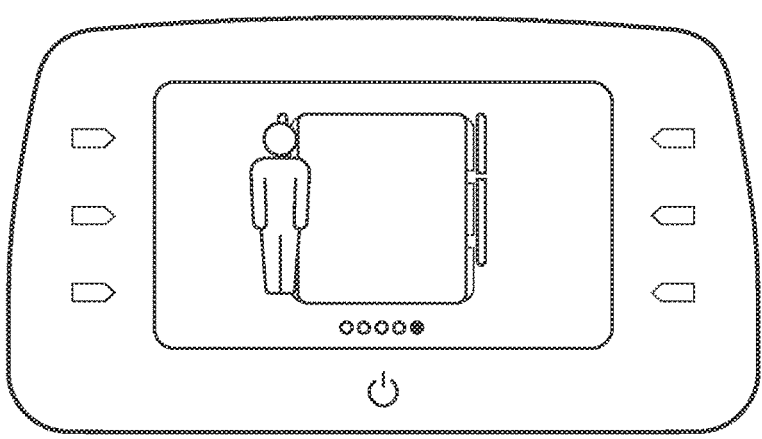
Figure 18C:
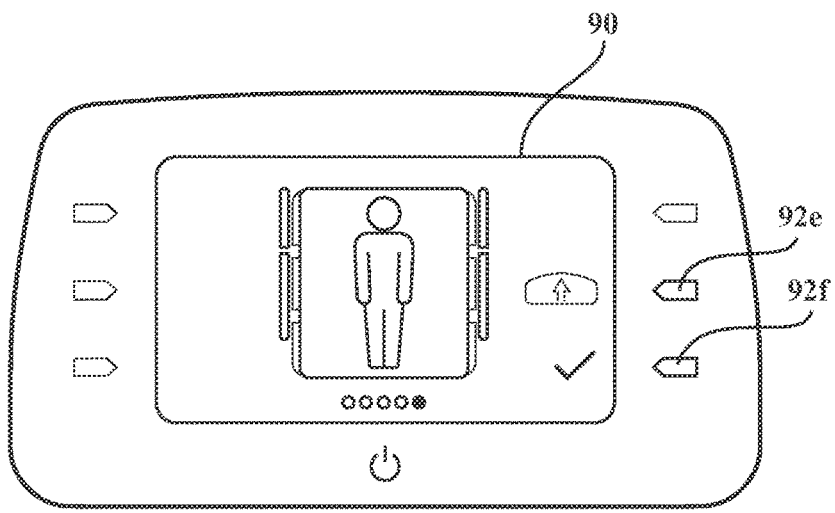

Referring to FIGS. 18A-18C, the controller 86 is programmed to also display a patient loading animation to instruct the user to move the patient onto the main patient support surface of the main patient support section 62 and the auxiliary patient support surfaces of the auxiliary patient support sections 68, 70 after the controller 86 operates the fluid supply device 84 to expand the overall width of the expandable patient support 40 from the original width to the new width. The patient loading animation starts in FIG. 18A with the controller 86 displaying a patient image representing a patient off the main patient support surface and off the auxiliary patient support surfaces. The controller 86, then animates the patient image by displaying one or more patient images in sequence at varying distances from the main patient support surface and the auxiliary patient support surfaces until the patient image is depicted on the main patient support surface and the auxiliary patient support surfaces, as shown in FIG. 18C (note that the main patient support surface and the auxiliary patient support surfaces are represented as a single surface in the images of FIGS. 18A-18C). After the patient image is depicted on the main patient support surface and the auxiliary patient support surfaces (or at least placed back on the expandable patient support 40), and at least one complete cycle of the patient loading animation is fully executed and displayed, the controller 86 prompts the user for input, to confirm that the actual patient is on the main patient support surface and the auxiliary patient support surfaces (or at least placed back on the expandable patient support 40). Thus, the controller 86 displays at least one complete cycle of animation to instruct the user before the controller 86 seeks input from the user to confirm that the task has been completed. This input includes selection via the button 92f adjacent to a check mark image displayed by the controller 86. The user also has the option of initiating operation of the maximum inflation function via button 92e. The controller 86 initiates and displays one or more additional loops of the patient loading animation while waiting for the input from the user to confirm that the patient is on the main patient support surface and the auxiliary patient support surfaces (or at least placed back on the expandable patient support 40).

FIGS. 19A-19C, 20A-20C, and 21A-21C illustrate a predetermined sequence of graphical animations that the controller 86 generates on the display 90 to graphically instruct a user to perform a plurality of tasks after the user selects a width of 42 inches (e.g., a new width) on the user interface 88 in FIG. 13A (e.g., the current width is 36 inches) and before the controller 86 operates the fluid supply device 84 to expand the overall width of the expandable patient support 40 from the old width to the new width. The controller 86 instructs the user to perform the plurality of tasks by displaying each of the graphical animations of the predetermined sequence completely at least once before the controller 86 operates the fluid supply device 84 to expand the overall width of the expandable patient support 40.

Figure 19A:
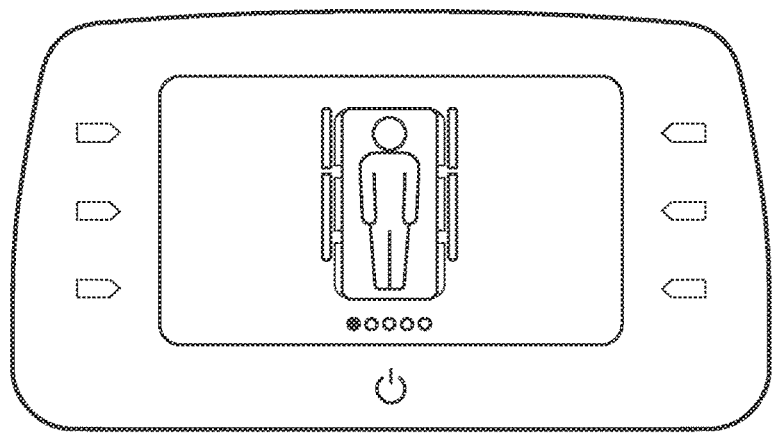
FIGS. 19A-19C illustrate a patient offloading animation displayed on the user interface in preparation for expanding the expandable patient support, for example, from 36 inches to 42 inches.
Figure 19B:
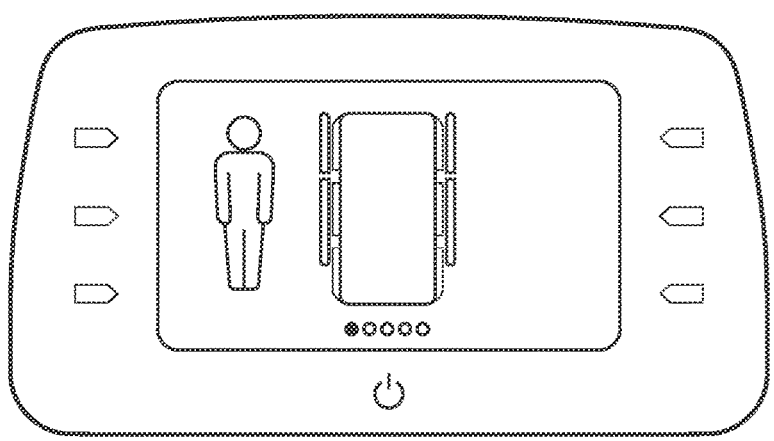
Figure 19C:
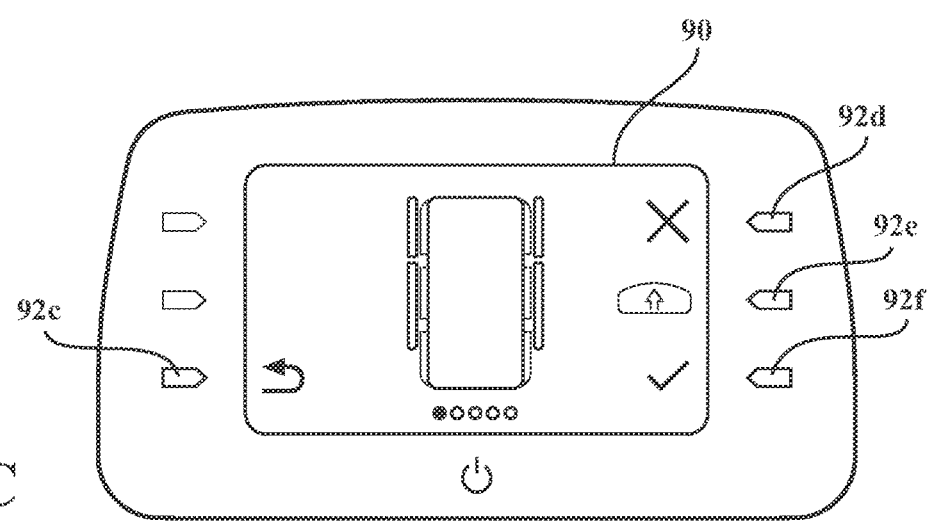

Referring to FIGS. 19A-19C, the predetermined sequence of graphical animations includes a patient offloading animation to instruct the user to move the patient off the main patient support surface of the main patient support section 62. The patient offloading animation starts in FIG. 19A with the controller 86 displaying a patient image representing a patient on the main patient support surface. The controller 86, then animates the patient image by displaying one or more patient images in sequence at varying distances from the main patient support surface until the patient image is depicted off the main patient support surface, as shown in FIG. 19B. After the patient image is depicted off the main patient support surface, and at least one complete cycle of the patient offloading animation is fully executed and displayed, the controller 86 prompts the user for input, to confirm that the actual patient is off the main patient support surface. Thus, the controller 86 displays at least one complete cycle of animation to instruct the user before the controller 86 seeks input from the user to confirm that the task has been completed. This input includes selection via the button 92f adjacent to a check mark image displayed by the controller 86. Alternatively, the user can cancel the operation by selecting button 92d adjacent to the image of an X displayed by the controller 86. The user also has the option of initiating operation of the maximum inflation function via button 92e. The controller 86 initiates and displays one or more additional loops of the patient offloading animation while waiting for the input from the user to confirm that the patient is off the main patient support surface.

Figure 20A:
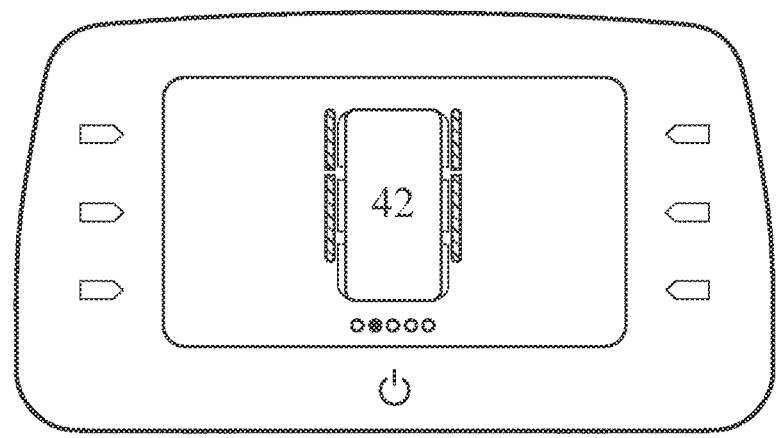
FIGS. 20A-20C illustrate a deck expansion animation displayed on the user interface in preparation for expanding the expandable patient support, for example, from 36 inches to 42 inches.
Figure 20B:
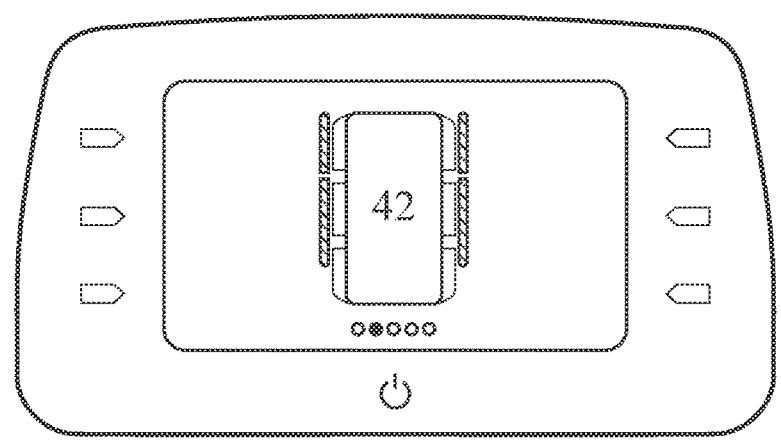
Figure 20C:
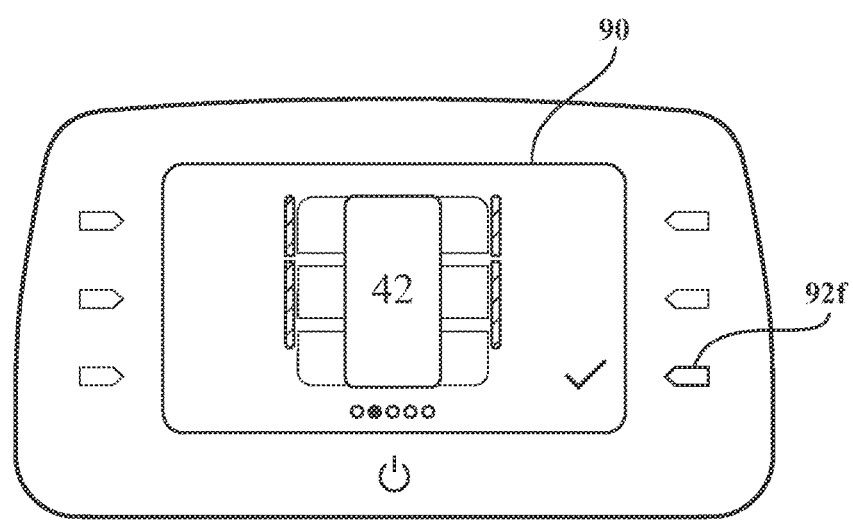

Referring to FIGS. 20A-20C, the predetermined sequence of graphical animations includes a deck expansion animation to instruct the user to expand the deck sections 41, 43, 45, 47 (see FIG. 2) of the patient support deck 38 (e.g., part of the litter) to accommodate the expandable patient support 40 once at the new width. The deck expansion animation starts in FIG. 20A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence at varying degrees of expansion (e.g., see FIG. 20B) until the deck/side rail image illustrates complete expansion of the patient support deck 38 and side rails 54, 56, 58, 60, as shown in FIG. 20C. After the deck/side rail image is depicted as being completely expanded, and at least one complete cycle of the deck expansion animation is fully executed and displayed, the controller 86 prompts the user for input, to confirm that the actual deck sections 41, 43, 45, 47 and associated side rails 54, 56, 58, 60 have been expanded to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92f adjacent to a check mark image displayed by the controller 86. The controller 86 initiates and displays one or more additional loops of the deck expansion animation while waiting for the input from the user to confirm that the deck sections 41, 43, 45, 47 and side rails 54, 56, 58, 60 have been expanded to their required widths.

Figure 21A:
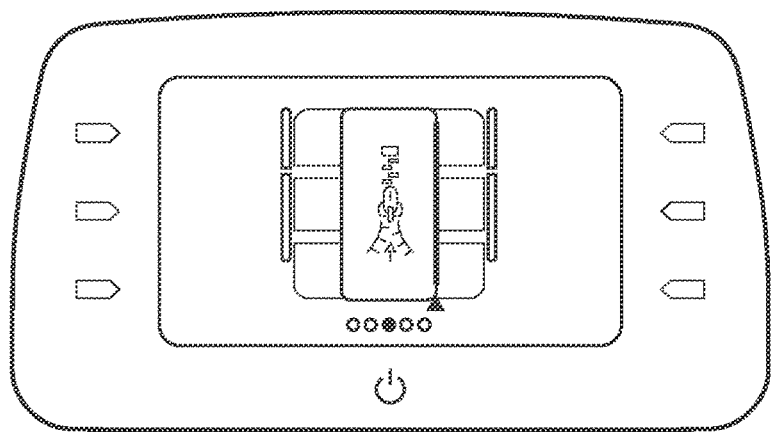
FIGS. 21A-21C illustrate a fastener release animation displayed on the user interface in preparation for expanding the expandable patient support, for example, from 36 inches to 42 inches.
Figure 21B:
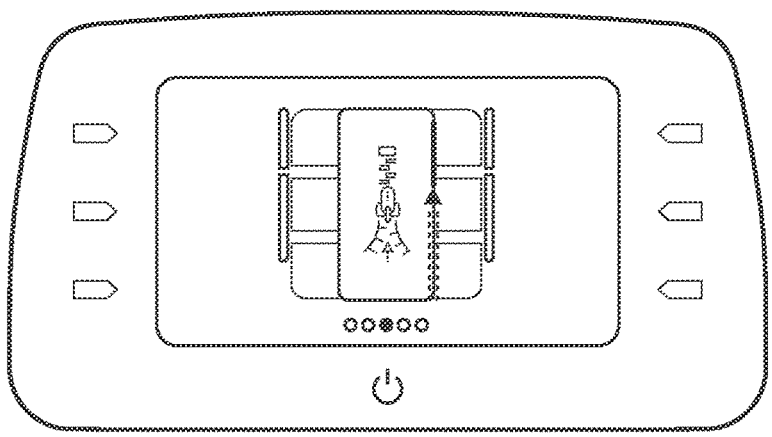
Figure 21C:
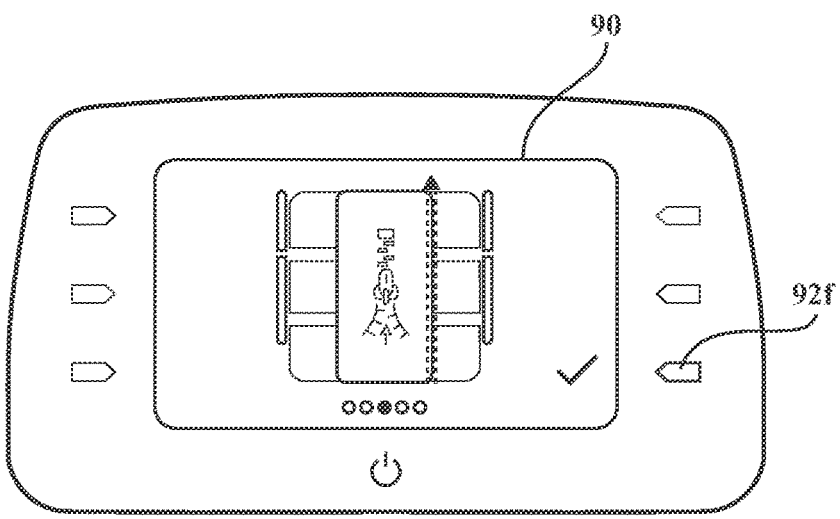

Referring to FIGS. 21A-21C, the predetermined sequence of graphical animations includes a fastener release animation to instruct the user to release the one or more fastening elements 78 to allow the auxiliary patient support sections 68, 70 to expand away from the main patient support section 62. The fastener release animation starts in FIG. 20A with the controller 86 displaying a plurality of fastening element images representing the current state of the fastening elements 78. For instance, the images represent a zipper on one side of the main patient support section 62 (see orange line and zipper slider of the zipper represented as an orange triangle). The images also include an image depicting the teeth of the zipper being released (see arrow) and the zipper slider in more detail (centrally located). The controller 86, then animates the plurality of fastening element images by displaying the plurality of fastening element images in sequence at varying degrees of release (e.g., see FIG. 21B) until the fastening element images illustrate complete release of the auxiliary patient support section 70, as shown in FIG. 21C. More specifically, the orange line representing the zipper in its engaged state on the one side of the main patient support section 62 transitions from an orange, solid line, to a green dotted line in the sequence of images to show releasing of the zipper. Also, the more detailed images of the teeth of the zipper are depicted in different positions in each sequential image so that it appears to the user that the zipper slider is moving to unzip the zipper. After the fastening element images are depicted as being completely released, and at least one complete cycle of the fastener release animation is fully executed and displayed, the controller 86 prompts the user for input, to confirm that the actual fastening elements 78 have been released. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user may also have the option of returning to the width selection menu via button 92*c* (see FIG. 16C, for example). The controller 86 initiates and displays one or more additional loops of the fastener release animation while waiting for the input from the user to confirm that the fastening elements 78 have been released.

Figure 22A:
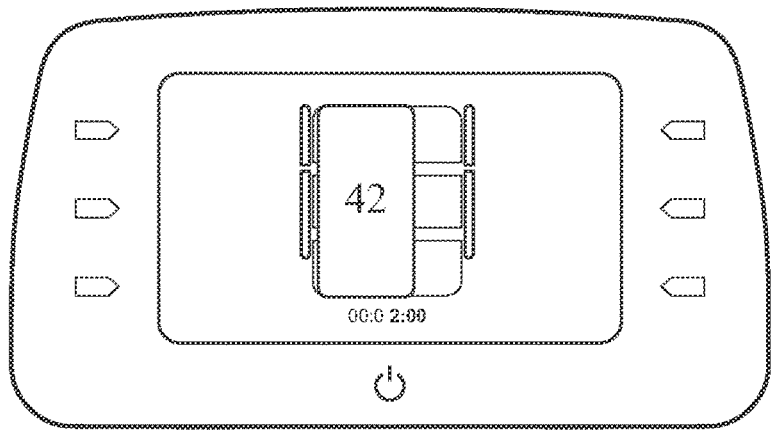
FIGS. 22A-22C illustrate an auxiliary section expansion animation displayed on the user interface when expanding the expandable patient support, for example, from 36 inches to 42 inches.
Figure 22B:
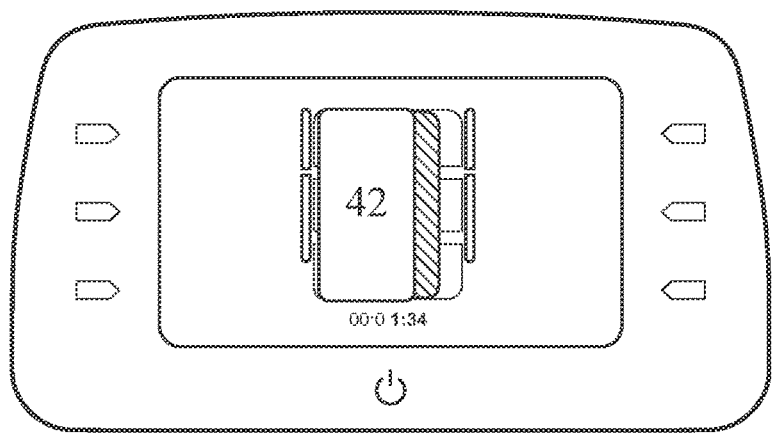
Figure 22C:
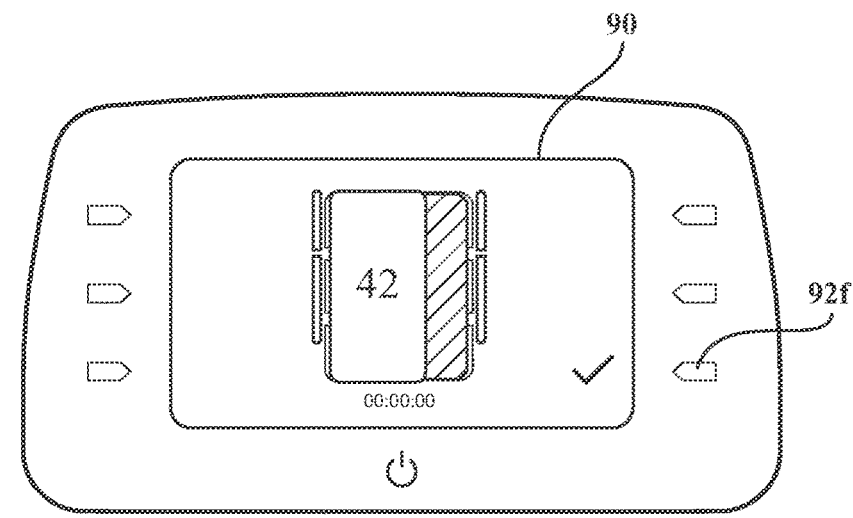

Referring to FIGS. 22A-22C, the controller 86 is programmed to also display an auxiliary section expansion animation to graphically depict expansion of the second auxiliary patient support section 70 away from the main patient support section 62. The deck expansion animation starts in FIG. 22A with the controller 86 displaying an expandable patient support image representing the current state of the expandable patient support 40 (e.g., at 36 inches). The controller 86, then animates the expandable patient support image by displaying one or more auxiliary patient support section images in sequence at varying degrees of expansion (e.g., see FIG. 22B) until the auxiliary patient support section images illustrate expansion of the expandable patient support 40 to the new width, as shown in FIG. 22C. After the expandable patient support 40 image is depicted as being expanded to the new width, and at least one complete cycle of the auxiliary section expansion animation is fully executed and displayed, the controller 86 prompts the user for input, to confirm that the second auxiliary patient support section 70 is fully expanded away from the main patient support section 62. This input includes selection via the button 92*f* adjacent to a check mark image displayed by the controller 86. The controller 86 initiates and displays one or more additional loops of the auxiliary section expansion animation while waiting for the input from the user to confirm that the second auxiliary patient support section 70 has been expanded to its required width.

Figure 23A:
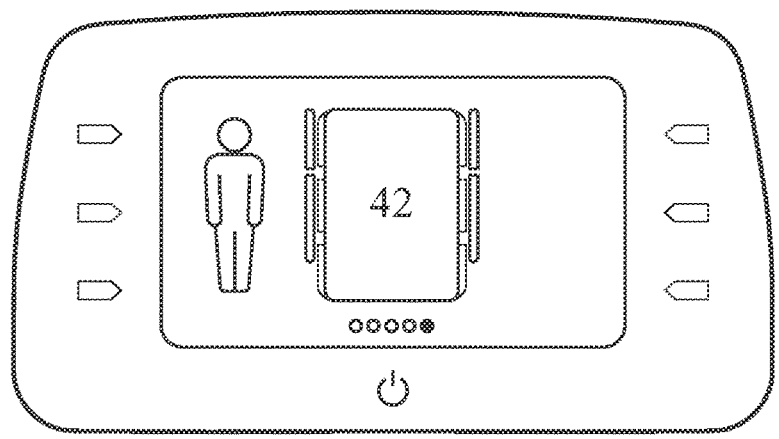
FIGS. 23A-23C illustrate a patient loading animation displayed on the user interface after expanding the expandable patient support, for example, from 36 inches to 42 inches.
Figure 23B:
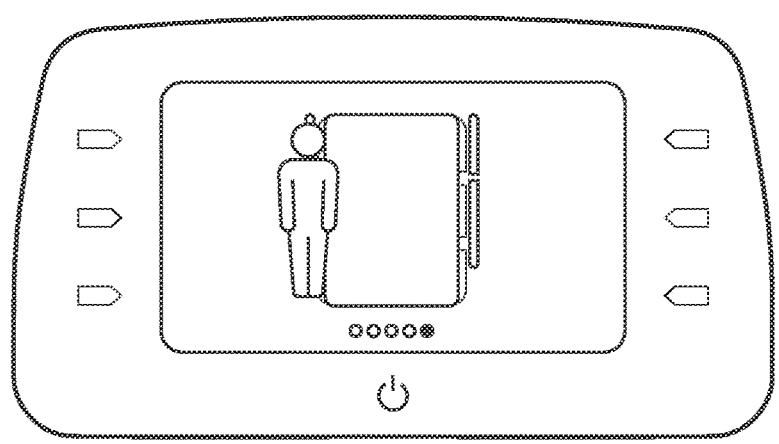
Figure 23C:
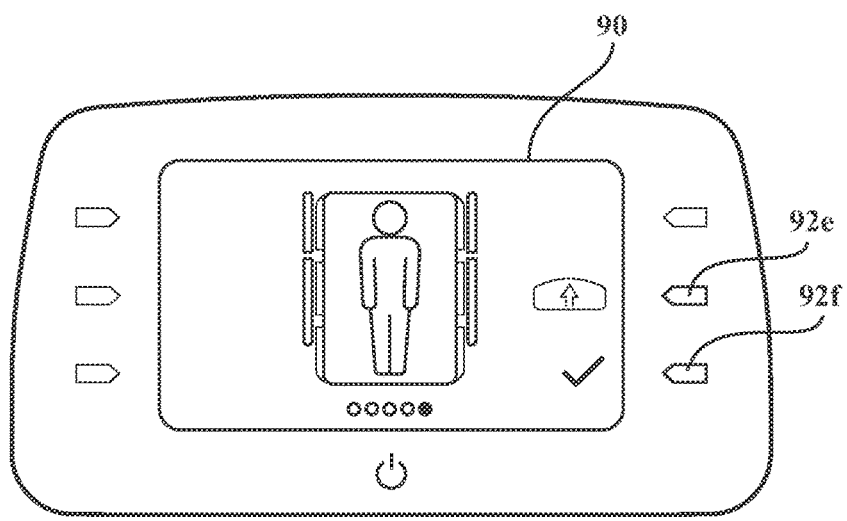

Referring to FIGS. 23A-23C, the controller 86 is programmed to also display a patient loading animation to instruct the user to move the patient onto the main patient support surface of the main patient support section 62 and the second auxiliary patient support surface of the second auxiliary patient support section 70 after the controller 86 operates the fluid supply device 84 to expand the overall width of the expandable patient support 40 from the original width to the new width. The patient loading animation starts in FIG. 23A with the controller 86 displaying a patient image representing a patient off the main patient support surface and off the second auxiliary patient support surface. The controller 86, then animates the patient image by displaying one or more patient images in sequence at varying distances from the main patient support surface and the second auxiliary patient support surface until the patient image is depicted on the main patient support surface and the second auxiliary patient support surface, as shown in FIG. 23C (note that the main patient support surface and the second auxiliary patient support surface are represented as a single surface in the images of FIGS. 23A-23C). After the patient image is depicted on the main patient support surface and the second auxiliary patient support surface (or at least placed back on the expandable patient support 40), and at least one complete cycle of the patient loading animation is fully executed and displayed, the controller 86 prompts the user for input, to confirm that the actual patient is on the main patient support surface and the second auxiliary patient support surface (or at least placed back on the expandable patient support 40). Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user also has the option of initiating operation of the maximum inflation function via button 92*e*. The controller 86 initiates and displays one or more additional loops of the patient loading animation while waiting for the input from the user to confirm that the patient is on the main patient support surface and the second auxiliary patient support surface (or at least placed back on the expandable patient support 40).

FIGS. 24A-24C, 25A-25C, and 26A-26C illustrate a predetermined sequence of graphical animations that the controller 86 generates on the display 90 to graphically instruct a user to perform a plurality of tasks after the user selects a width of 48 inches (e.g., a new width) on the user interface 88 in FIG. 13B (e.g., the current width is 42 inches) and before the controller 86 operates the fluid supply device 84 to expand the overall width of the expandable patient support 40 from the old width to the new width. The controller 86 instructs the user to perform the plurality of tasks by displaying each of the graphical animations of the predetermined sequence completely at least once before the controller 86 operates the fluid supply device 84 to expand the overall width of the expandable patient support 40.

Figure 24A:
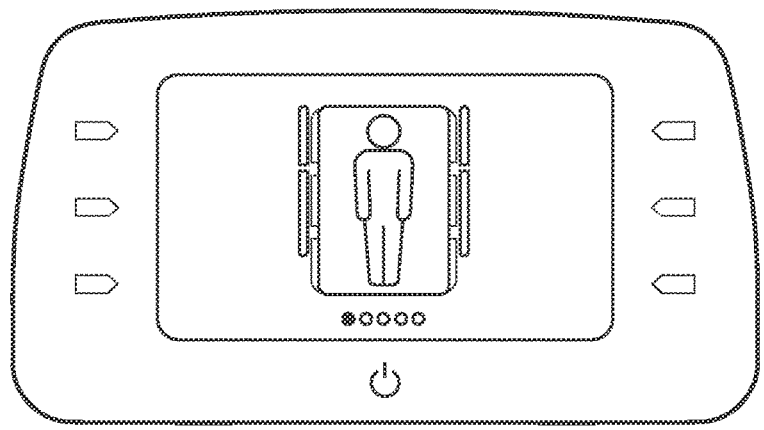
FIGS. 24A-24C illustrate a patient offloading animation displayed on the user interface in preparation for expanding the expandable patient support, for example, from 42 inches to 48 inches.
Figure 24B:
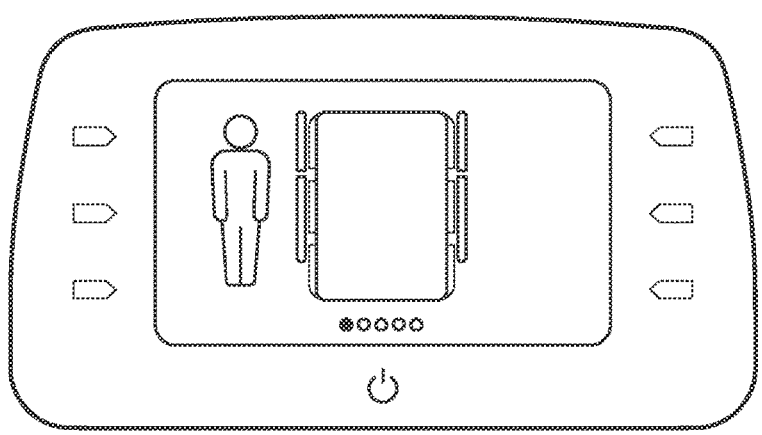
Figure 24C:
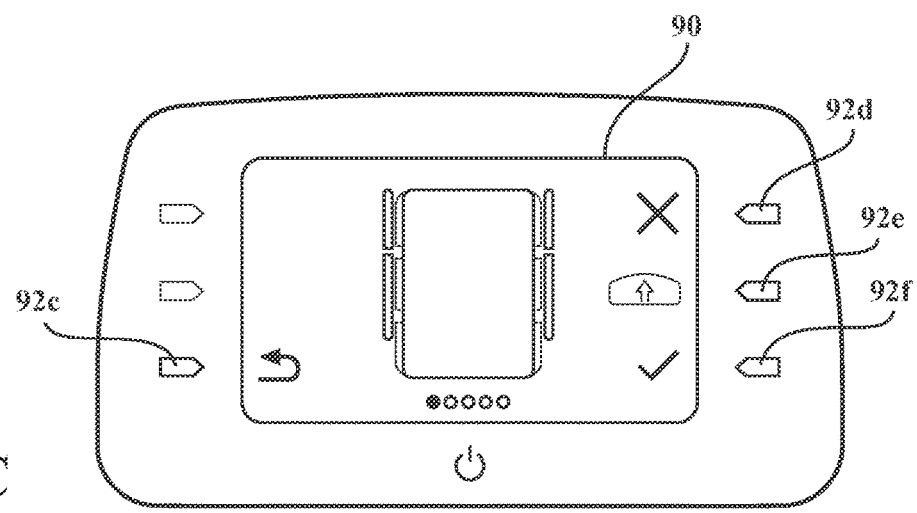

Referring to FIGS. 24A-24C, the predetermined sequence of graphical animations includes a patient offloading animation to instruct the user to move the patient off the main patient support surface of the main patient support section 62 and off the second auxiliary patient support surface of the second auxiliary patient support section 70. The patient offloading animation starts in FIG. 24A with the controller 86 displaying a patient image representing a patient on the main patient support surface and the second auxiliary patient support surface. The controller 86, then animates the patient image by displaying one or more patient images in sequence at varying distances from the main patient support surface and the second auxiliary patient support surface until the patient image is depicted off the main patient support surface and the second auxiliary patient support surface, as shown in FIG. 24B. After the patient image is depicted off the main patient support surface and the second auxiliary patient support surface, and at least one complete cycle of the patient offloading animation is fully executed and displayed, the controller 86 prompts the user for input, to confirm that the actual patient is off the main patient support surface and the second auxiliary patient support surface. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. Alternatively, the user can cancel the operation by selecting button 92*d* adjacent to the image of an X displayed by the controller 86. The user also has the option of initiating operation of the maximum inflation function via button 92*e*. The controller 86 initiates and displays one or more additional loops of the patient offloading animation while waiting for the input from the user to confirm that the patient is off the main patient support surface and the second auxiliary patient support surface.

Figure 25A:
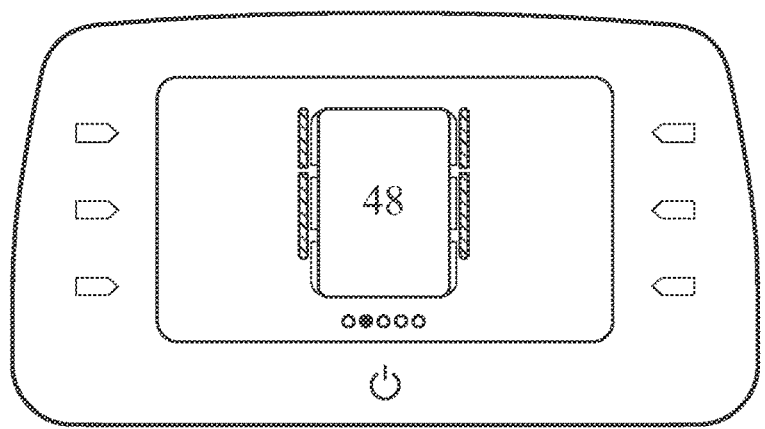
FIGS. 25A-25C illustrate a deck expansion animation displayed on the user interface in preparation for expanding the expandable patient support, for example, from 42 inches to 48 inches.
Figure 25B:
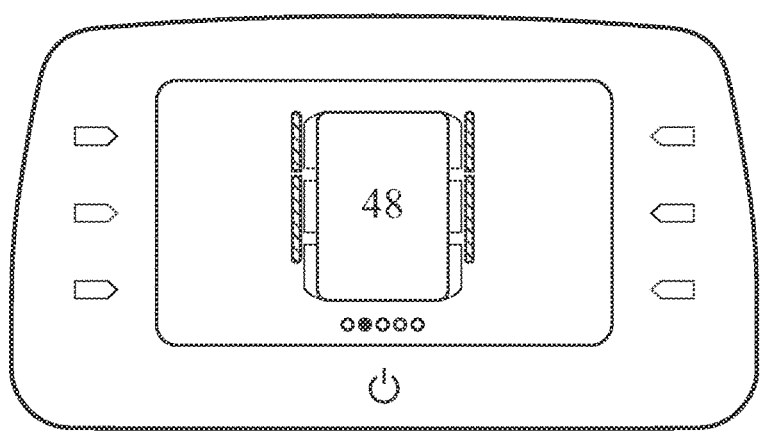
Figure 25C:
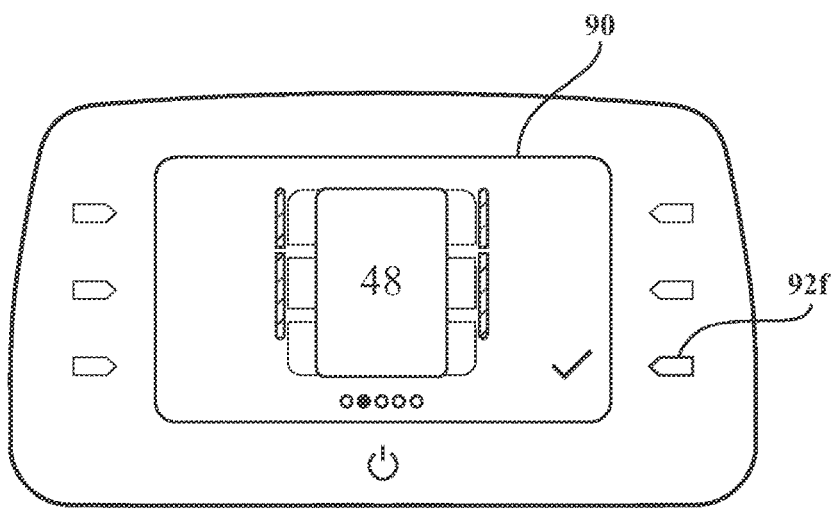

Referring to FIGS. 25A-25C, the predetermined sequence of graphical animations includes a deck expansion animation to instruct the user to expand the deck sections 41, 43, 45, 47 (see FIG. 2) of the patient support deck 38 (e.g., part of the litter) to accommodate the expandable patient support 40 once at the new width. The deck expansion animation starts in FIG. 25A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence at varying degrees of expansion (e.g., see FIG. 25B) until the deck/side rail image illustrates complete expansion of the patient support deck 38 and side rails 54, 56, 58, 60, as shown in FIG. 25C. After the deck/side rail image is depicted as being completely expanded, and at least one complete cycle of the deck expansion animation is fully executed and displayed, the controller 86 prompts the user for input, to confirm that the actual deck sections 41, 43, 45, 47 and associated side rails 54, 56, 58, 60 have been expanded to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The controller 86 initiates and displays one or more additional loops of the deck expansion animation while waiting for the input from the user to confirm that the deck sections 41, 43, 45, 47 and side rails 54, 56, 58, 60 have been expanded to their required widths.

Figure 26A:
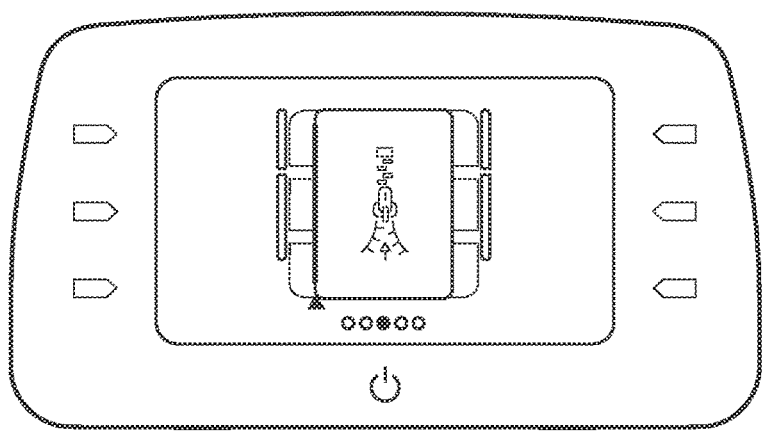
FIGS. 26A-26C illustrate a fastener release animation displayed on the user interface in preparation for expanding the expandable patient support, for example, from 42 inches to 48 inches.
Figure 26B:
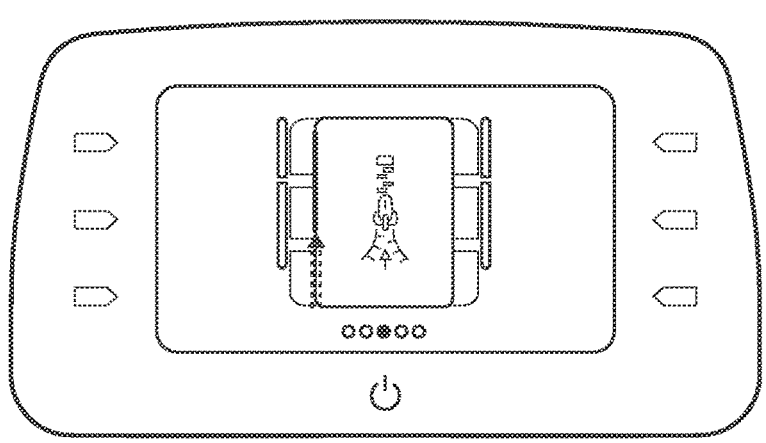
Figure 26C:
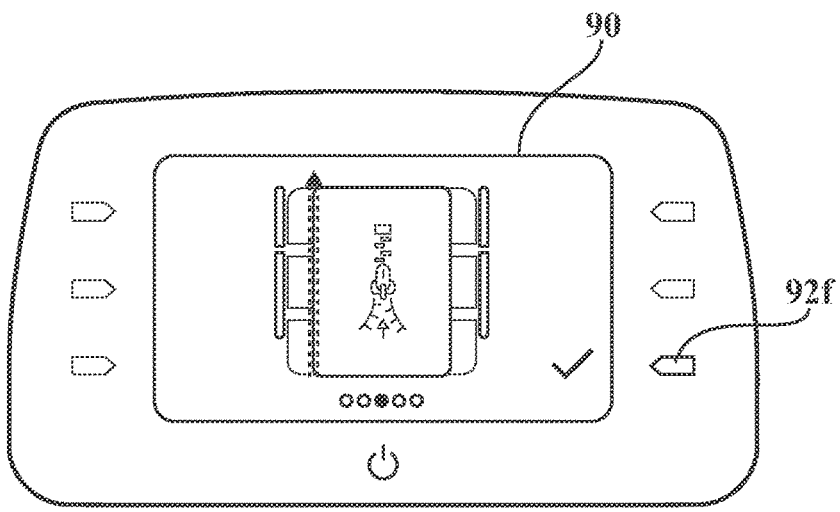

Referring to FIGS. 26A-26C, the predetermined sequence of graphical animations includes a fastener release animation to instruct the user to release the one or more fastening elements 78 to allow the first auxiliary patient support section 68 to expand away from the main patient support section 62. Note that the second auxiliary patient support section 70 was already expanded to reach the original size of 42 inches. It should be appreciated that the terms "first" and "second" do not refer to any order of expansion, but is merely used for convenience to distinguish between the two expandable auxiliary sections 68, 70, which may be identical, yet on opposing sides of the main patient support section 62, or may have different configurations. The fastener release animation starts in FIG. 26A with the controller 86 displaying a plurality of fastening element images representing the current state of the fastening elements 78. For instance, the images represent a zipper on one side of the main patient support section 62 (see orange line and zipper slider of the zipper represented as an orange triangle). The images also include an image depicting the teeth of the zipper being released (see arrow) and the zipper slider in more detail (centrally located). The controller 86, then animates the plurality of fastening element images by displaying the plurality of fastening element images in sequence at varying degrees of release (e.g., see FIG. 26B) until the fastening element images illustrate complete release of the first auxiliary patient support section 68, as shown in FIG. 26C. More specifically, the orange line representing the zipper in its engaged state on the one side of the main patient support section 62 transitions from an orange, solid line, to a green dotted line in the sequence of images to show releasing of the zipper. Also, the more detailed images of the teeth of the zipper are depicted in different positions in each sequential image so that it appears to the user that the zipper slider is moving to unzip the zipper. After the fastening element images are depicted as being completely released, and at least one complete cycle of the fastener release animation is fully executed and displayed, the controller 86 prompts the user for input, to confirm that the actual fastening elements 78 have been released. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user may also have the option of returning to the width selection menu via button 92*c* (see FIG. 26). The controller 86 initiates and displays one or more additional loops of the fastener release animation while waiting for the input from the user to confirm that the fastening elements 78 have been released.

Figure 27A:
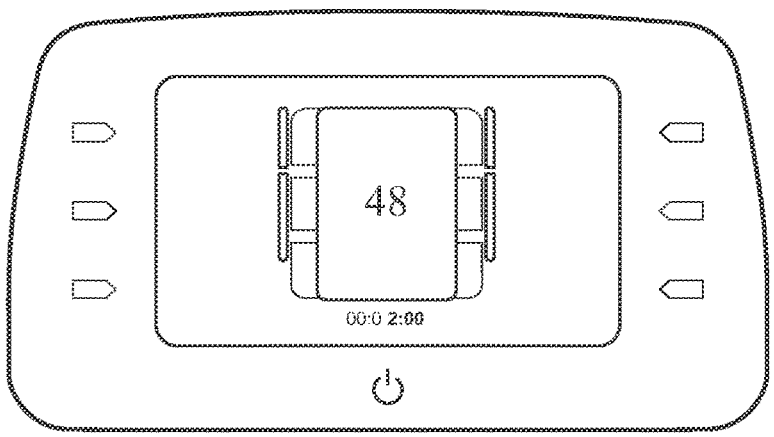
FIGS. 27A-27C illustrate an auxiliary section expansion animation displayed on the user interface when expanding the expandable patient support, for example, from 42 inches to 48 inches.
Figure 27B:
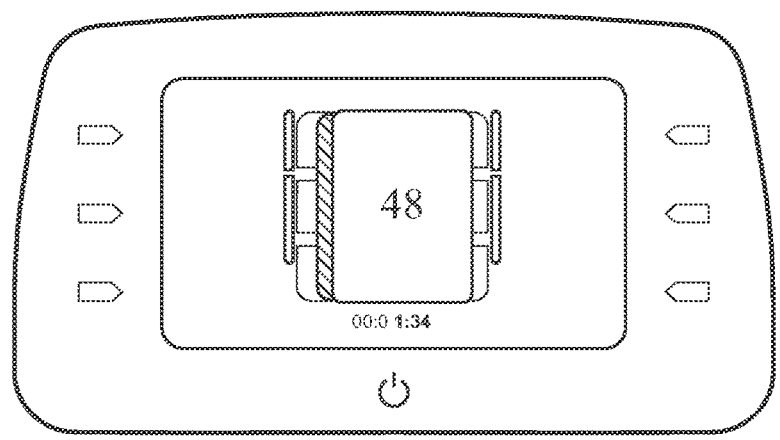
Figure 27C:
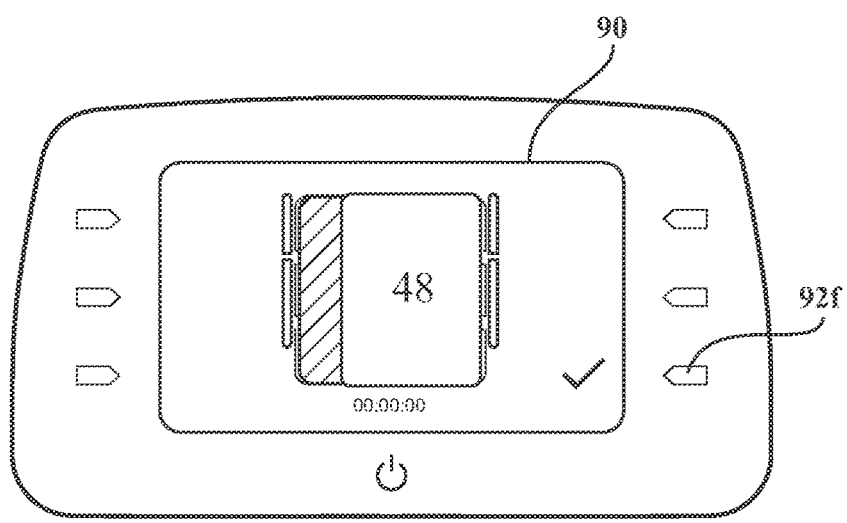

Referring to FIGS. 27A-27C, the controller 86 is programmed to also display an auxiliary section expansion animation to graphically depict expansion of the first auxiliary patient support section 68 away from the main patient support section 62. The deck expansion animation starts in FIG. 27A with the controller 86 displaying an expandable patient support image representing the current state of the expandable patient support 40 (e.g., at 42 inches with the second auxiliary patient support section 70 already expanded). The controller 86, then animates the expandable patient support image by displaying one or more auxiliary patient support section images in sequence at varying degrees of expansion (e.g., see FIG. 27B) until the auxiliary patient support section images illustrate expansion of the expandable patient support 40 to the new width, as shown in FIG. 27C. After the expandable patient support 40 image is depicted as being expanded to the new width, and at least one complete cycle of the auxiliary section expansion animation is fully executed and displayed, the controller 86 prompts the user for input, to confirm that the first auxiliary patient support section 68 is fully expanded away from the main patient support section 62. This input includes selection via the button 92*f* adjacent to a check mark image displayed by the controller 86. The controller 86 initiates and displays one or more additional loops of the auxiliary section expansion animation while waiting for the input from the user to confirm that the first auxiliary patient support section 68 has been expanded to its required width.

Figure 28A:
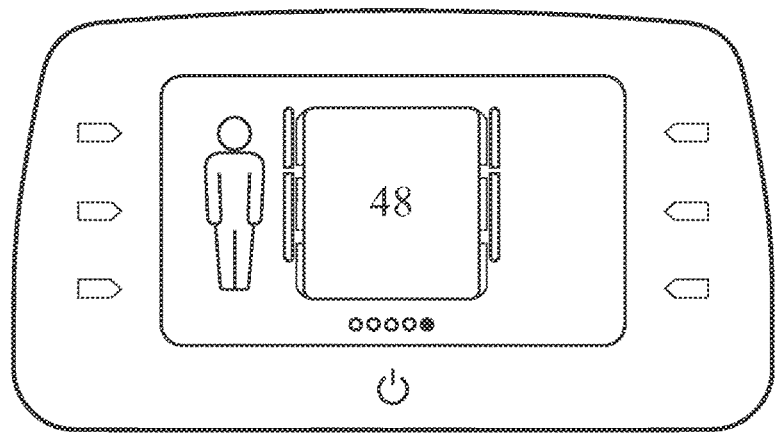
FIGS. 28A-28C illustrate a patient loading animation displayed on the user interface after expanding the expandable patient support, for example, from 42 inches to 48 inches.
Figure 28B:
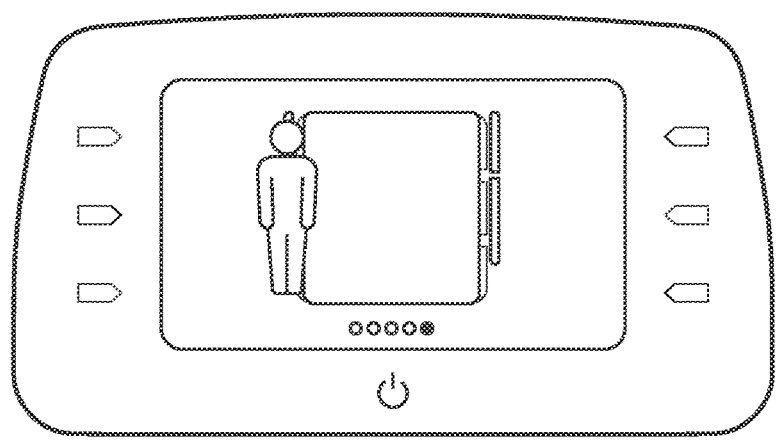
Figure 28C:
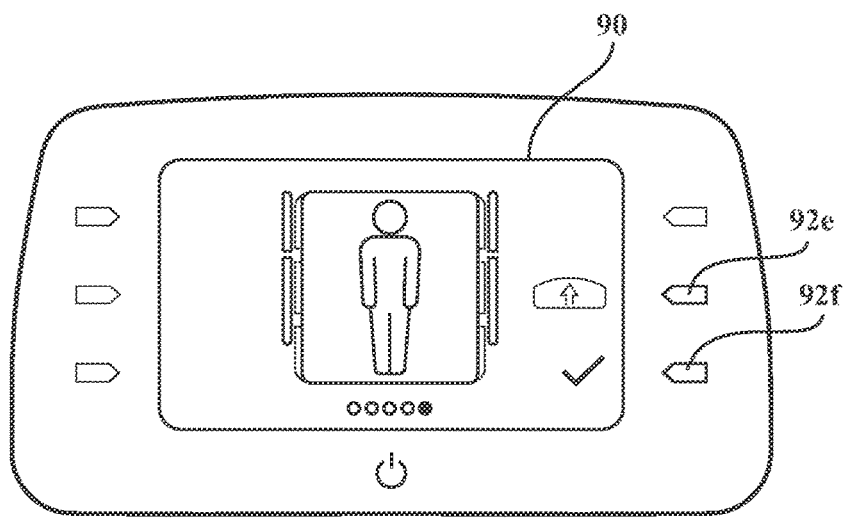

Referring to FIGS. 28A-28C, the controller 86 is programmed to also display a patient loading animation to instruct the user to move the patient onto the main patient support surface of the main patient support section 62 and the auxiliary patient support surfaces of the auxiliary patient support sections 68, 70 after the controller 86 operates the fluid supply device 84 to expand the overall width of the expandable patient support 40 from the original width to the new width. The patient loading animation starts in FIG. 28A with the controller 86 displaying a patient image representing a patient off the main patient support surface and off the auxiliary patient support surfaces. The controller 86, then animates the patient image by displaying one or more patient images in sequence at varying distances from the main patient support surface and the auxiliary patient support surfaces until the patient image is depicted on the main patient support surface and the auxiliary patient support surfaces, as shown in FIG. 28C (note that the main patient support surface and the auxiliary patient support surfaces are represented as a single surface in the images of FIGS. 28A-28C). After the patient image is depicted on the main patient support surface and the auxiliary patient support surfaces (or at least placed back on the expandable patient support 40), and at least one complete cycle of the patient loading animation is fully executed and displayed, the controller 86 prompts the user for input, to confirm that the actual patient is on the main patient support surface and the auxiliary patient support surfaces (or at least placed back on the expandable patient support 40). Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user also has the option of initiating operation of the maximum inflation function via button 92*e*. The controller 86 initiates and displays one or more additional loops of the patient loading animation while waiting for the input from the user to confirm that the patient is on the main patient support surface and the auxiliary patient support surfaces (or at least placed back on the expandable patient support 40).

The expandable patient support 40 is also collapsible, i.e., the auxiliary patient support sections 68, 70 are collapsible toward the opposing sides of the main patient support section 62 to reduce the overall width of the expandable patient support 40 from a current width. The controller 86 displays a second predetermined sequence of graphical animations on the display 90 to graphically instruct the user to perform a second plurality of tasks after the user selects a new, smaller width on the user interface 88. As with the first plurality of tasks, the controller 86 is configured to instruct the user to perform the second plurality of tasks by displaying each of the graphical animations of the second predetermined sequence completely at least once before the controller 86 seeks input that each of the second plurality of tasks was completed. FIGS. 29A-29C, 31A-31C, 32A-32C, and 33A-33C illustrate graphical animations that the controller 86 generates on the display 90 to graphically instruct the user to perform the second plurality of tasks after the user selects a width of 36 inches (e.g., a new width) on the user interface 88 in FIG. 13C (e.g., the current width is 48 inches).

Figure 29A:
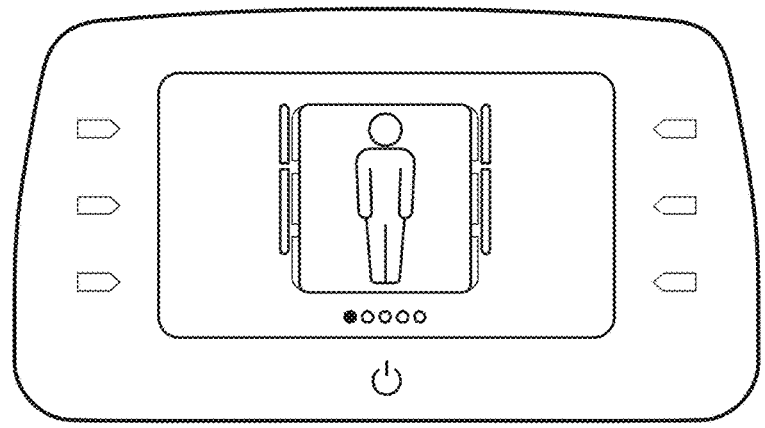
FIGS. 29A-29C illustrate a patient offloading animation displayed on the user interface in preparation for collapsing the expandable patient support, for example, from 48 inches to 36 inches.
Figure 29B:
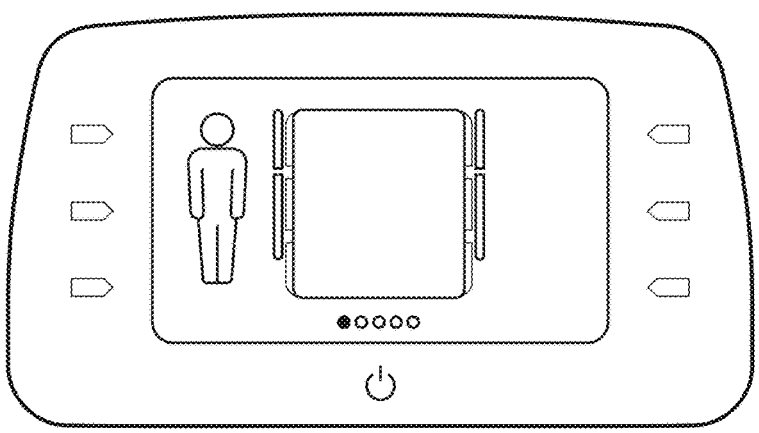
Figure 29C:
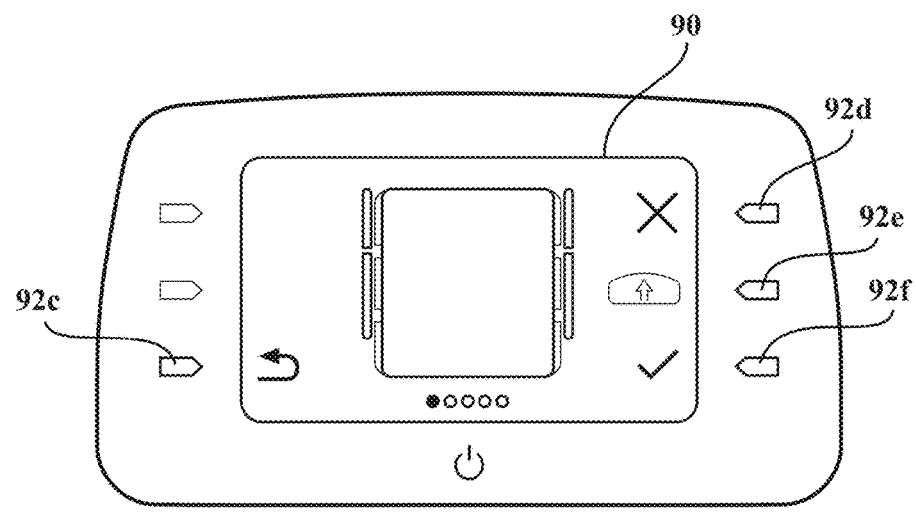

Referring to FIGS. 29A-29C, the second predetermined sequence of graphical animations includes a patient offloading animation to instruct the user to move the patient off the main patient support surface of the main patient support section 62 and off the auxiliary patient support surfaces of the auxiliary patient support sections 68, 70. The patient offloading animation starts in FIG. 29A with the controller 86 displaying a patient image representing a patient on the main patient support surface and the auxiliary patient support surfaces. The controller 86, then animates the patient image by displaying one or more patient images in sequence at varying distances from the main patient support surface and the auxiliary patient support surfaces until the patient image is depicted off the main patient support surface and the auxiliary patient support surfaces, as shown in FIG. 29B. After the patient image is depicted off the main patient support surface and the auxiliary patient support surfaces, and at least one complete cycle of the patient offloading animation is fully executed and displayed, the controller 86 prompts the user for input, to confirm that the actual patient is off the main patient support surface and the auxiliary patient support surfaces. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. Alternatively, the user can cancel the operation by selecting button 92*d* adjacent to the image of an X displayed by the controller 86. The user also has the option of initiating operation of the maximum inflation function via button 92*e*. The controller 86 initiates and displays one or more additional loops of the patient offloading animation while waiting for the input from the user to confirm that the patient is off the main patient support surface and the auxiliary patient support surfaces.

Figure 30A:
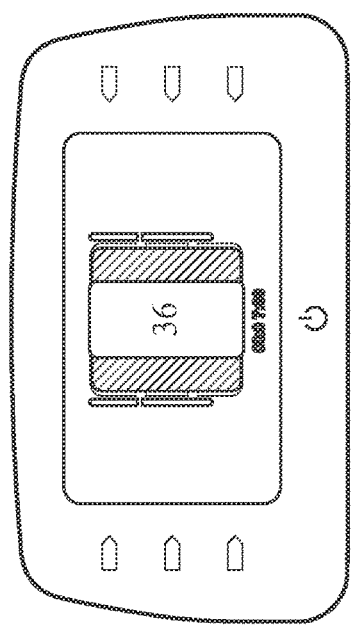
FIGS. 30A-30E illustrate an auxiliary section collapsing animation displayed on the user interface when collapsing the expandable patient support, for example, from 48 inches to 36 inches.
Figure 30B:
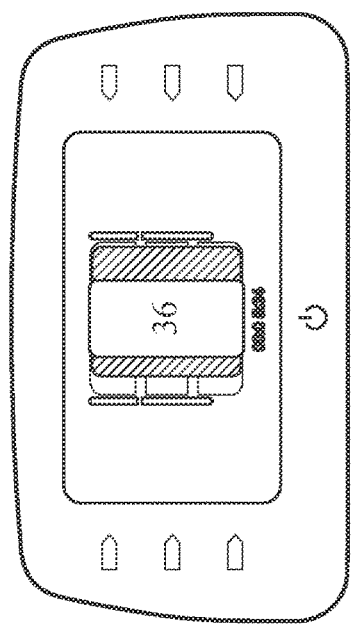
Figure 30C:
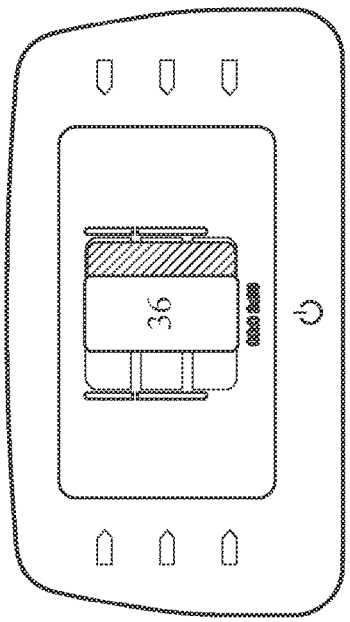
Figure 30D:
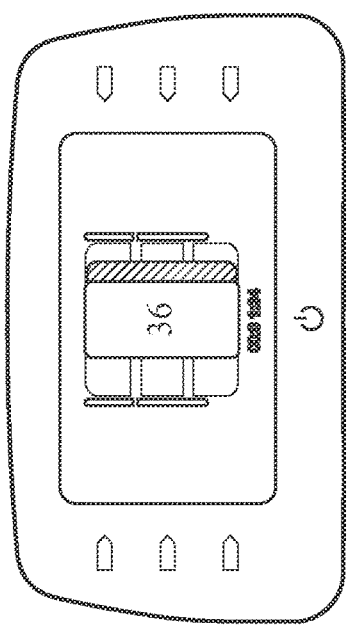
Figure 30E:
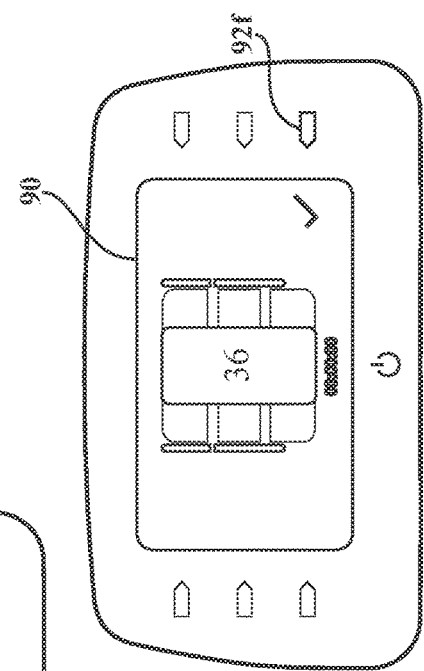

Referring to FIGS. 30A-30E, the controller 86 is programmed to also display an auxiliary section collapsing animation to graphically depict collapsing of the auxiliary patient support sections 68, 70 toward the main patient support section 62. The deck collapsing animation starts in FIG. 30A with the controller 86 displaying an expandable patient support image representing the current state of the expandable patient support 40 (e.g., at 48 inches). The controller 86, then animates the expandable patient support image by displaying one or more auxiliary patient support section images in sequence at varying degrees of collapsing (e.g., see FIGS. 30B-30D), until the auxiliary patient support section images illustrate complete collapsing of the expandable patient support 40, as shown in FIG. 30E. The controller 86 also displays elapsed time (e.g., from 7 minutes) during the animation. After the expandable patient support 40 image is depicted as being completely collapsed, and at least one complete cycle of the auxiliary section collapsing animation is fully executed and displayed, the controller 86 prompts the user for input, to confirm that the auxiliary patient support sections 68, 70 are fully collapsed toward the main patient support section 62. This input includes selection via the button 92*f* adjacent to a check mark image displayed by the controller 86. The controller 86 initiates and displays one or more additional loops of the auxiliary section collapsing animation while waiting for the input from the user to confirm that the auxiliary patient support sections 68, 70 have been collapsed to their required widths.

Figure 31A:
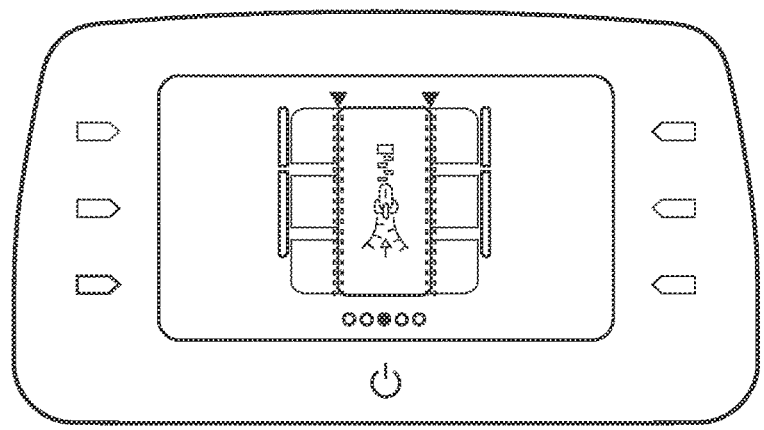
FIGS. 31A-31C illustrate a fastener engagement animation displayed on the user interface after collapsing the expandable patient support, for example, from 48 inches to 36 inches.
Figure 31B:
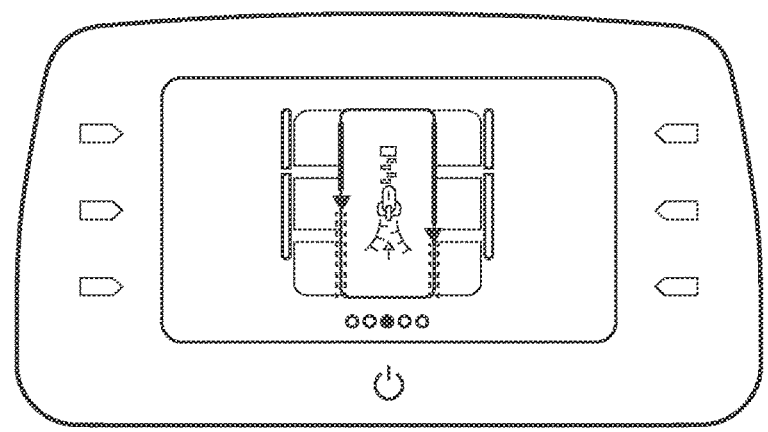
Figure 31C:
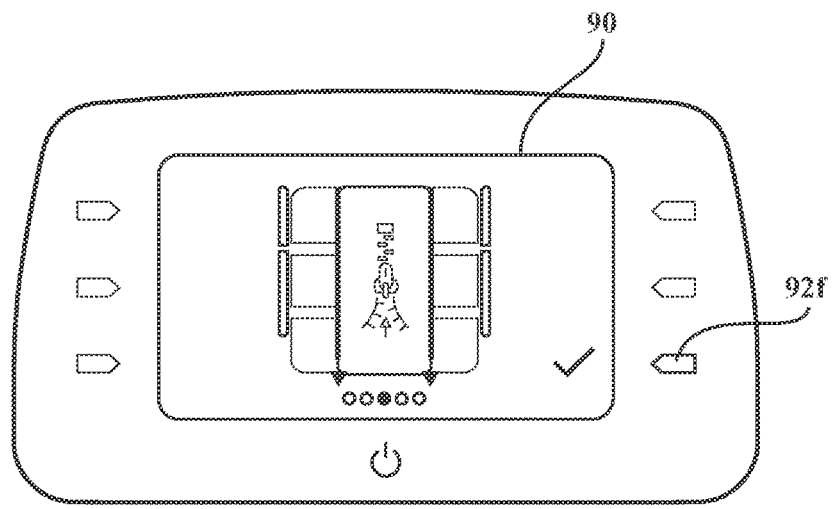

Referring to FIGS. 31A-31C, the second predetermined sequence of graphical animations includes a fastener engagement animation to instruct the user to engage the one or more fastening elements 78 to secure the auxiliary patient support sections 68, 70 to the main patient support section 62. The fastener engagement animation starts in FIG. 31A with the controller 86 displaying a plurality of fastening element images representing the current state of the fastening elements 78. For instance, the images represent the zippers on both the left and right sides of the main patient support section 62 (see orange lines and zipper sliders of the zippers represented as orange triangles). The images also include an image depicting the teeth of the zipper being engaged (see arrow) and the zipper slider in more detail (between the orange lines). The controller 86, then animates the plurality of fastening element images by displaying the plurality of fastening element images in sequence at varying degrees of engagement (e.g., see FIG. 31B) until the fastening element images illustrate complete engagement securing the auxiliary patient support sections 68, 70 to the main patient support section 62, as shown in FIG. 31C. More specifically, the orange lines representing the zippers in their released states on the left and right sides of the main patient support section 62 transition from orange, dotted lines, to green solid lines in the sequence of images to show engagement (closing) of the zippers. Also, the more detailed images of the teeth of the zipper are depicted in different positions in each sequential image so that it appears to the user that the zipper slider is moving to zip the zippers. After the fastening element images are depicted as being completely engaged, and at least one complete cycle of the fastener engagement animation is fully executed and displayed, the controller 86 prompts the user for input, to confirm that the actual fastening elements 78 have been engaged. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The controller 86 initiates and displays one or more additional loops of the fastener engagement animation while waiting for the input from the user to confirm that the fastening elements 78 have been engaged.

Figure 32A:
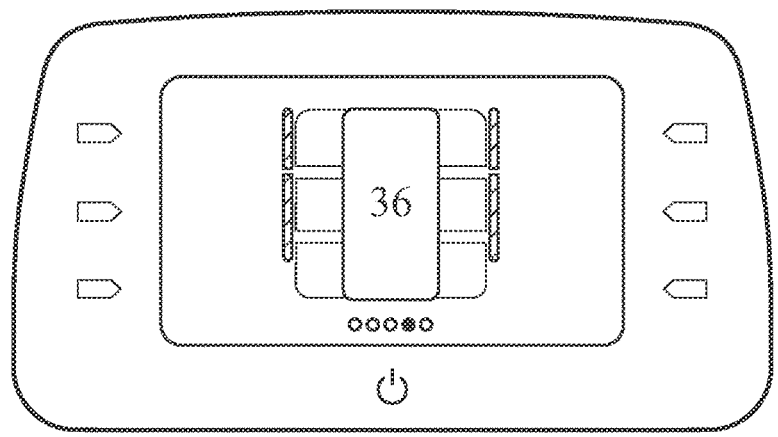
FIGS. 32A-32C illustrate a deck collapsing animation displayed on the user interface after collapsing the expandable patient support, for example, from 48 inches to 36 inches.
Figure 32B:
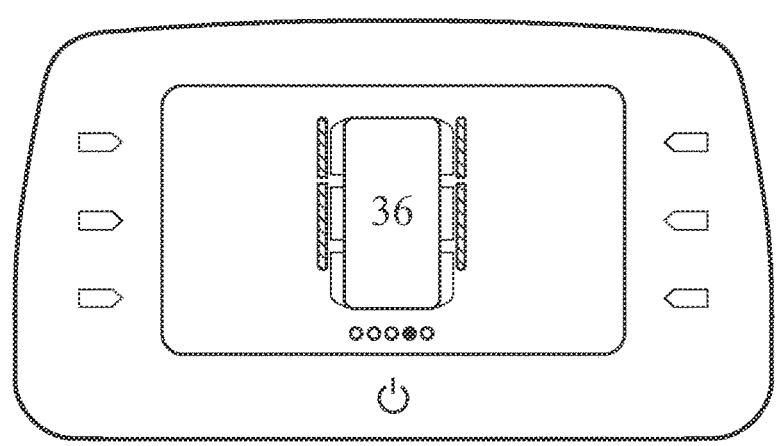
Figure 32C:
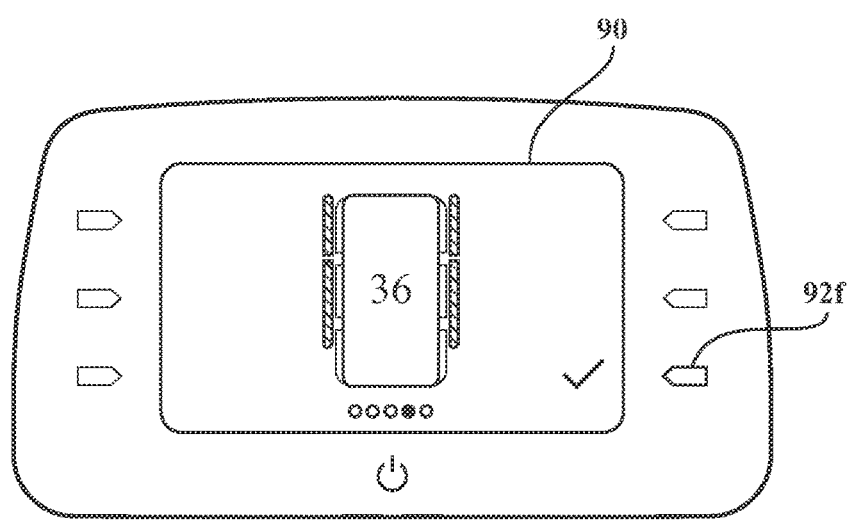

Referring to FIGS. 32A-32C, the second predetermined sequence of graphical animations includes a deck collapsing animation to instruct the user to collapse the deck sections 41, 43, 45, 47 (see FIG. 2) of the patient support deck 38 (e.g., part of the litter) to accommodate the expandable patient support 40 once at the new width. The deck collapsing animation starts in FIG. 32A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence at varying degrees of collapse (e.g., see FIG. 32B) until the deck/side rail image illustrates complete collapsing of the patient support deck 38 and side rails 54, 56, 58, 60, as shown in FIG. 32C. After the deck/side rail image is depicted as being completely collapsed, and at least one complete cycle of the deck collapsing animation is fully executed and displayed, the controller 86 prompts the user for input, to confirm that the actual deck sections 41, 43, 45, 47 and associated side rails 54, 56, 58, 60 have been collapsed to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The controller 86 initiates and displays one or more additional loops of the deck collapsing animation while waiting for the input from the user to confirm that the deck sections 41, 43, 45, 47 and side rails 54, 56, 58, 60 have been collapsed to their required widths.

Figure 33A:
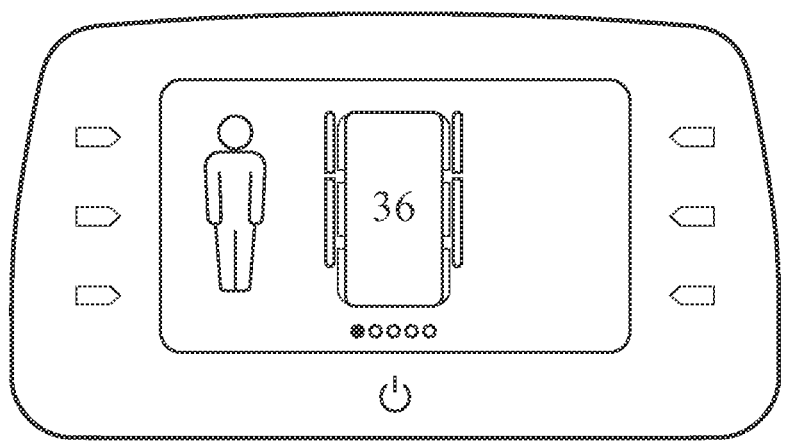
FIGS. 33A-33C illustrate a patient loading animation displayed on the user interface after collapsing the expandable patient support, for example, from 48 inches to 36 inches.
Figure 33B:
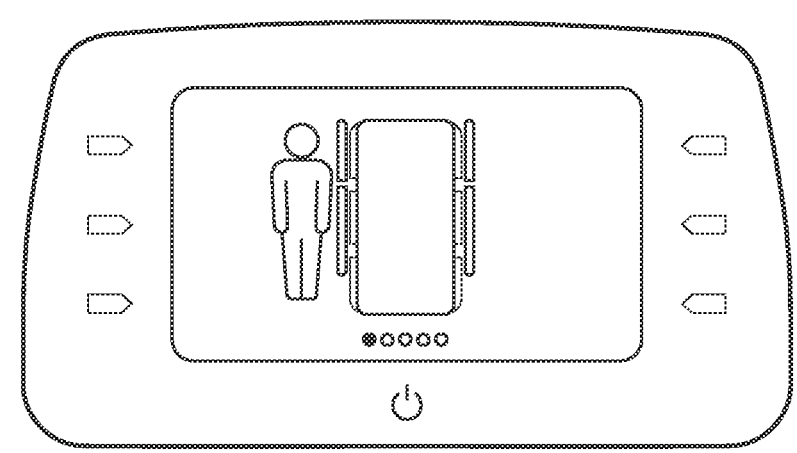
Figure 33C:
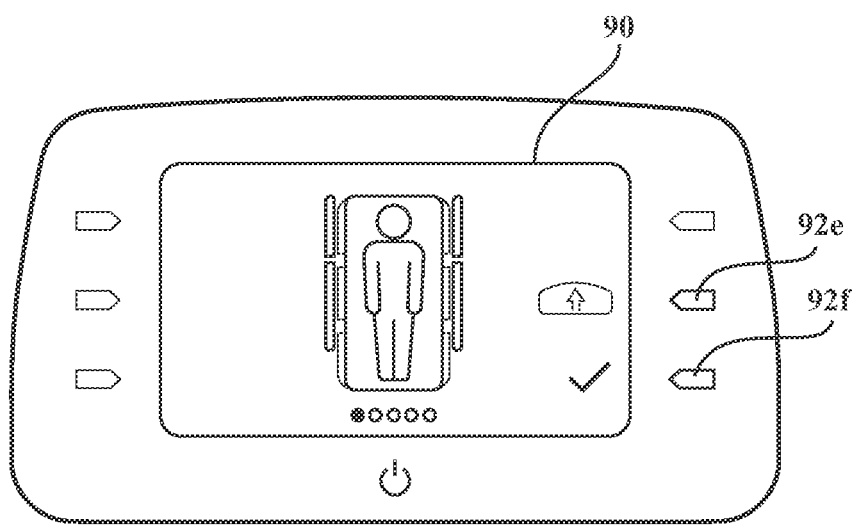

Referring to FIGS. 33A-33C, the second predetermined sequence of graphical animations includes a patient loading animation to instruct the user to move the patient onto the main patient support surface of the main patient support section 62 after the controller 86 operates the fluid supply device 84 to reduce the overall width of the expandable patient support 40 from the original width to the new width. The patient loading animation starts in FIG. 33A with the controller 86 displaying a patient image representing a patient off the main patient support surface. The controller 86, then animates the patient image by displaying one or more patient images in sequence at varying distances from the main patient support surface until the patient image is depicted on the main patient support surface, as shown in FIG. 33C. After the patient image is depicted on the main patient support surface, and at least one complete cycle of the patient loading animation is fully executed and displayed, the controller 86 prompts the user for input, to confirm that the actual patient is on the main patient support surface. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user also has the option of initiating operation of the maximum inflation function via button 92*e*. The controller 86 initiates and displays one or more additional loops of the patient loading animation while waiting for the input from the user to confirm that the patient is on the main patient support surface.

FIGS. 34A-34C, 36A-36C, 37A-37C, and 38A-38C illustrate graphical animations that the controller 86 generates on the display 90 to graphically instruct the user to perform the second plurality of tasks after the user selects a width of 42 inches (e.g., a new width) on the user interface 88 in FIG. 13C (e.g., the current width is 48 inches).

Figure 34A:
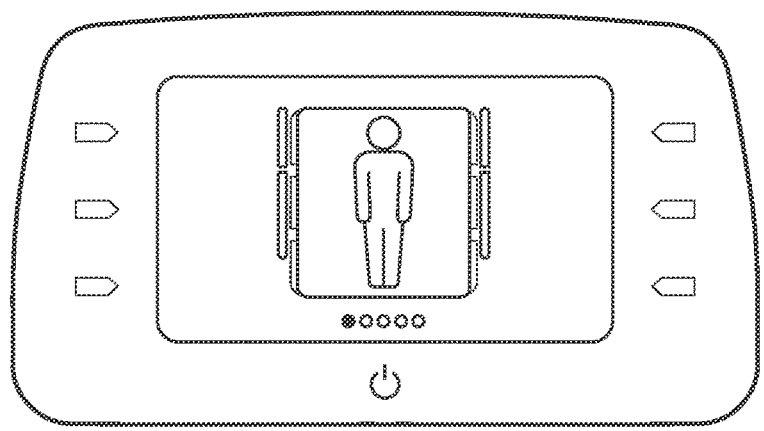
FIGS. 34A-34C illustrate a patient offloading animation displayed on the user interface in preparation for collapsing the expandable patient support, for example, from 48 inches to 42 inches.
Figure 34B:
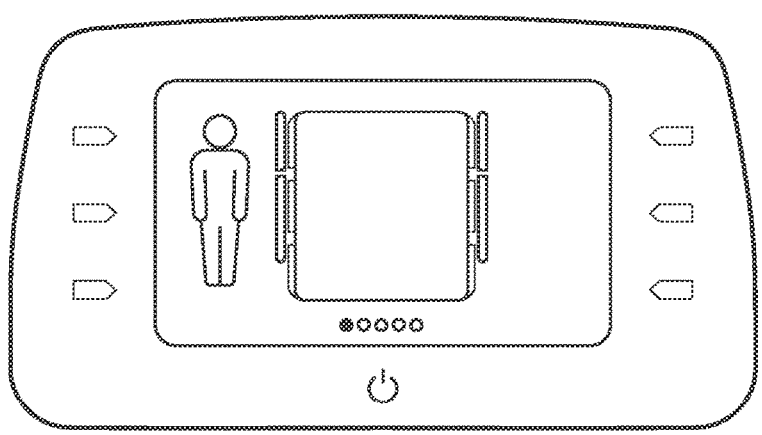
Figure 34C:
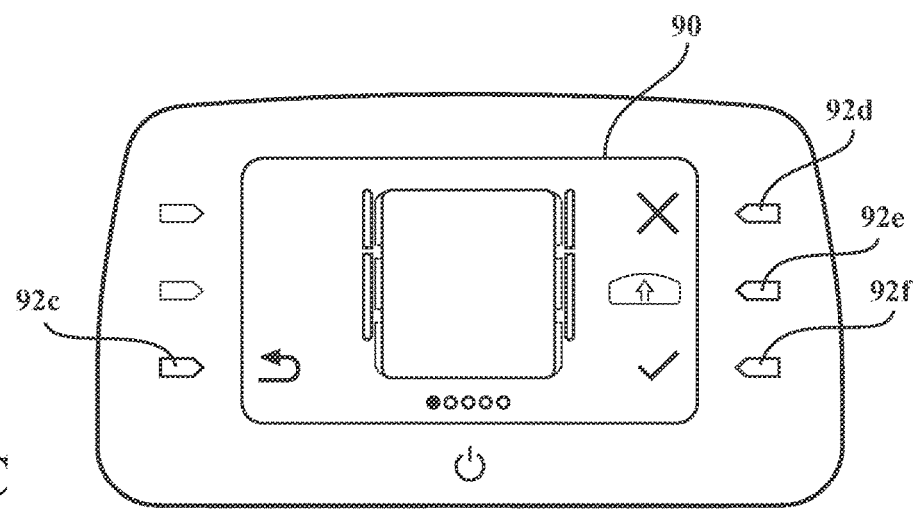

Referring to FIGS. 34A-34C, the second predetermined sequence of graphical animations includes a patient offloading animation to instruct the user to move the patient off the main patient support surface of the main patient support section 62 and off the auxiliary patient support surfaces of the auxiliary patient support sections 68, 70. The patient offloading animation starts in FIG. 34A with the controller 86 displaying a patient image representing a patient on the main patient support surface and the auxiliary patient support surfaces. The controller 86, then animates the patient image by displaying one or more patient images in sequence at varying distances from the main patient support surface and the auxiliary patient support surfaces until the patient image is depicted off the main patient support surface and the auxiliary patient support surfaces, as shown in FIG. 34B. After the patient image is depicted off the main patient support surface and the auxiliary patient support surfaces, and at least one complete cycle of the patient offloading animation is fully executed and displayed, the controller 86 prompts the user for input, to confirm that the actual patient is off the main patient support surface and the auxiliary patient support surfaces. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. Alternatively, the user can cancel the operation by selecting button 92*d* adjacent to the image of an X displayed by the controller 86. The user also has the option of initiating operation of the maximum inflation function via button 92*e*. The controller 86 initiates and displays one or more additional loops of the patient offloading animation while waiting for the input from the user to confirm that the patient is off the main patient support surface and the auxiliary patient support surfaces.

Figure 35A:
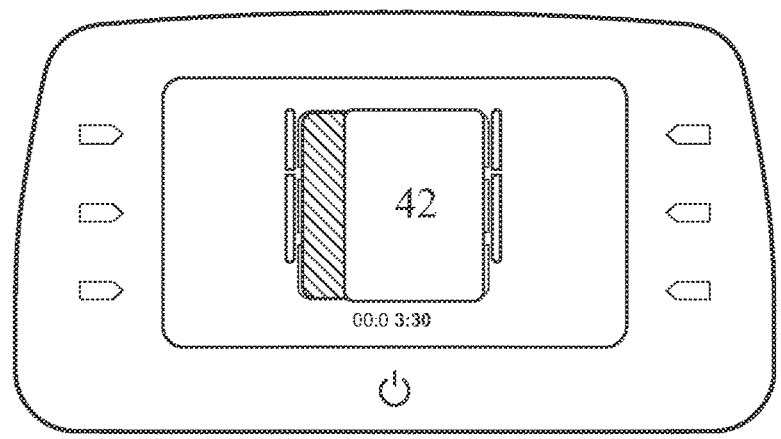
FIGS. 35A-35C illustrate an auxiliary section collapsing animation displayed on the user interface when collapsing the expandable patient support, for example, from 48 inches to 42 inches.
Figure 35B:
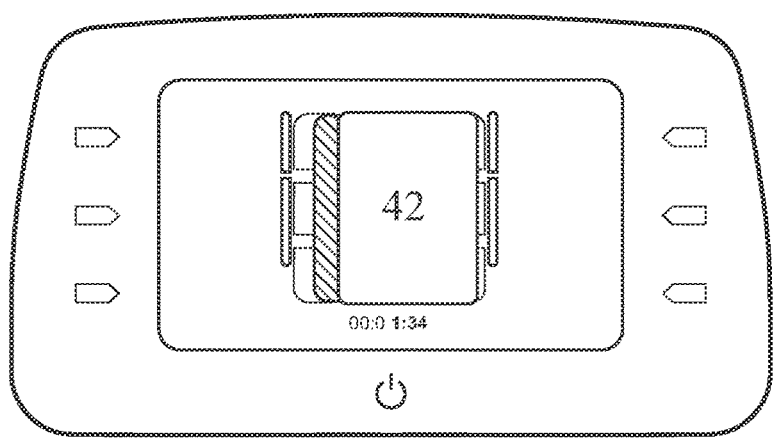
Figure 35C:
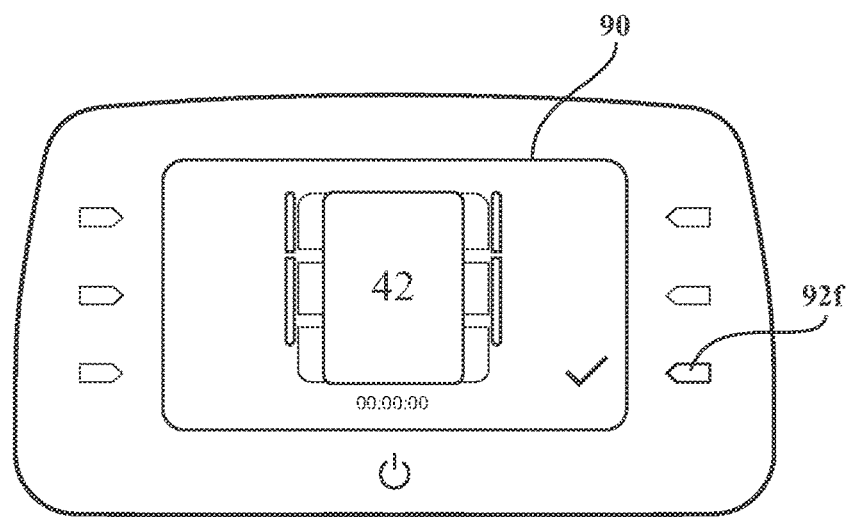

Referring to FIGS. 35A-35C, the controller 86 is programmed to also display an auxiliary section collapsing animation to graphically depict collapsing of the first auxiliary patient support section 68 toward the main patient support section 62. The deck collapsing animation starts in FIG. 35A with the controller 86 displaying an expandable patient support image representing the current state of the expandable patient support 40 (e.g., at 48 inches). The controller 86, then animates the expandable patient support image by displaying one or more auxiliary patient support section images in sequence at varying degrees of collapsing (e.g., see FIG. 35B) until the auxiliary patient support section images illustrate collapsing of the expandable patient support 40 to the new width, as shown in FIG. 35C. After the expandable patient support 40 image is depicted as being collapsed to the new width, and at least one complete cycle of the auxiliary section collapsing animation is fully executed and displayed, the controller 86 prompts the user for input, to confirm that the first auxiliary patient support section 68 is fully collapsed toward the main patient support section 62. This input includes selection via the button 92*f* adjacent to a check mark image displayed by the controller 86. The controller 86 initiates and displays one or more additional loops of the auxiliary section collapsing animation while waiting for the input from the user to confirm that the first auxiliary patient support section 68 has been collapsed to its required width. In this version, the second auxiliary patient support section 70 remains expanded.

Figure 36A:
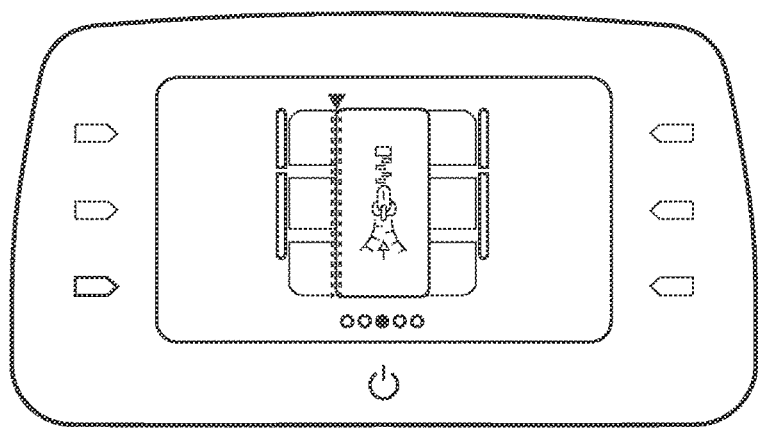
FIGS. 36A-36C illustrate a fastener engagement animation displayed on the user interface after collapsing the expandable patient support, for example, from 48 inches to 42 inches.
Figure 36B:
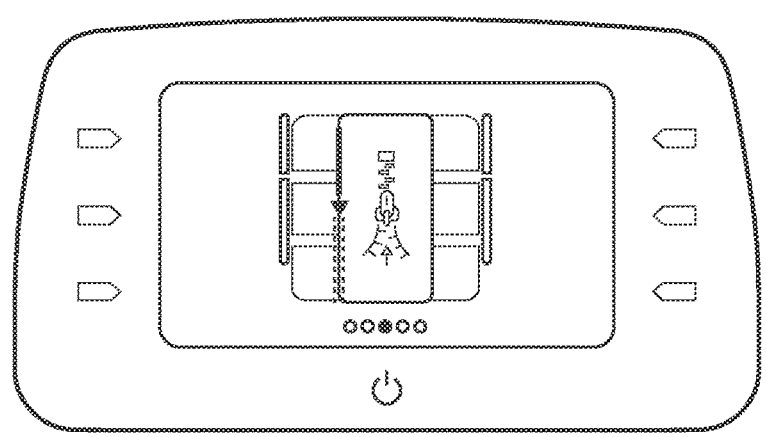
Figure 36C:
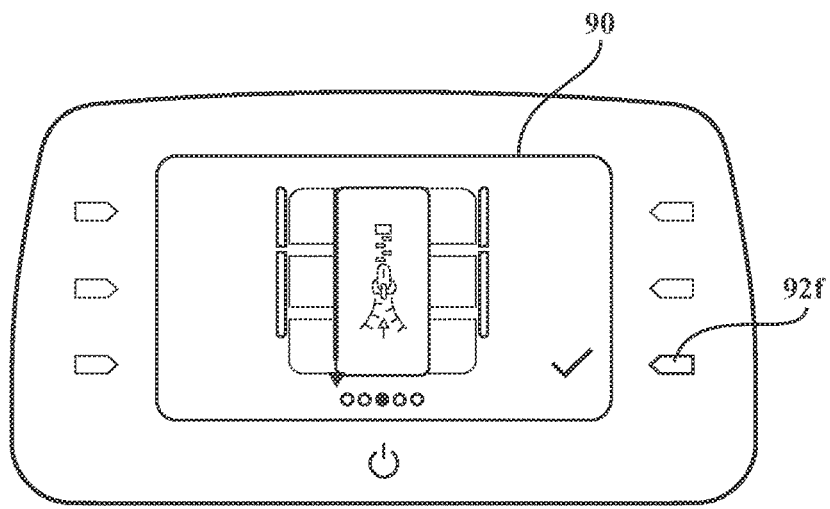

Referring to FIGS. 36A-36C, the second predetermined sequence of graphical animations includes a fastener engagement animation to instruct the user to engage the one or more fastening elements 78 to secure the first auxiliary patient support section 68 to the main patient support section 62. The fastener engagement animation starts in FIG. 36A with the controller 86 displaying a plurality of fastening element images representing the current state of the fastening elements 78. For instance, the images represent the zipper on one side of the main patient support section 62 (see orange line and zipper slider of the zipper represented as an orange triangle). The images also include an image depicting the teeth of the zipper being engaged (see arrow) and the zipper slider in more detail (centrally located). The controller 86, then animates the plurality of fastening element images by displaying the plurality of fastening element images in sequence at varying degrees of engagement (e.g., see FIG. 36B) until the fastening element images illustrate complete engagement securing the first auxiliary patient support section 68 to the main patient support section 62, as shown in FIG. 36C. More specifically, the orange line representing the zipper in its released state on the one side of the main patient support section 62 transitions from an orange, dotted line, to a green solid line in the sequence of images to show engagement (closing) of the zipper. Also, the more detailed images of the teeth of the zipper are depicted in different positions in each sequential image so that it appears to the user that the zipper slider is moving to zip the zippers. After the fastening element images are depicted as being completely engaged, and at least one complete cycle of the fastener engagement animation is fully executed and displayed, the controller 86 prompts the user for input, to confirm that the actual fastening elements 78 have been engaged. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The controller 86 initiates and displays one or more additional loops of the fastener engagement animation while waiting for the input from the user to confirm that the fastening elements 78 have been engaged.

Figure 37A:
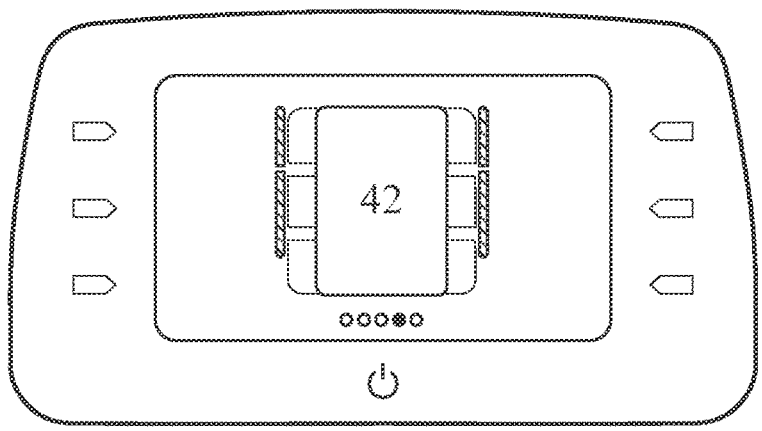
FIGS. 37A-37C illustrate a deck collapsing animation displayed on the user interface after collapsing the expandable patient support, for example, from 48 inches to 42 inches.
Figure 37B:
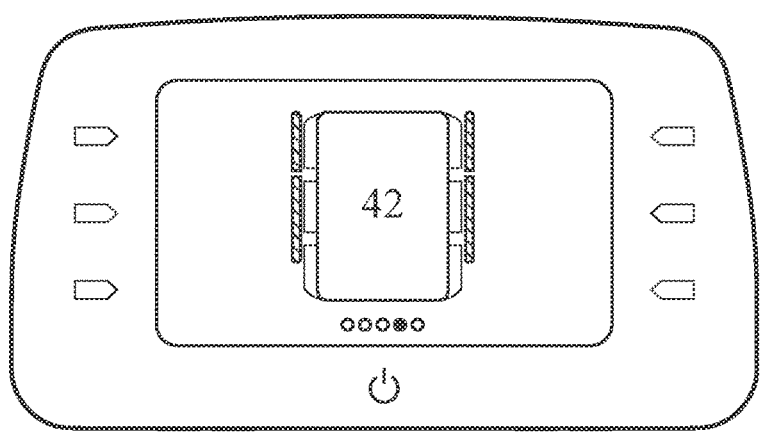
Figure 37C:
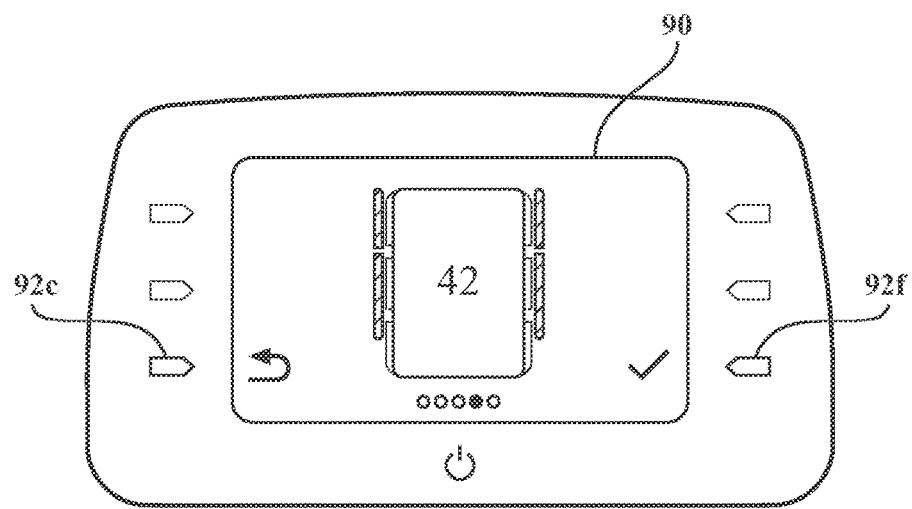

Referring to FIGS. 37A-37C, the second predetermined sequence of graphical animations includes a deck collapsing animation to instruct the user to collapse the deck sections 41, 43, 45, 47 (see FIG. 2) of the patient support deck 38 (e.g., part of the litter) to accommodate the expandable patient support 40 once at the new width. The deck collapsing animation starts in FIG. 37A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence at varying degrees of collapse (e.g., see FIG. 37B) until the deck/side rail image illustrates collapsing of the patient support deck 38 and side rails 54, 56, 58, 60 to the new width, as shown in FIG. 37C. After the deck/side rail image is depicted as being collapsed to the new width, and at least one complete cycle of the deck collapsing animation is fully executed and displayed, the controller 86 prompts the user for input, to confirm that the actual deck sections 41, 43, 45, 47 and associated side rails 54, 56, 58, 60 have been collapsed to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The controller 86 initiates and displays one or more additional loops of the deck collapsing animation while waiting for the input from the user to confirm that the deck sections 41, 43, 45, 47 and side rails 54, 56, 58, 60 have been collapsed to their required widths.

Figure 38A:
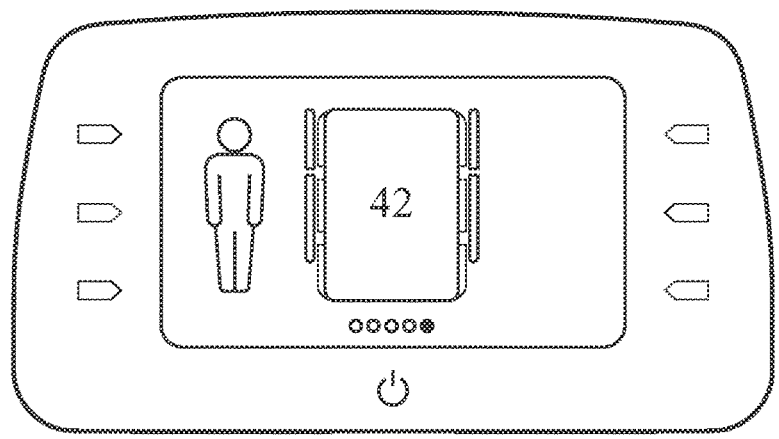
FIGS. 38A-38C illustrate a patient loading animation displayed on the user interface after collapsing the expandable patient support, for example, from 48 inches to 42 inches.
Figure 38B:
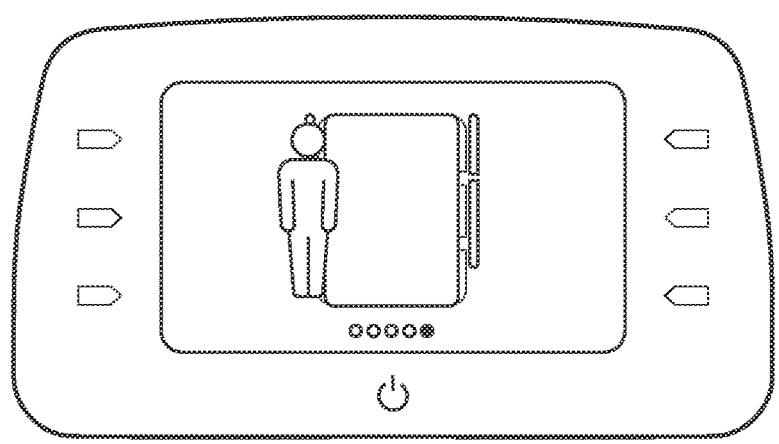
Figure 38C:
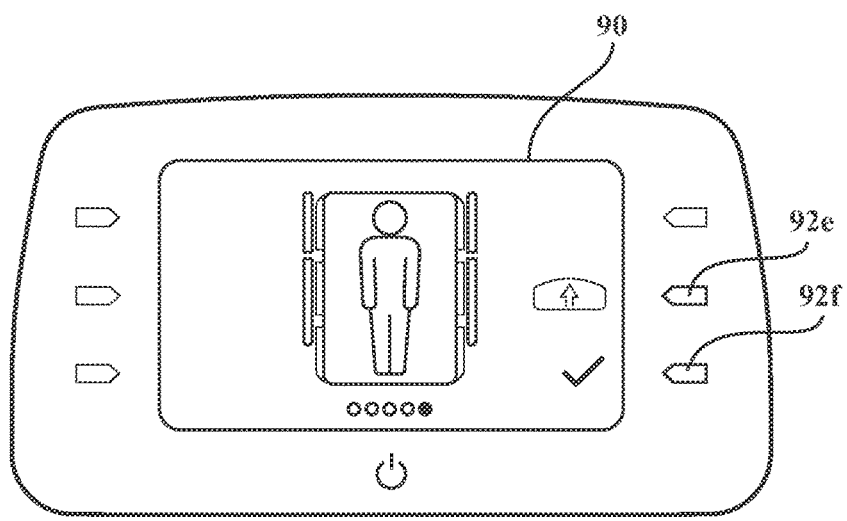

Referring to FIGS. 38A-38C, the second predetermined sequence of graphical animations includes a patient loading animation to instruct the user to move the patient onto the main patient support surface of the main patient support section 62 and the second auxiliary patient support surface of the second auxiliary patient support section 70 (or at least onto the expandable patient support 40) after the controller 86 operates the fluid supply device 84 to reduce the overall width of the expandable patient support 40 from the original width to the new width. The patient loading animation starts in FIG. 38A with the controller 86 displaying a patient image representing a patient off the main patient support surface and off the second auxiliary patient support surface. The controller 86, then animates the patient image by displaying one or more patient images in sequence at varying distances from the main patient support surface and the second auxiliary patient support surface until the patient image is depicted on the main patient support surface and the second auxiliary patient support surface (or at least on the expandable patient support 40), as shown in FIG. 38C. After the patient image is depicted on the main patient support surface and the second auxiliary patient support surface (or at least on the expandable patient support 40), and at least one complete cycle of the patient loading animation is fully executed and displayed, the controller 86 prompts the user for input, to confirm that the actual patient is on the main patient support surface and the second auxiliary patient support surface (or at least on the expandable patient support 40). Thus, the controller 86 displays at least one complete cycle of animation to instruct the user before the controller 86 seeks input from the user to confirm that the task has been completed. This input includes selection via the button 92*f* adjacent to a check mark image displayed by the controller 86. The user also has the option of initiating operation of the maximum inflation function via button 92*e*. The controller 86 initiates and displays one or more additional loops of the patient loading animation while waiting for the input from the user to confirm that the patient is on the main patient support surface and the second auxiliary patient support surface (or at least on the expandable patient support 40).

FIGS. 39A-39C, 41A-41C, 42A-42C, and 43A-43C illustrate graphical animations that the controller 86 generates on the display 90 to graphically instruct the user to perform the second plurality of tasks after the user selects a width of 36 inches (e.g., a new width) on the user interface 88 in FIG. 13B (e.g., the current width is 42 inches).

Figure 39A:
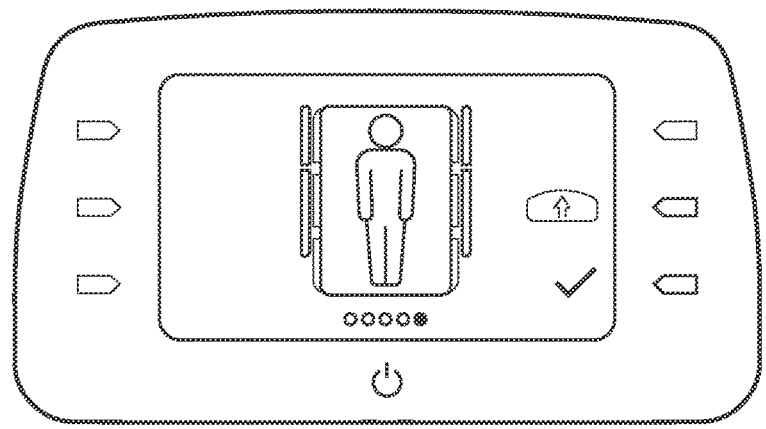
FIGS. 39A-39C illustrate a patient offloading animation displayed on the user interface in preparation for collapsing the expandable patient support, for example, from 42 inches to 36 inches.
Figure 39B:
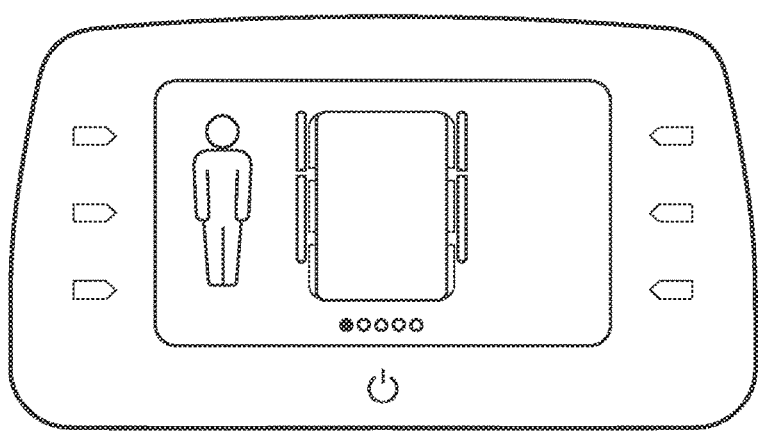
Figure 39C:
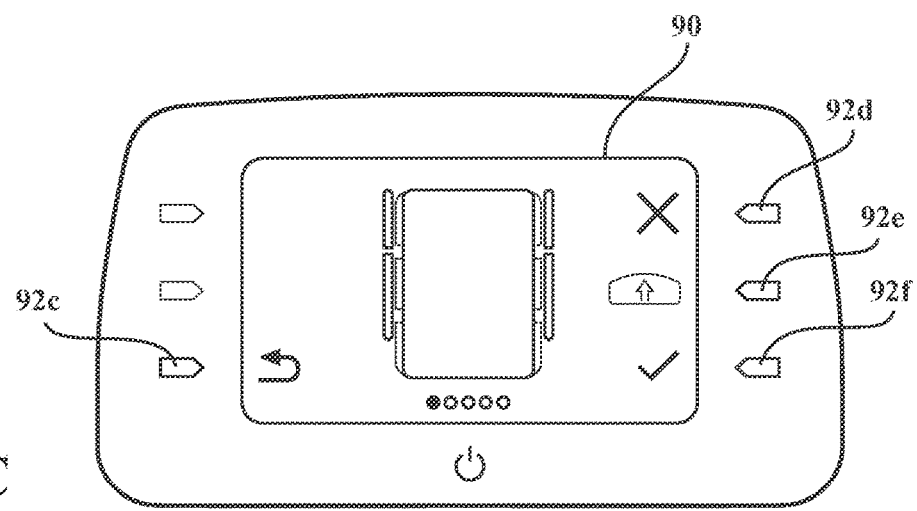

Referring to FIGS. 39A-39C, the second predetermined sequence of graphical animations includes a patient offloading animation to instruct the user to move the patient off the main patient support surface of the main patient support section 62 and off the second auxiliary patient support surface of the second auxiliary patient support section 70. The patient offloading animation starts in FIG. 39A with the controller 86 displaying a patient image representing a patient on the main patient support surface and the second auxiliary patient support surface. The controller 86, then animates the patient image by displaying one or more patient images in sequence at varying distances from the main patient support surface and the second auxiliary patient support surface until the patient image is depicted off the main patient support surface and the second auxiliary patient support surface, as shown in FIG. 39B. After the patient image is depicted off the main patient support surface and the second auxiliary patient support surface, and at least one complete cycle of the patient offloading animation is fully executed and displayed, the controller 86 prompts the user for input, to confirm that the actual patient is off the main patient support surface and the second auxiliary patient support surface. Thus, the controller 86 displays at least one complete cycle of animation to instruct the user before the controller 86 seeks input from the user to confirm that the task has been completed. This input includes selection via the button 92f adjacent to a check mark image displayed by the controller 86. Alternatively, the user can cancel the operation by selecting button 92d adjacent to the image of an X displayed by the controller 86. The user also has the option of initiating operation of the maximum inflation function via button 92e. The controller 86 initiates and displays one or more additional loops of the patient offloading animation while waiting for the input from the user to confirm that the patient is off the main patient support surface and the second auxiliary patient support surface.

Figure 40A:
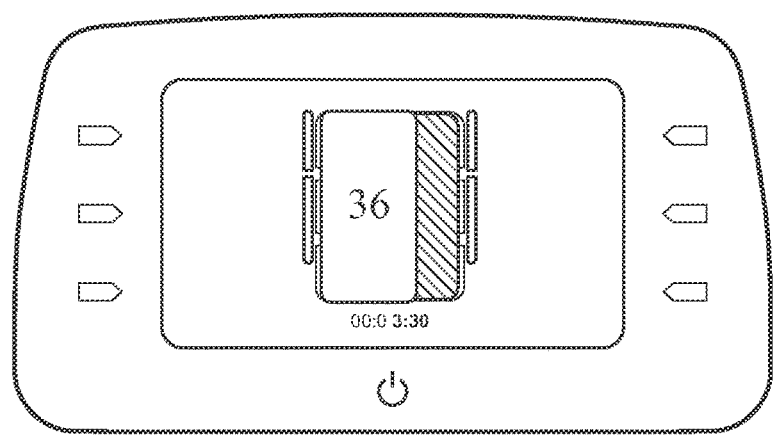
FIGS. 40A-40C illustrate an auxiliary section collapsing animation displayed on the user interface when collapsing the expandable patient support, for example, from 42 inches to 36 inches.
Figure 40B:
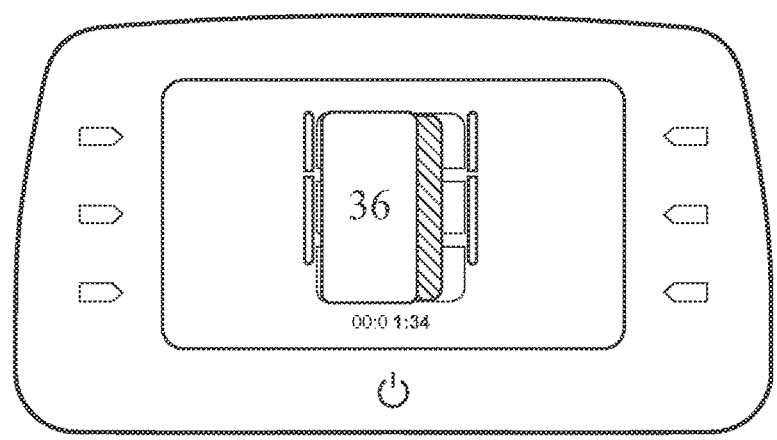
Figure 40C:
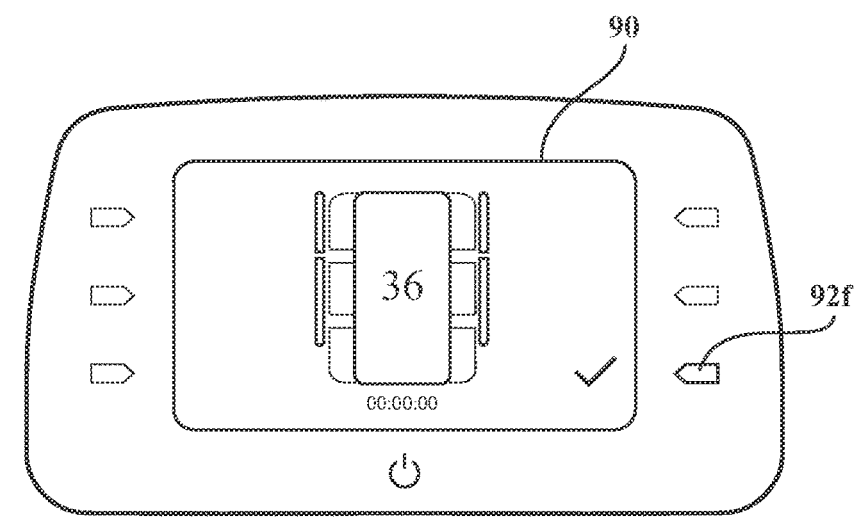

Referring to FIGS. 40A-40C, the controller 86 is programmed to also display an auxiliary section collapsing animation to graphically depict collapsing of the second auxiliary patient support section 70 toward the main patient support section 62 (the first auxiliary support section 68 is already collapsed in the version shown). The deck collapsing animation starts in FIG. 40A with the controller 86 displaying an expandable patient support image representing the current state of the expandable patient support 40 (e.g., at 42 inches). The controller 86, then animates the expandable patient support image by displaying one or more auxiliary patient support section images in sequence at varying degrees of collapsing (e.g., see FIG. 40B) until the auxiliary patient support section images illustrate complete collapsing of the expandable patient support 40, as shown in FIG. 40C. After the expandable patient support 40 image is depicted as being completely collapsed, and at least one complete cycle of the auxiliary section collapsing animation is fully executed and displayed, the controller 86 prompts the user for input, to confirm that the second auxiliary patient support section 70 is fully collapsed toward the main patient support section 62. This input includes selection via the button 92f adjacent to a check mark image displayed by the controller 86. The controller 86 initiates and displays one or more additional loops of the auxiliary section collapsing animation while waiting for the input from the user to confirm that the second auxiliary patient support section 70 has been collapsed to its required widths.

Figure 41A:
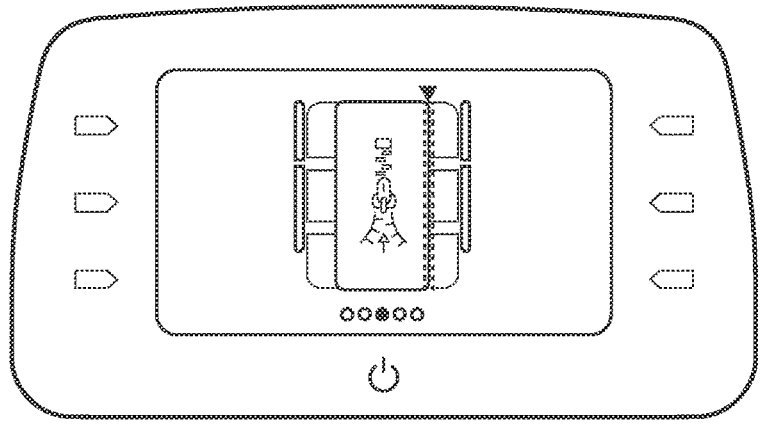
FIGS. 41A-41C illustrate a fastener engagement animation displayed on the user interface after collapsing the expandable patient support, for example, from 42 inches to 36 inches.
Figure 41B:
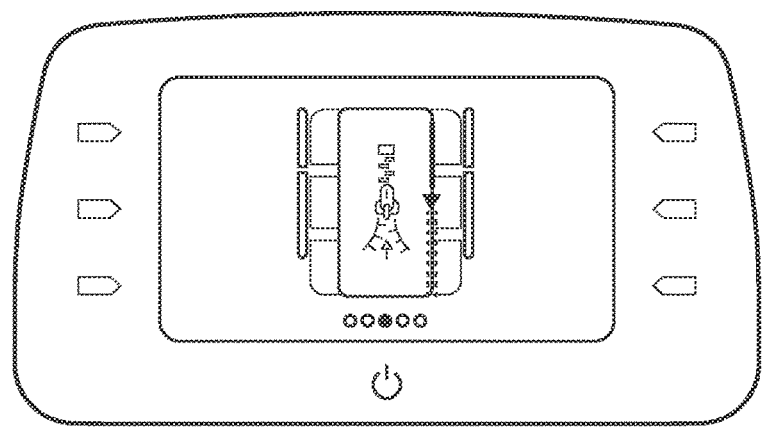
Figure 41C:
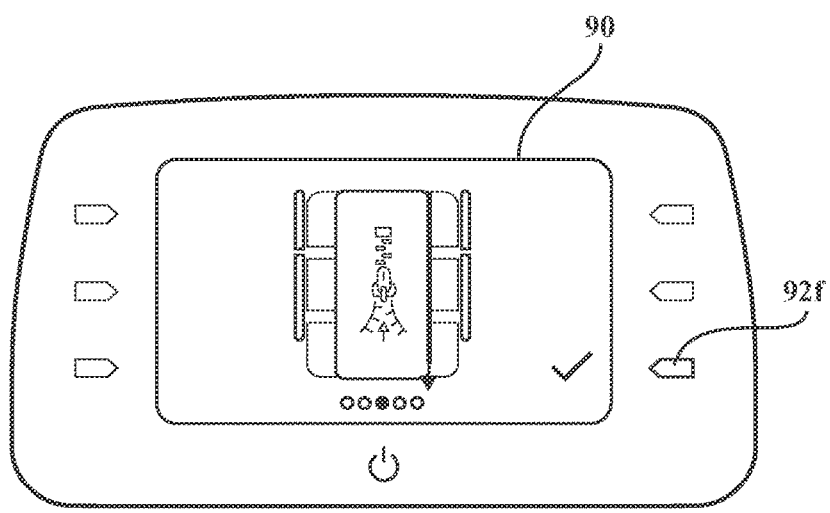

Referring to FIGS. 41A-41C, the second predetermined sequence of graphical animations includes a fastener engagement animation to instruct the user to engage the one or more fastening elements 78 to secure the second auxiliary patient support section 70 to the main patient support section 62. The fastener engagement animation starts in FIG. 41A with the controller 86 displaying a plurality of fastening element images representing the current state of the fastening elements 78. For instance, the images represent the zipper on one side of the main patient support section 62 (see orange line and zipper slider of the zipper represented as an orange triangle). The images also include an image depicting the teeth of the zipper being engaged (see arrow) and the zipper slider in more detail (centrally located). The controller 86, then animates the plurality of fastening element images by displaying the plurality of fastening element images in sequence at varying degrees of engagement (e.g., see FIG. 41B) until the fastening element images illustrate complete engagement securing the second auxiliary patient support section 70 to the main patient support section 62, as shown in FIG. 41C. More specifically, the orange line representing the zipper in its released state on the one side of the main patient support section 62 transitions from an orange, dotted line, to a green solid line in the sequence of images to show engagement (closing) of the zipper. Also, the more detailed images of the teeth of the zipper are depicted in different positions in each sequential image so that it appears to the user that the zipper slider is moving to zip the zipper. After the fastening element images are depicted as being completely engaged, and at least one complete cycle of the fastener engagement animation is fully executed and displayed, the controller 86 prompts the user for input, to confirm that the actual fastening elements 78 have been engaged. Thus, the controller 86 displays at least one complete cycle of animation to instruct the user before the controller 86 seeks input from the user to confirm that the task has been completed. This input includes selection via the button 92f adjacent to a check mark image displayed by the controller 86. The controller 86 initiates and displays one or more additional loops of the fastener engagement animation while waiting for the input from the user to confirm that the fastening elements 78 have been engaged.

Figure 42A:
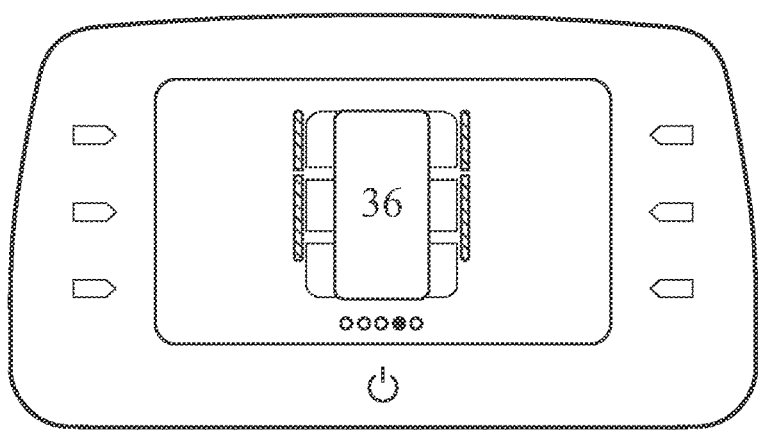
FIGS. 42A-42C illustrate a deck collapsing animation displayed on the user interface after collapsing the expandable patient support, for example, from 42 inches to 36 inches.
Figure 42B:
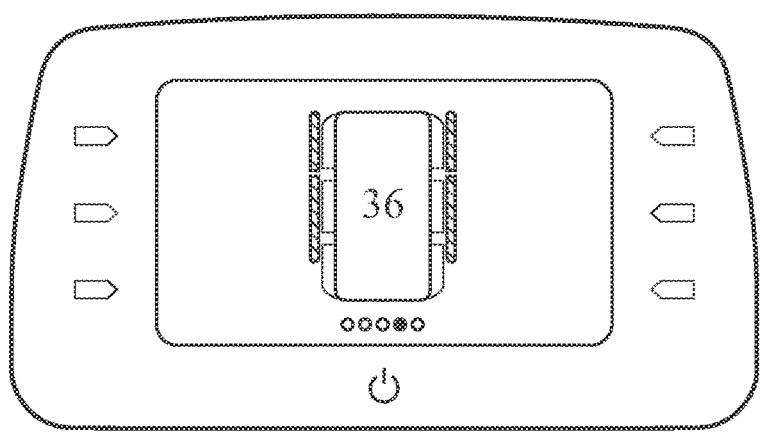
Figure 42C:
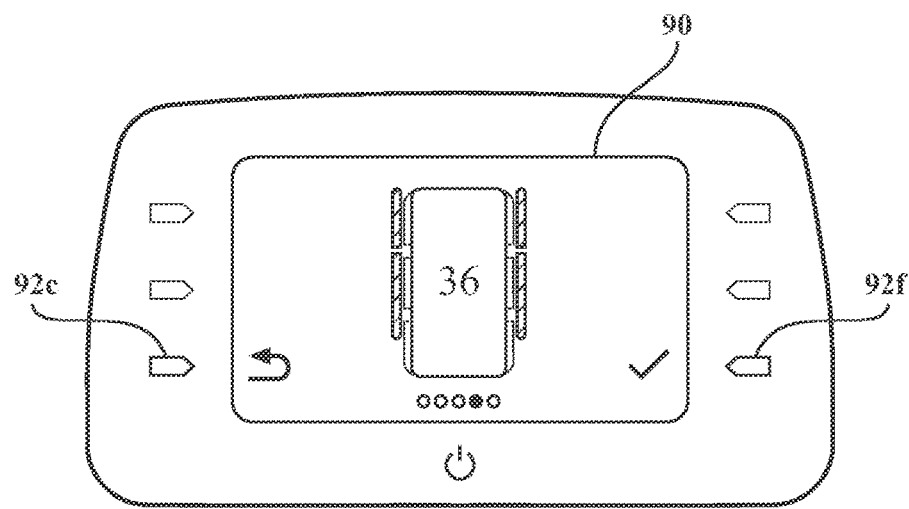

Referring to FIGS. 42A-42C, the second predetermined sequence of graphical animations includes a deck collapsing animation to instruct the user to collapse the deck sections 41, 43, 45, 47 (see FIG. 2) of the patient support deck 38 (e.g., part of the litter) to accommodate the expandable patient support 40 once at the new width. The deck collapsing animation starts in FIG. 42A with the controller 86 displaying a deck/side rail image representing the current position of the deck sections 41, 43, 45, 47 and associated side rails 54, 56, 58, 60 (only 3 sections shown, but one, two, or more could be represented). The controller 86, then animates the deck/side rail image by displaying one or more deck/side rail images in sequence at varying degrees of collapse (e.g., see FIG. 42B) until the deck/side rail image illustrates complete collapsing of the patient support deck 38 and side rails 54, 56, 58, 60, as shown in FIG. 42C. After the deck/side rail image is depicted as being completely collapsed, and at least one complete cycle of the deck collapsing animation is fully executed and displayed, the controller 86 prompts the user for input, to confirm that the actual deck sections 41, 43, 45, 47 and associated side rails 54, 56, 58, 60 have been collapsed to their required widths to accommodate the expandable patient support 40 at the new width. Thus, the controller 86 displays at least one complete cycle of animation to instruct the user before the controller 86 seeks input from the user to confirm that the task has been completed. This input includes selection via the button 92f adjacent to a check mark image displayed by the controller 86. The controller 86 initiates and displays one or more additional loops of the deck collapsing animation while waiting for the input from the user to confirm that the deck sections 41, 43, 45, 47 and side rails 54, 56, 58, 60 have been collapsed to their required widths.

Figure 43A:
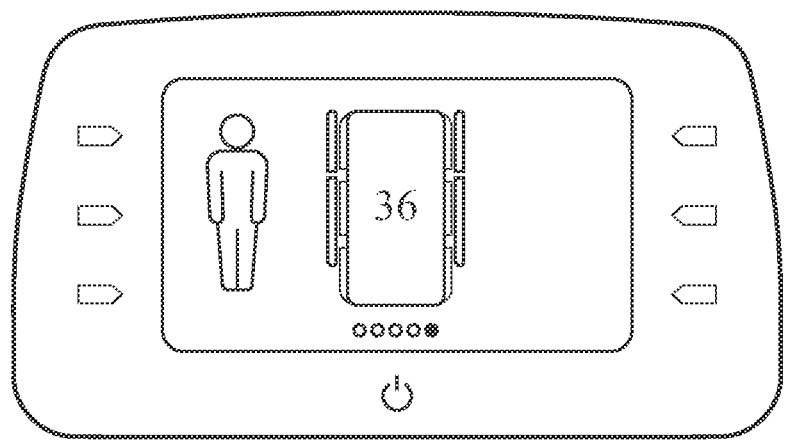
FIGS. 43A-43C illustrate a patient loading animation displayed on the user interface after collapsing the expandable patient support, for example, from 42 inches to 36 inches.
Figure 43B:
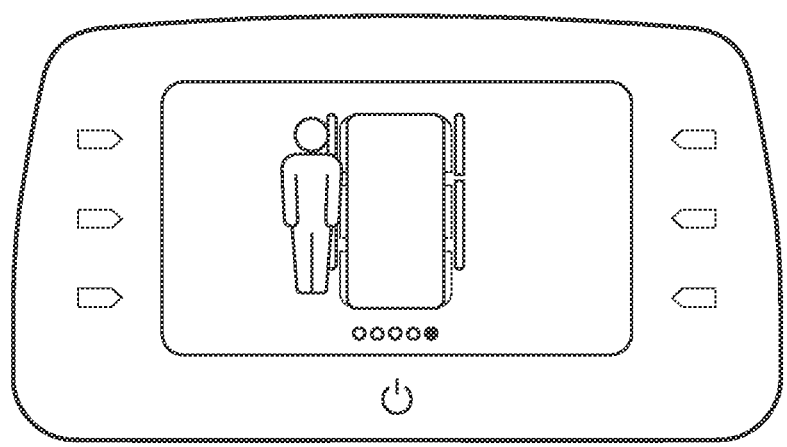
Figure 43C:
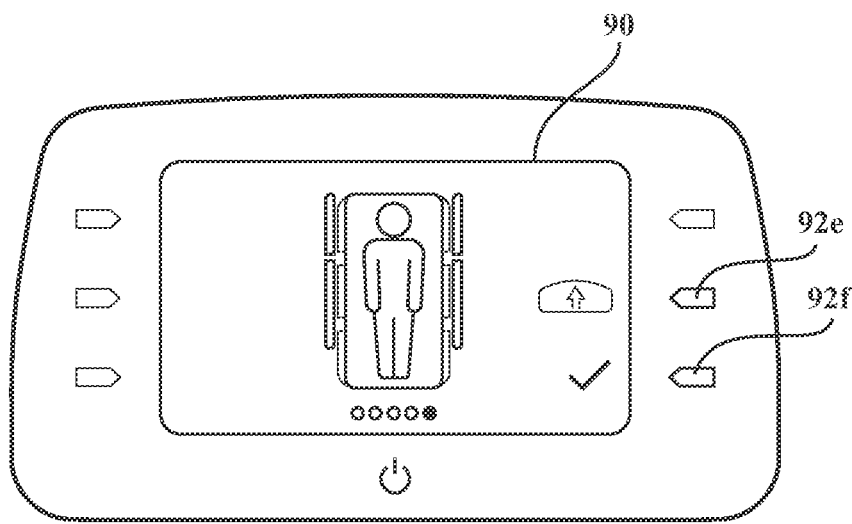

Referring to FIGS. 43A-43C, the second predetermined sequence of graphical animations includes a patient loading animation to instruct the user to move the patient onto the main patient support surface of the main patient support section 62 after the controller 86 operates the fluid supply device 84 to reduce the overall width of the expandable patient support 40 from the original width to the new width. The patient loading animation starts in FIG. 43A with the controller 86 displaying a patient image representing a patient off the main patient support surface. The controller 86, then animates the patient image by displaying one or more patient images in sequence at varying distances from the main patient support surface until the patient image is depicted on the main patient support surface, as shown in FIG. 43C. After the patient image is depicted on the main patient support surface, and at least one complete cycle of the patient loading animation is fully executed and displayed, the controller 86 prompts the user for input, to confirm that the actual patient is on the main patient support surface. Thus, the controller 86 displays at least one complete cycle of animation to instruct the user before the controller 86 seeks input from the user to confirm that the task has been completed. This input includes selection via the button 92f adjacent to a check mark image displayed by the controller 86. The user also has the option of initiating operation of the maximum inflation function via button 92e. The controller 86 initiates and displays one or more additional loops of the patient loading animation while waiting for the input from the user to confirm that the patient is on the main patient support surface.

Figure 44A:
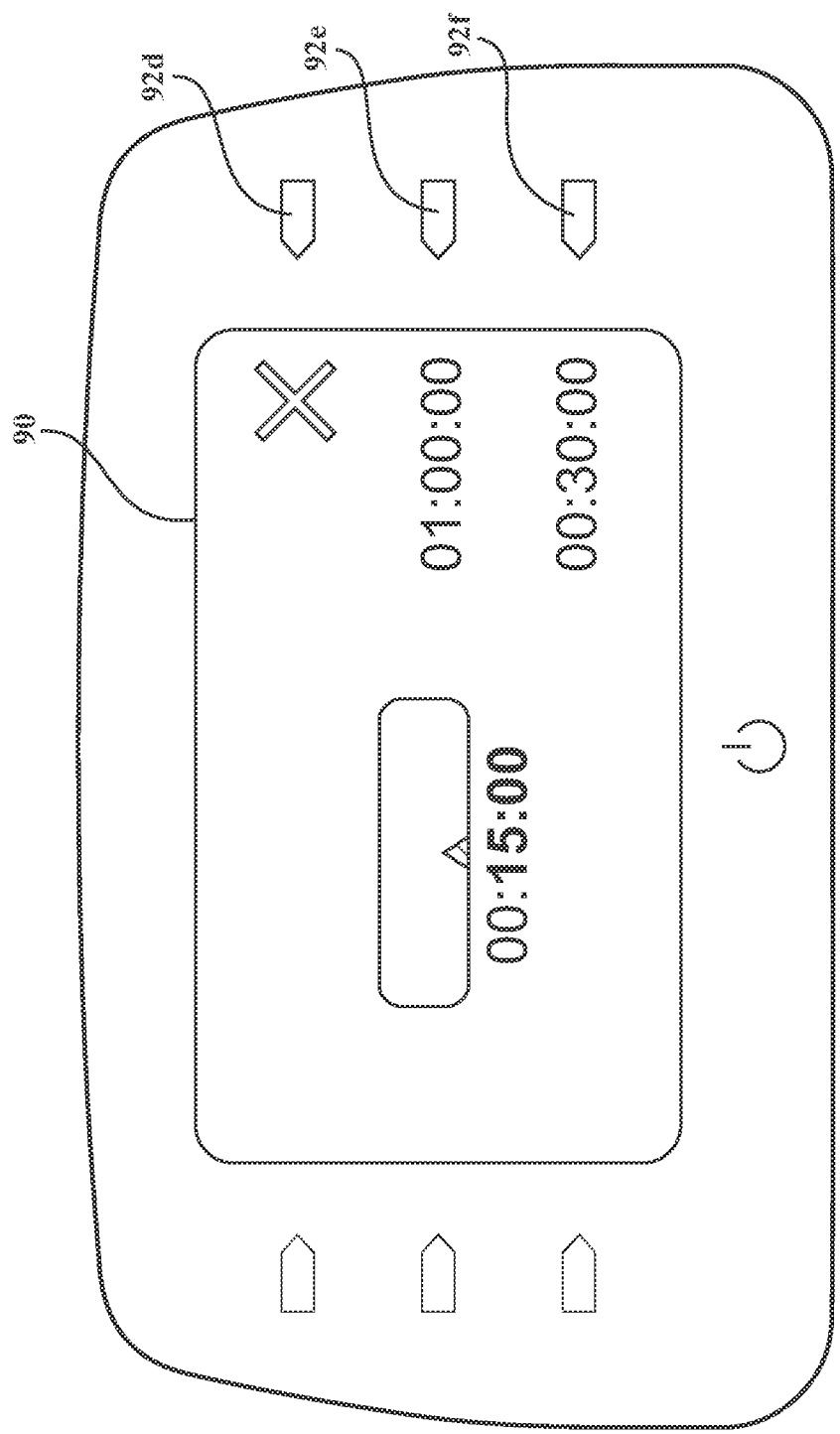
FIGS. 44A-44Q illustrate a maximum inflation animation displayed on the user interface when the user selects maximum inflation.
Figure 44B:
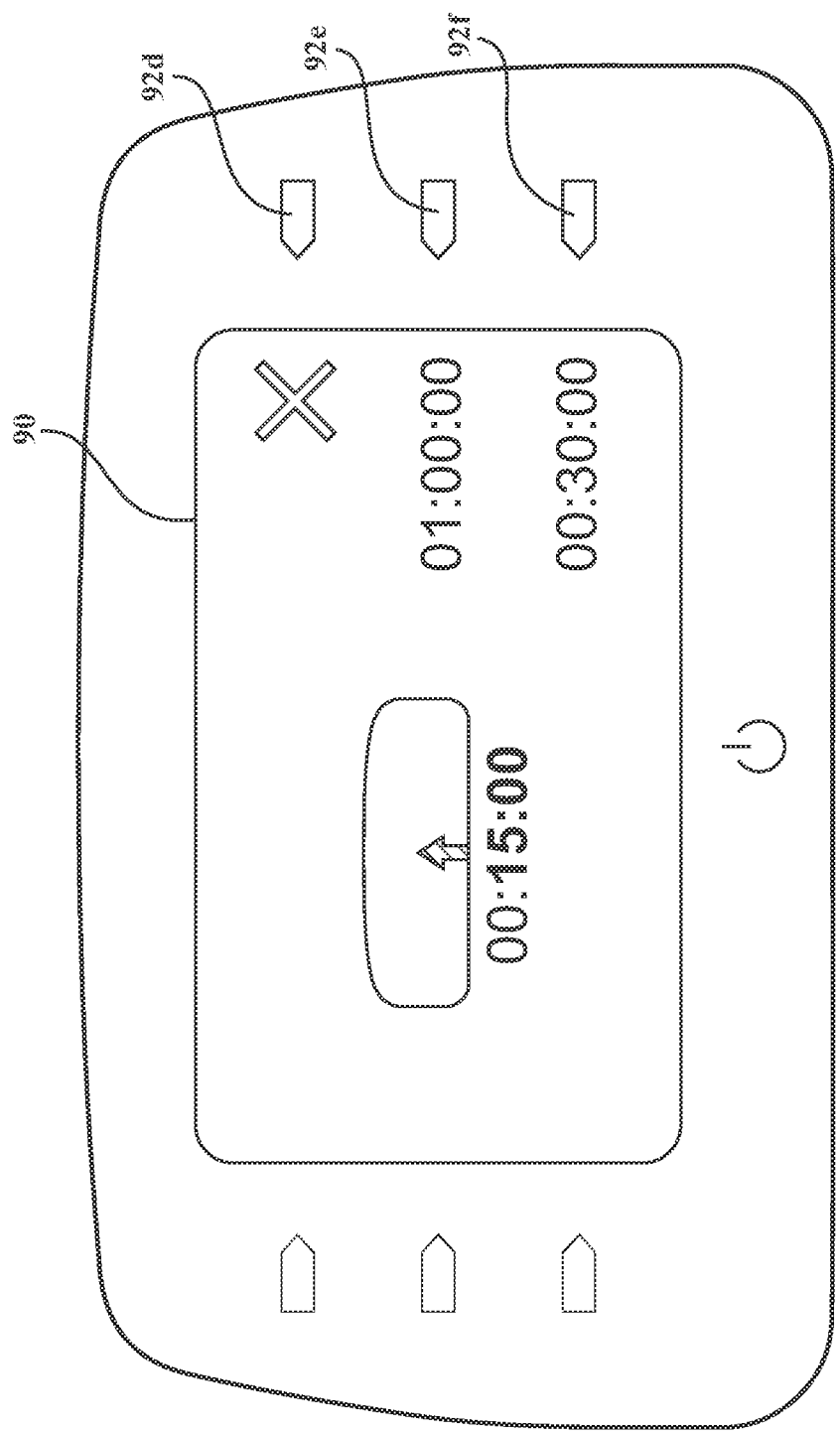
Figure 44C:
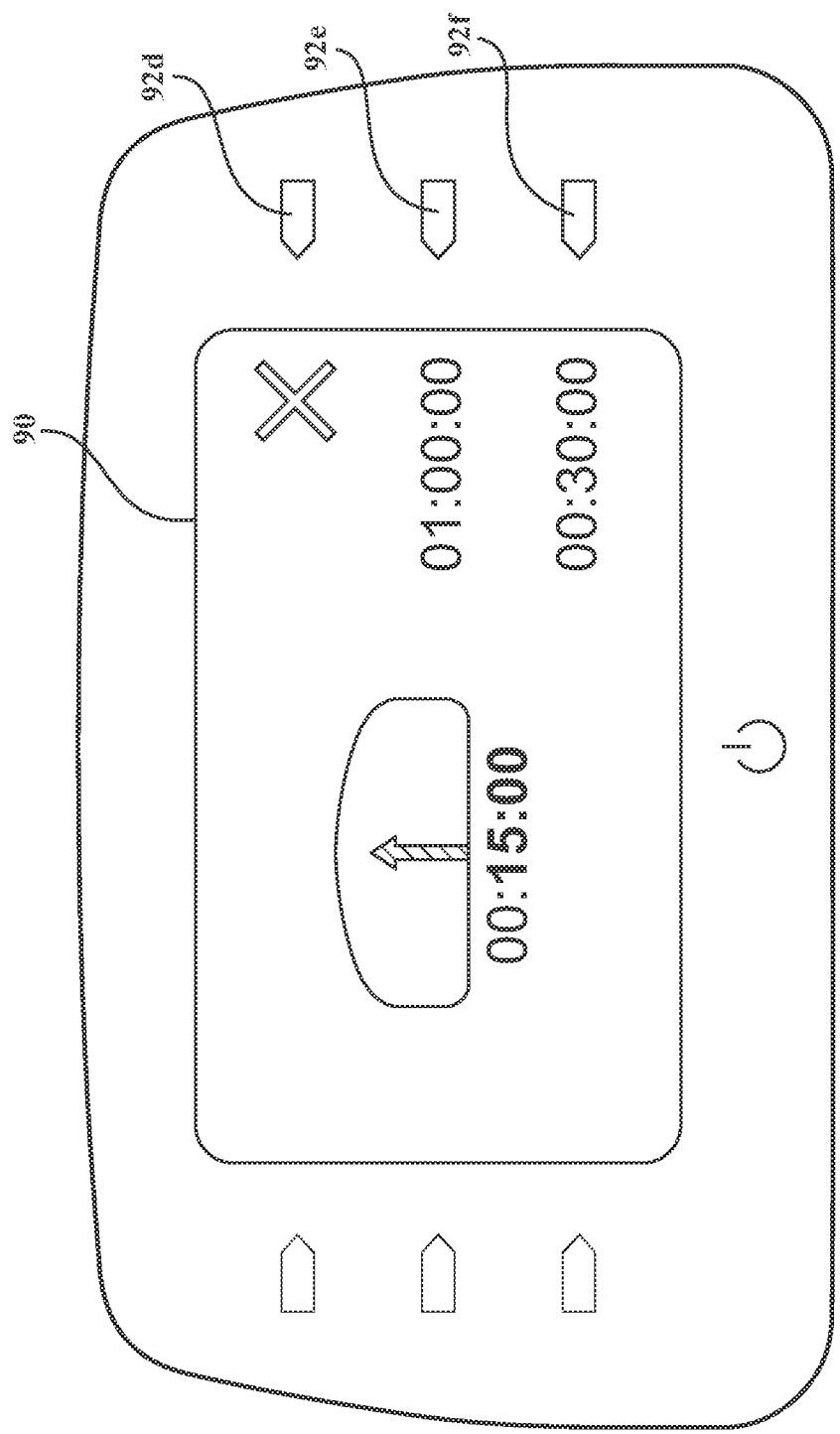
Figure 44D:
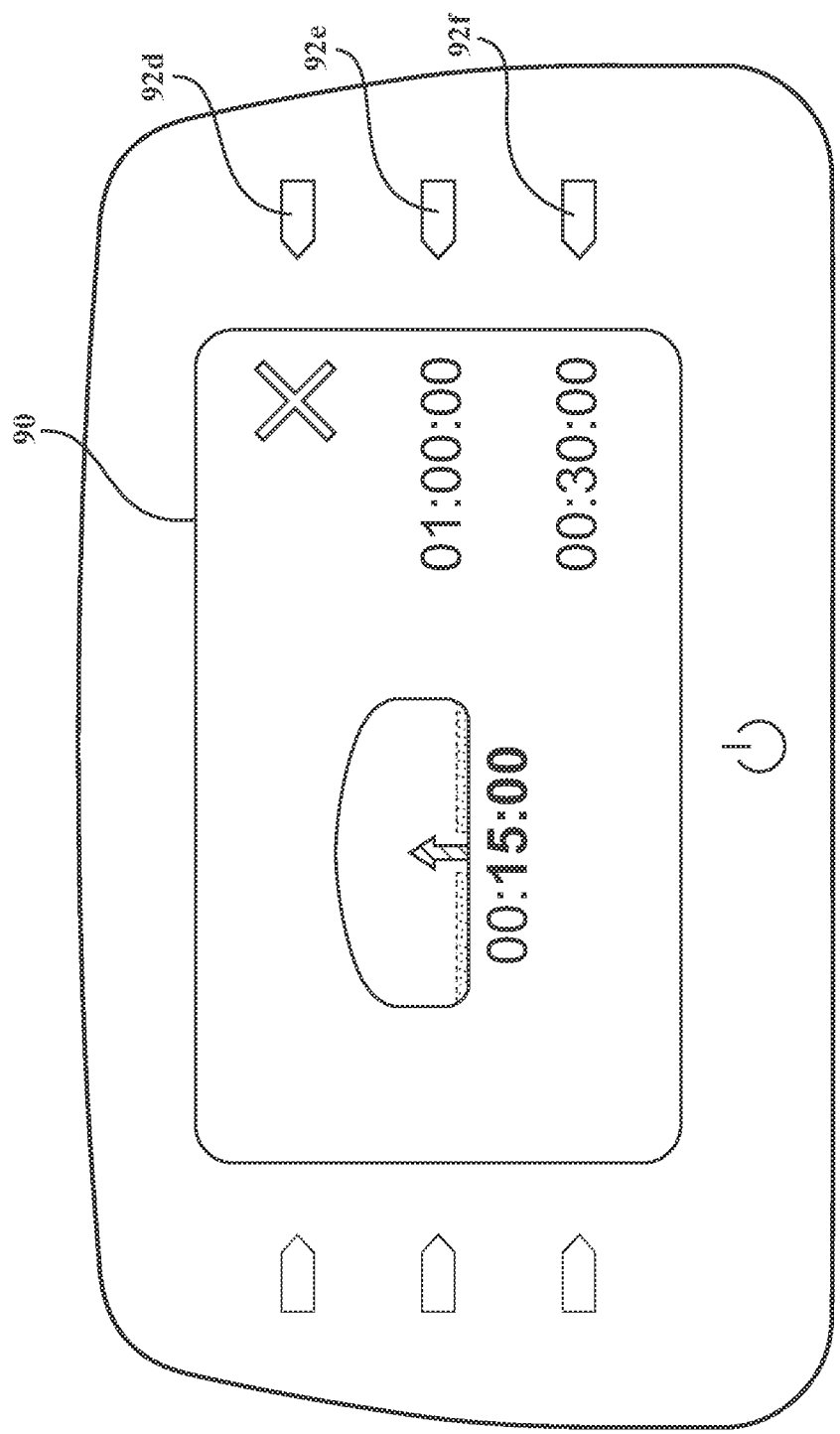
Figure 44E:
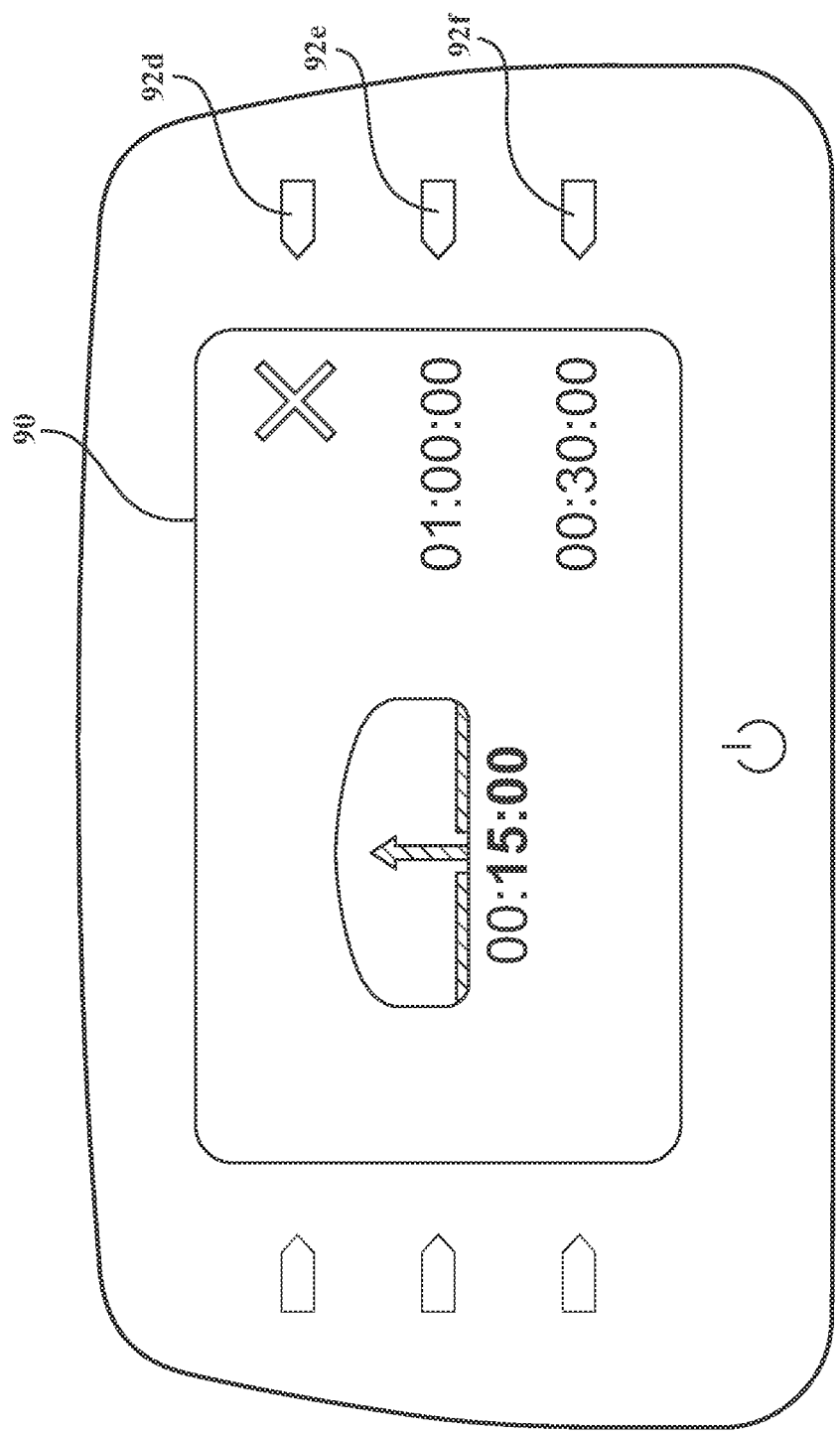
Figure 44F:
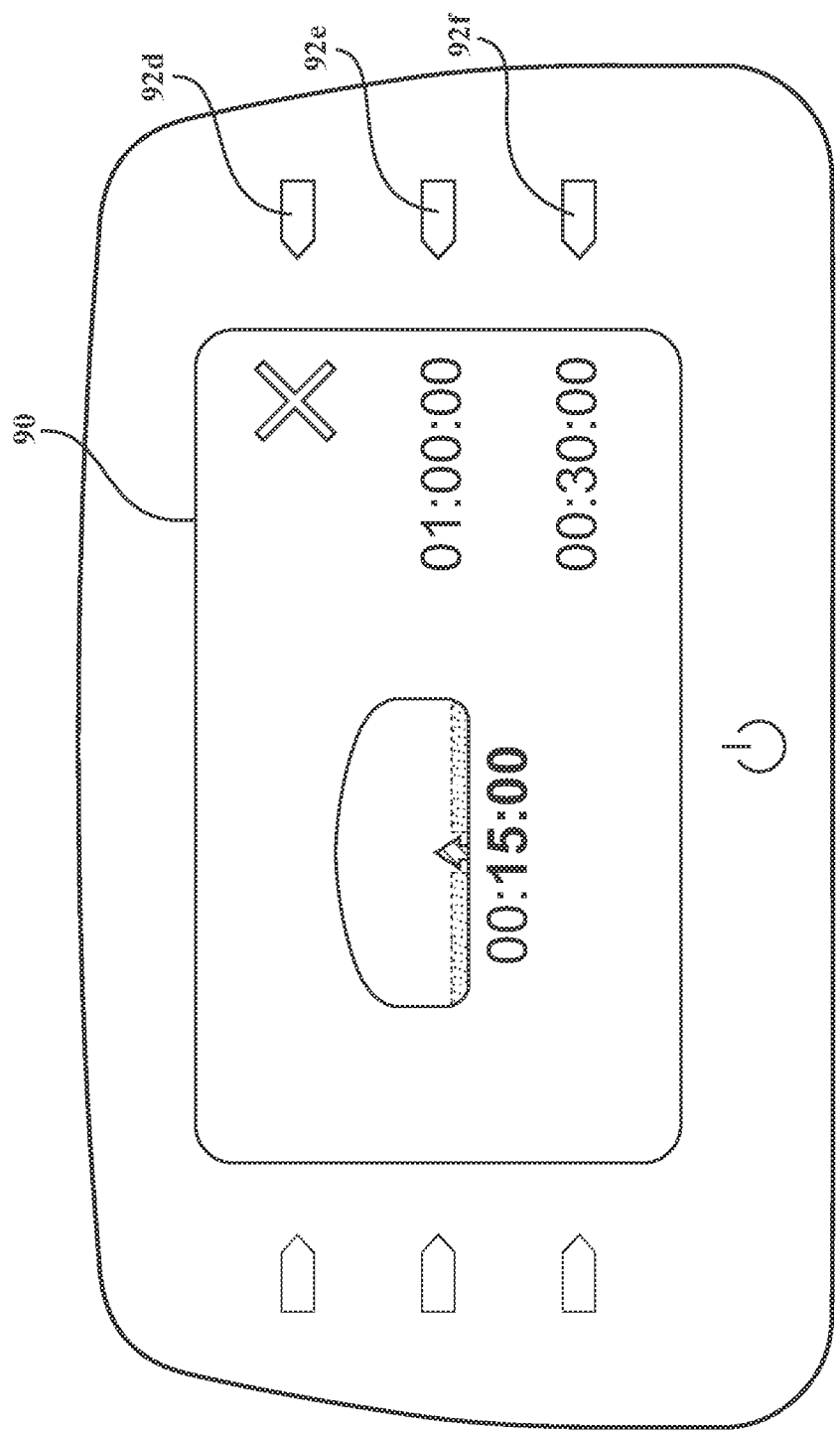
Figure 44G:
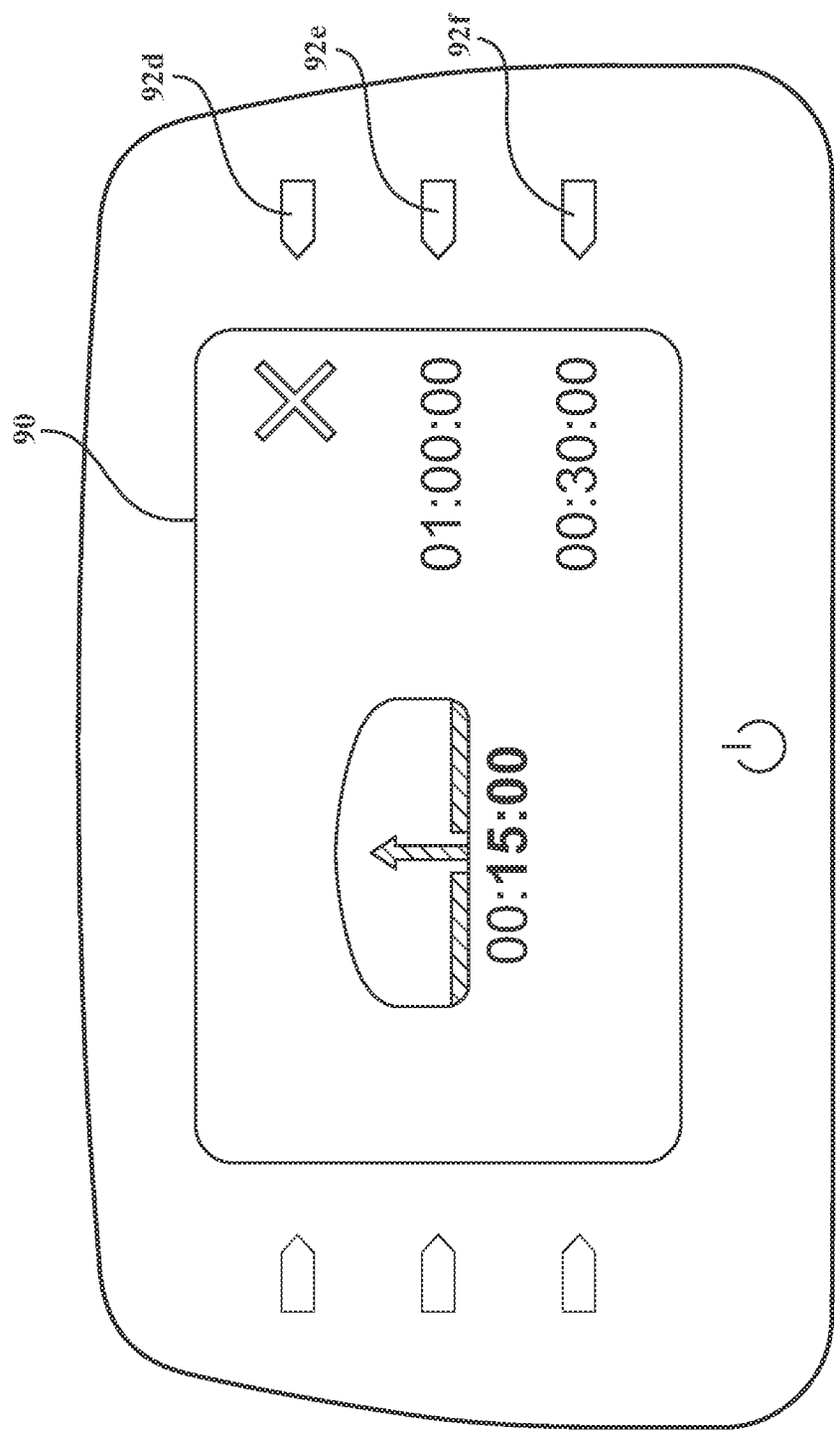
Figure 44H:
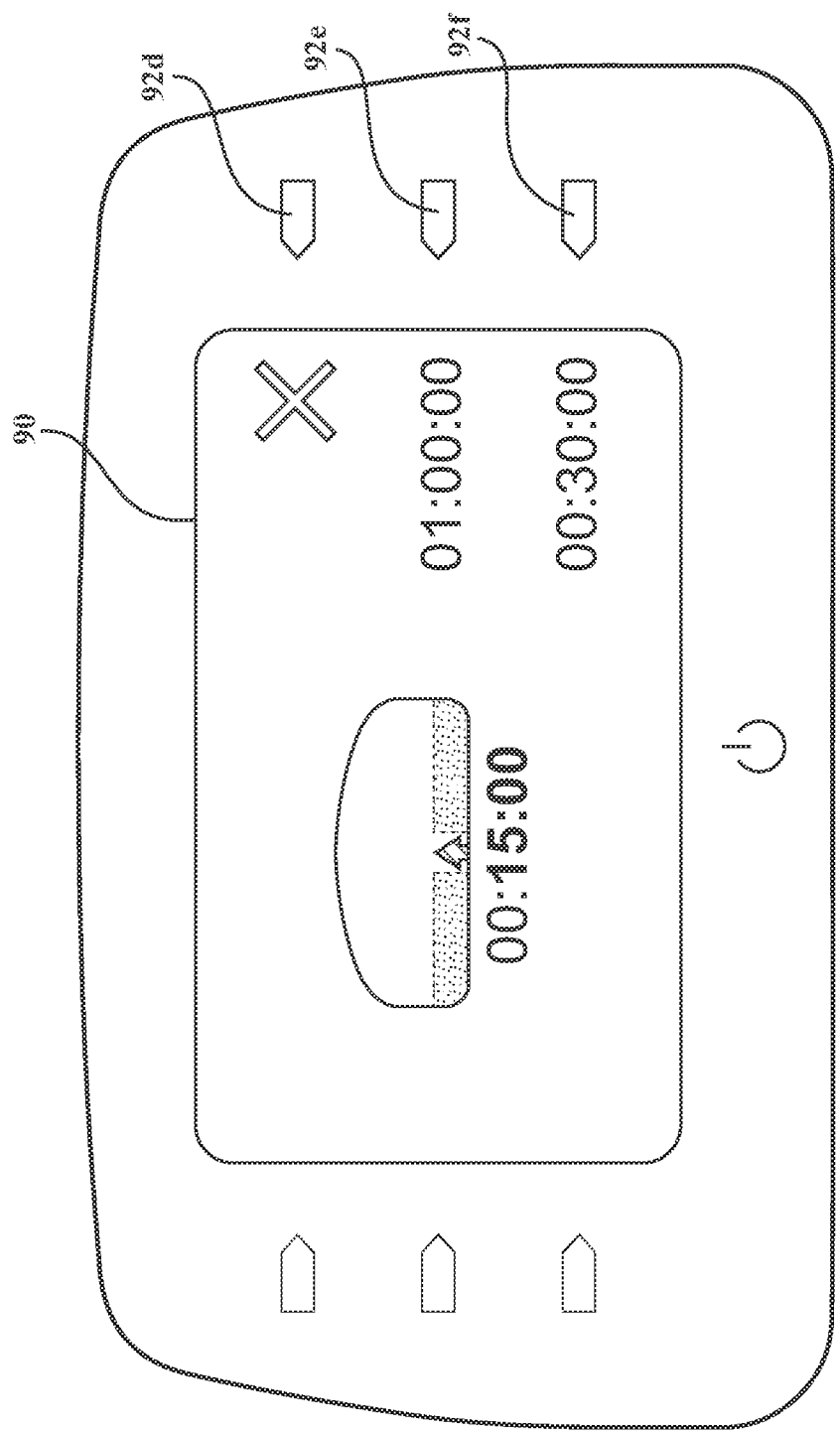
Figure 44I:
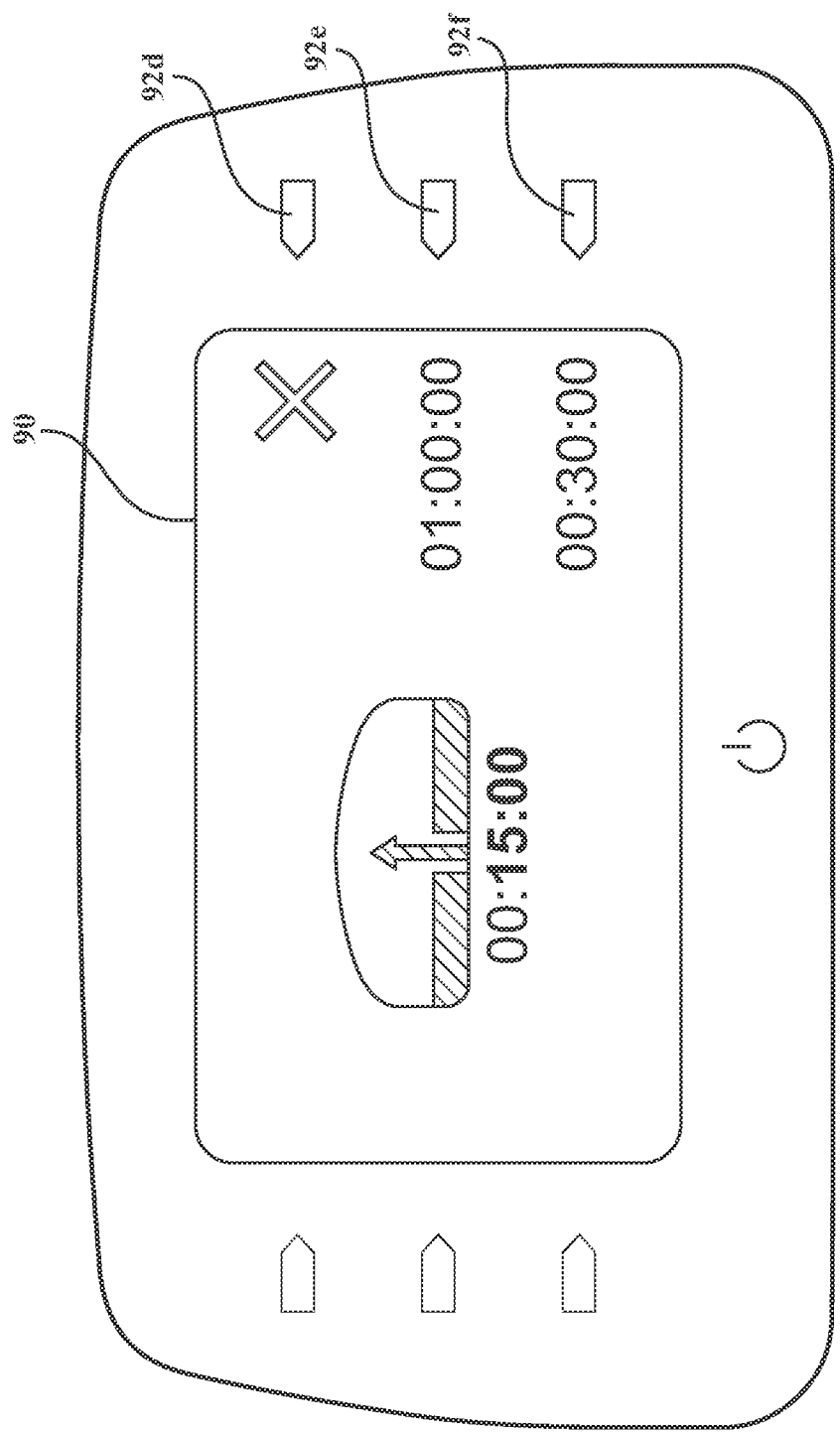
Figure 44J:
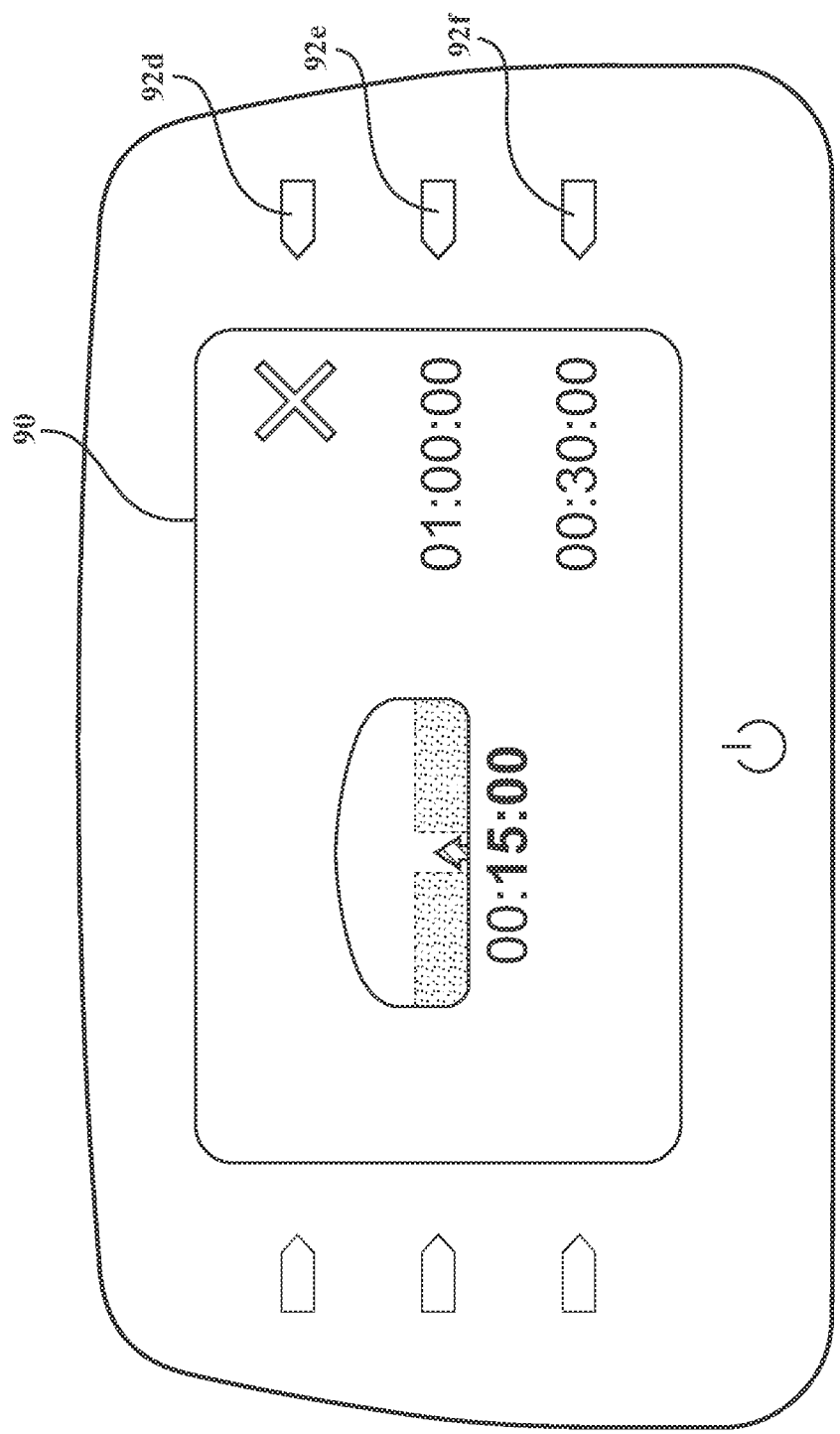
Figure 44K:
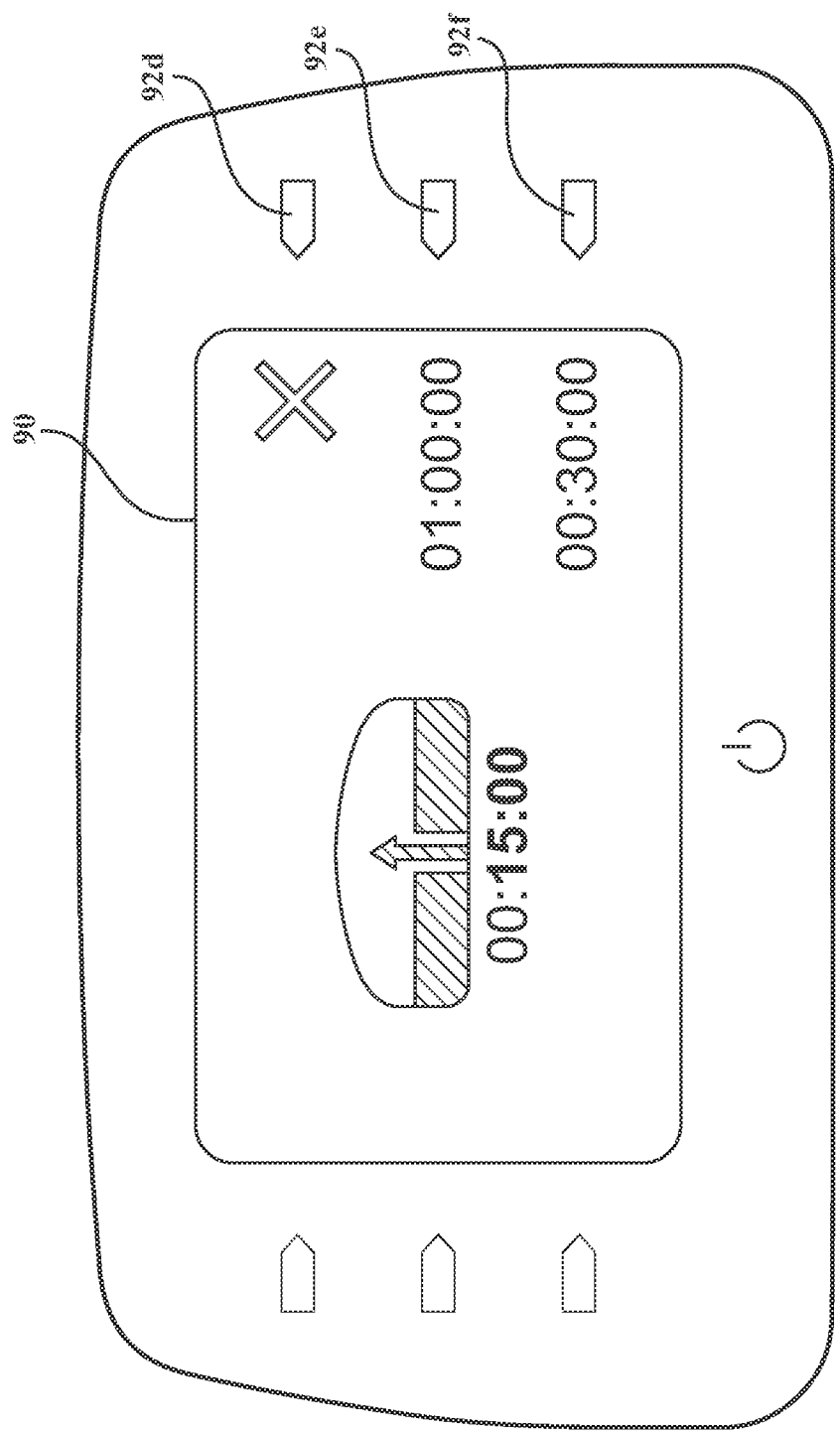
Figure 44L:
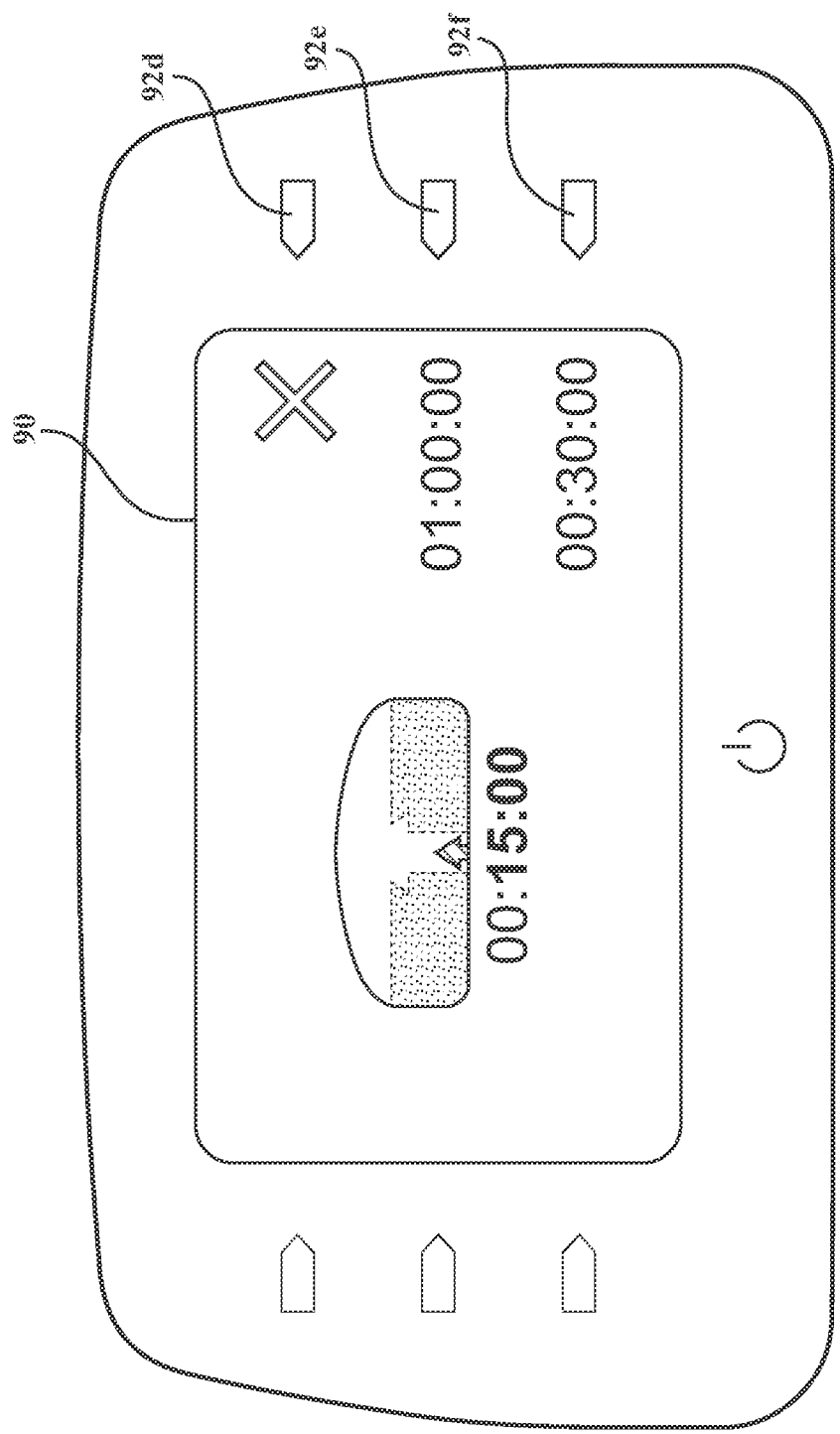
Figure 44M:
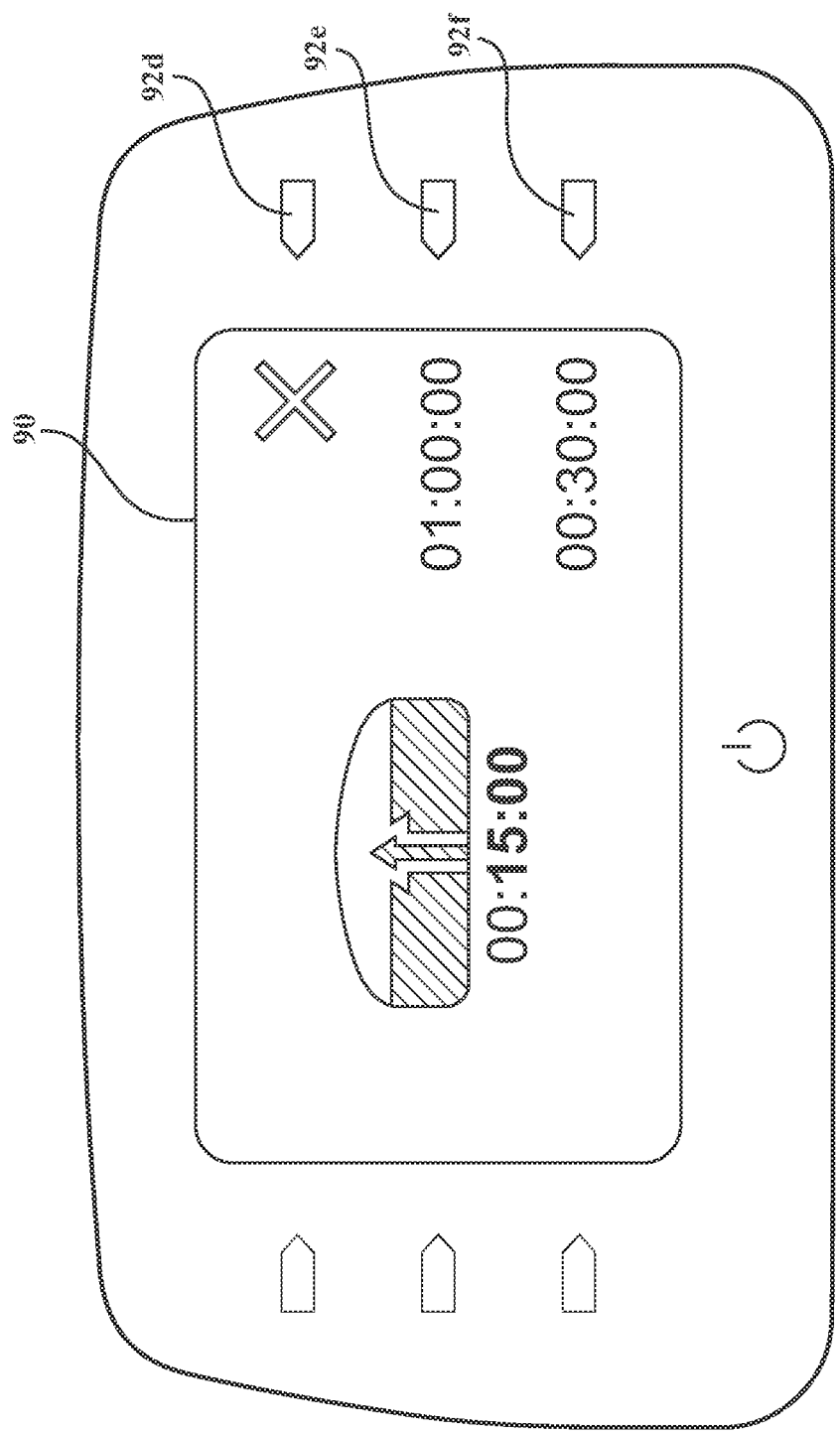
Figure 44O:
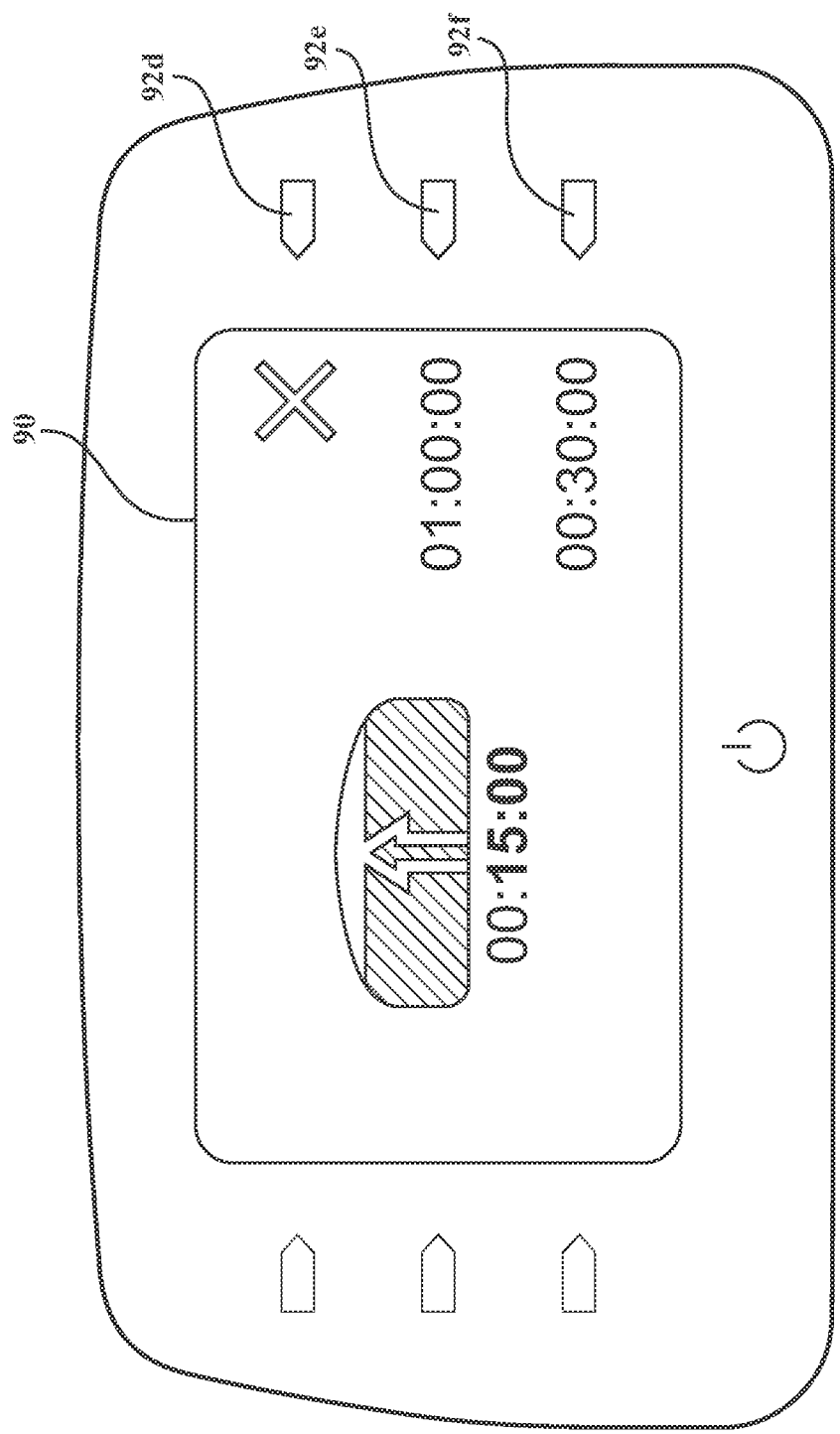
Figure 44P:
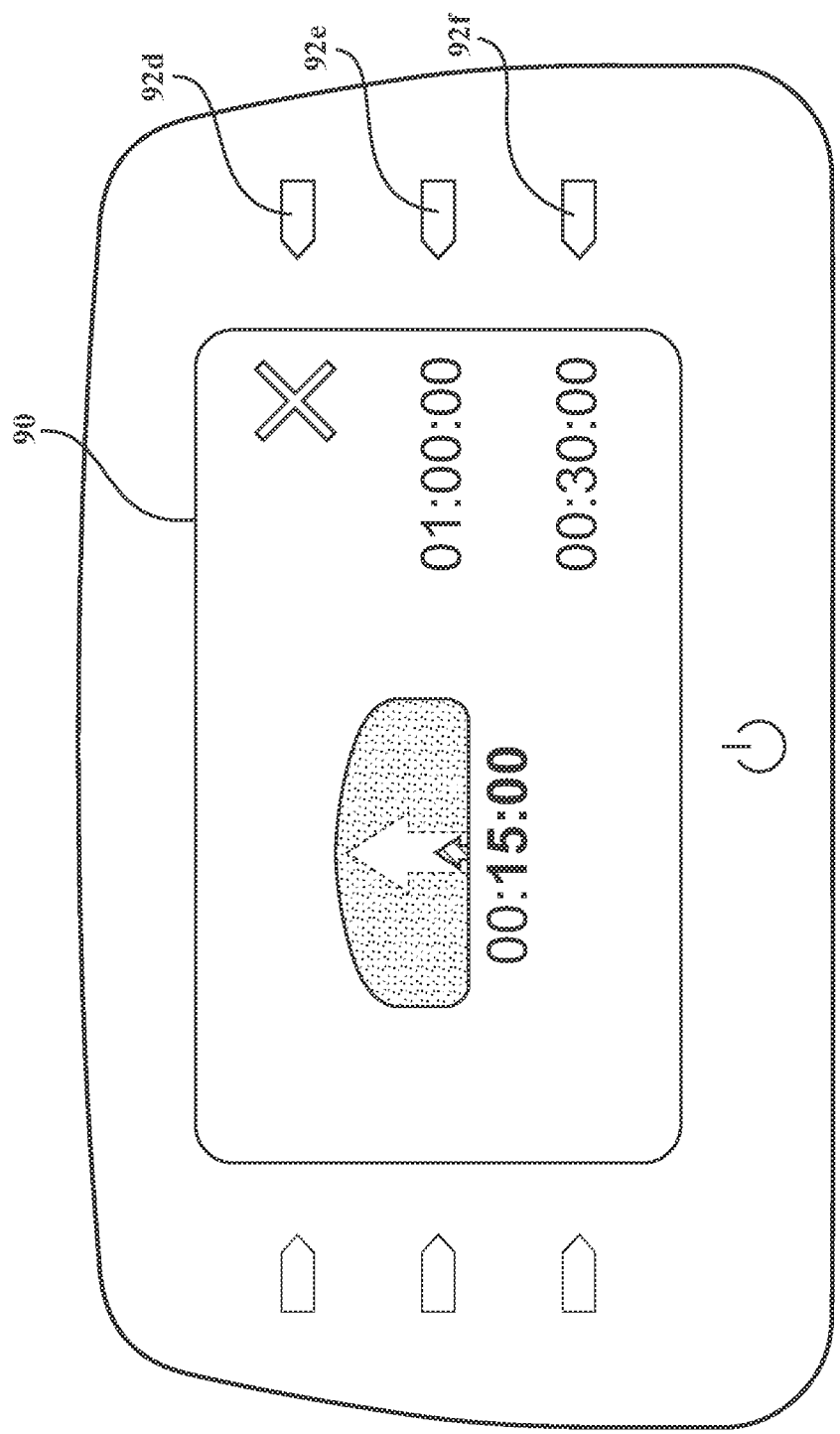
Figure 44Q:
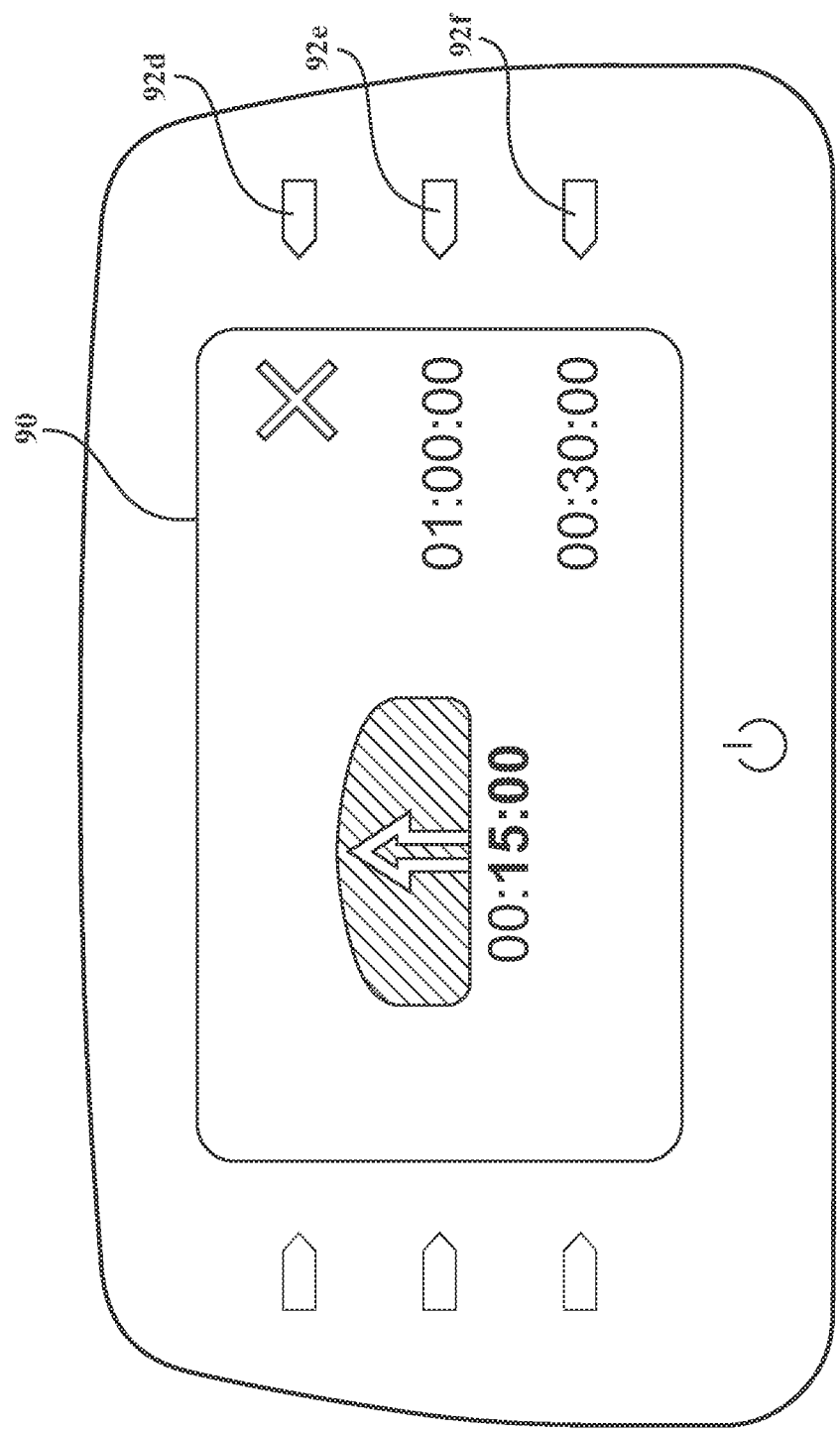
Figure 45A:
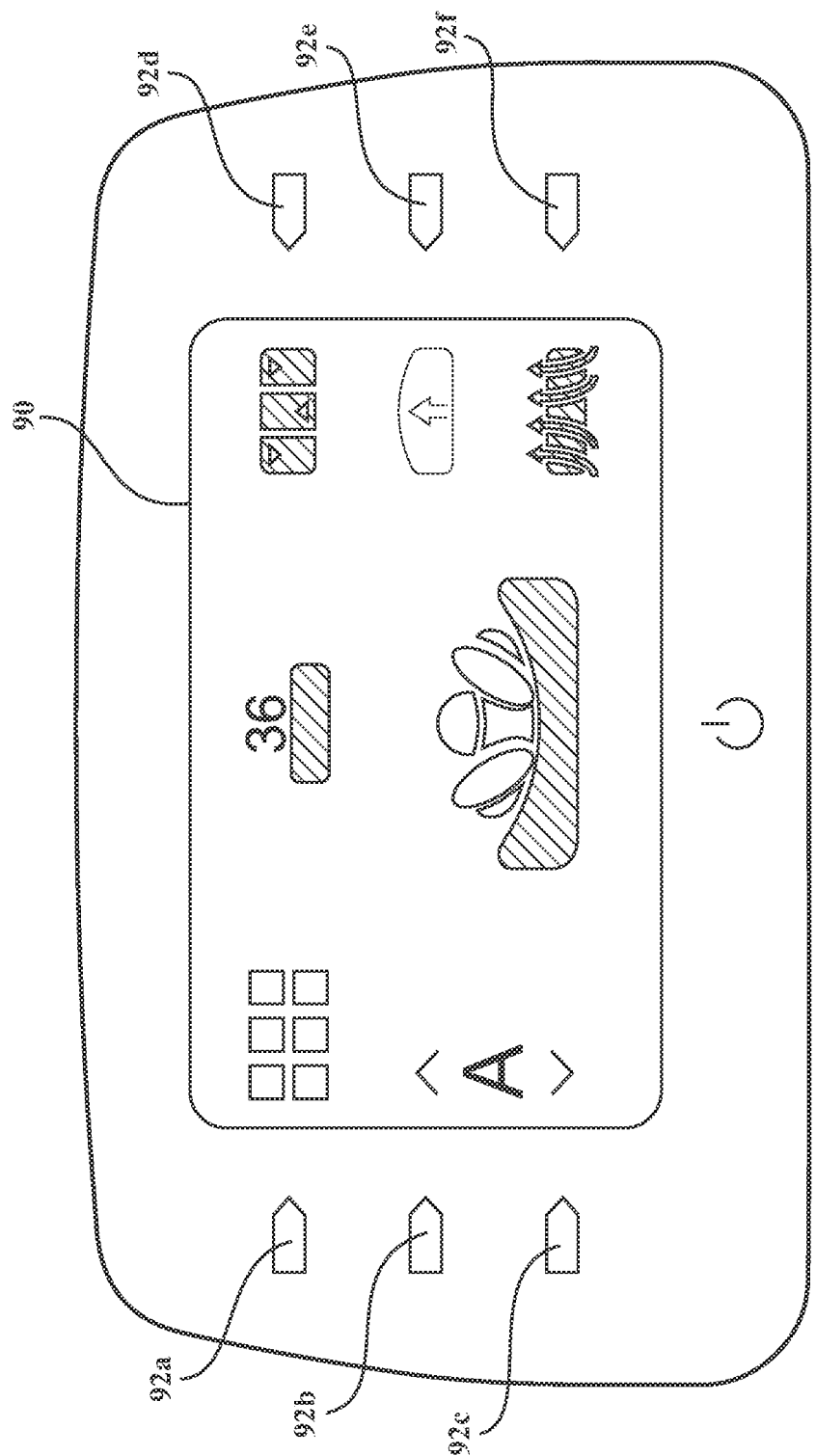
FIGS. 45A-45M illustrate a firmness setting animation displayed on the user interface when the user toggles between an AST function and various firmness settings for the expandable patient support.
Figure 45B:
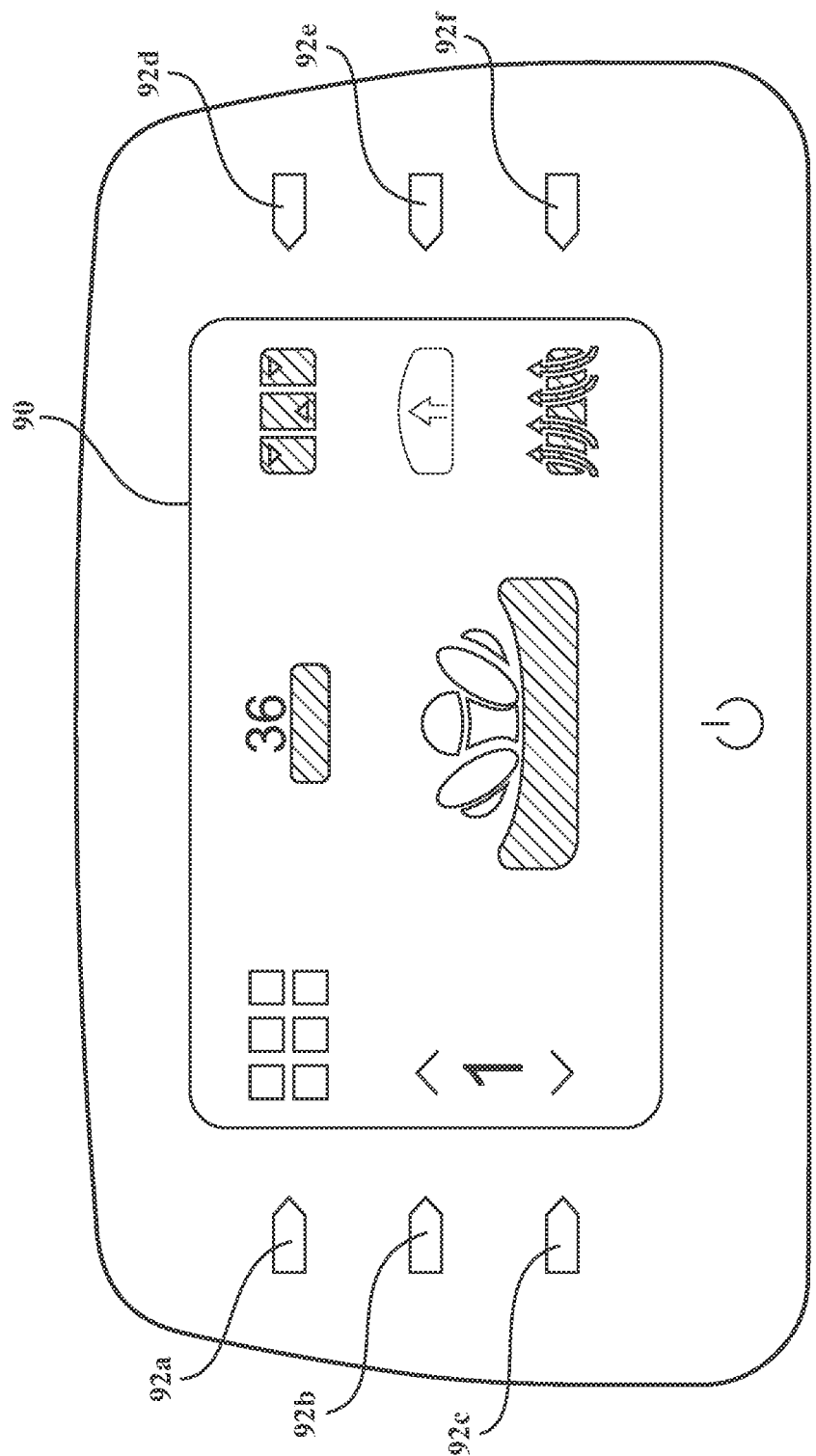
Figure 45C:
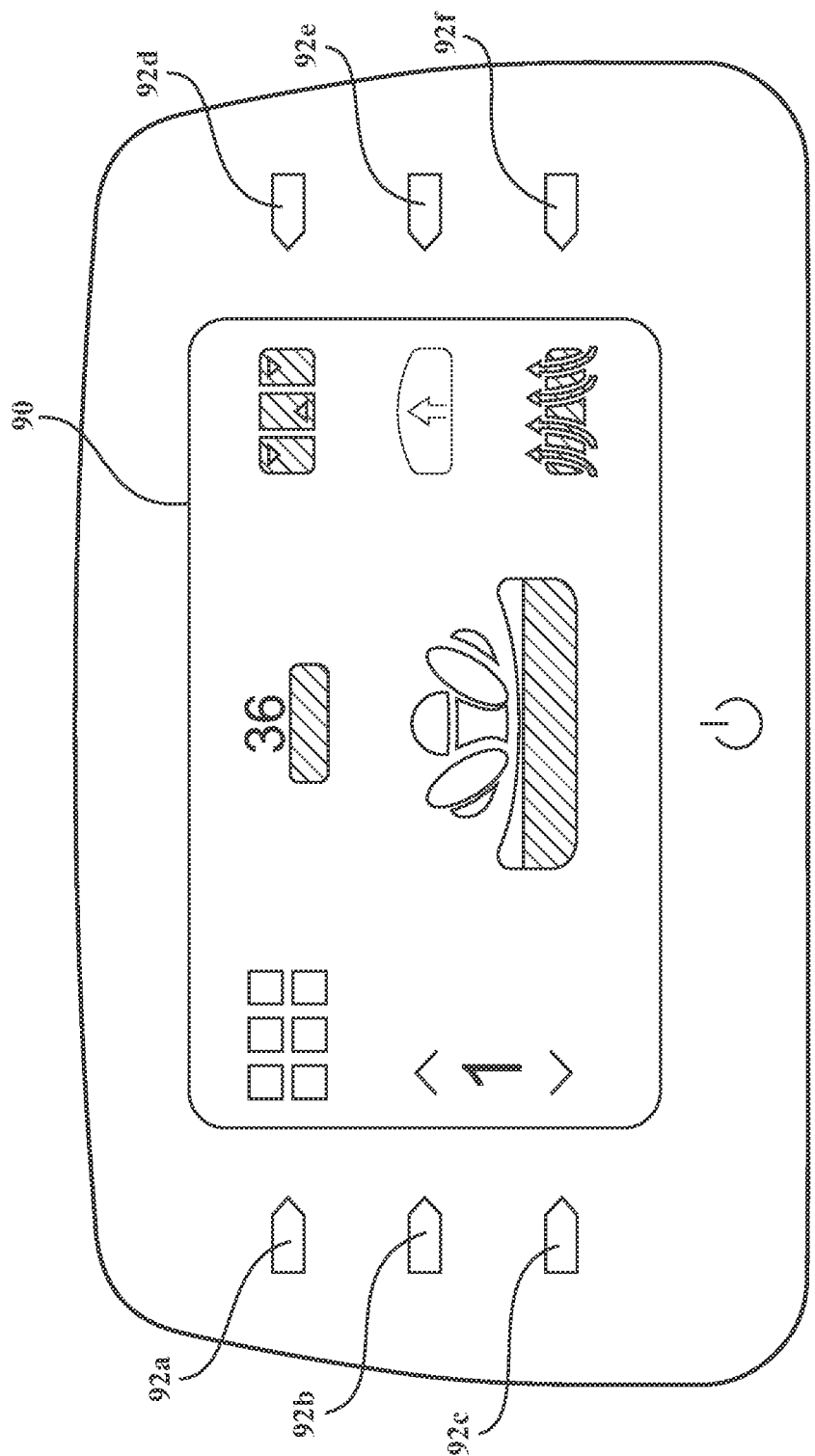
Figure 45D:
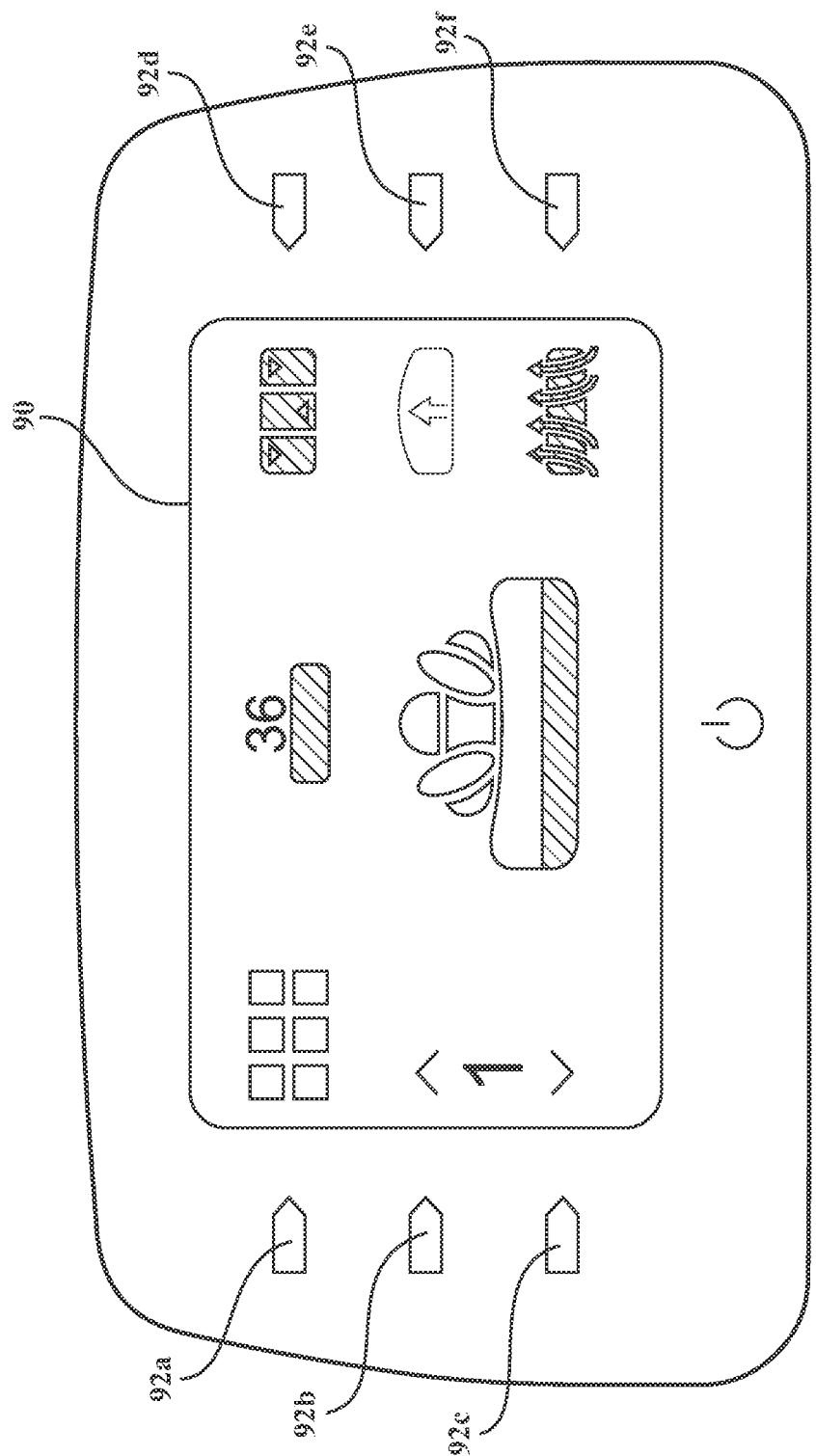
Figure 45E:
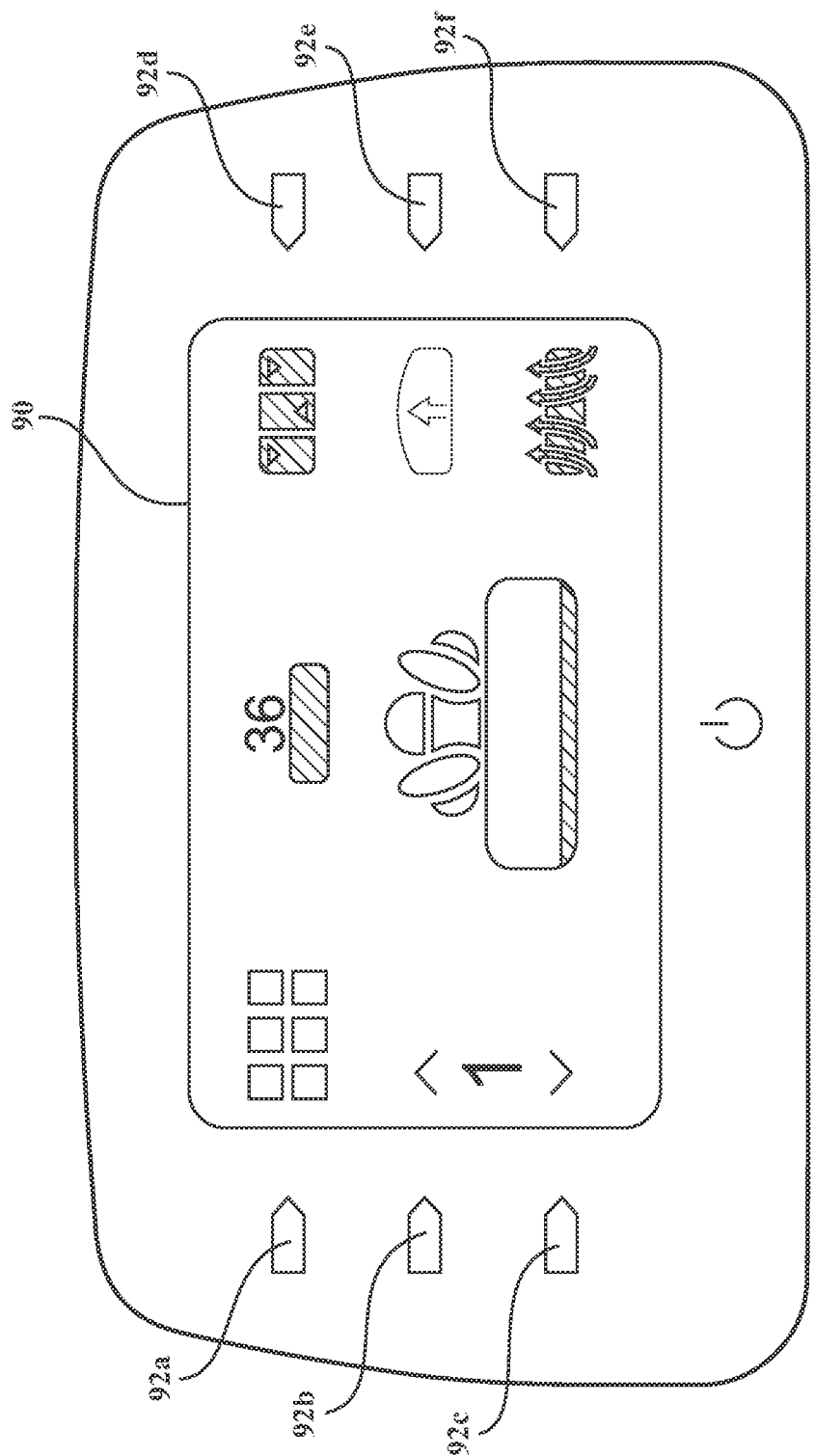
Figure 45F:
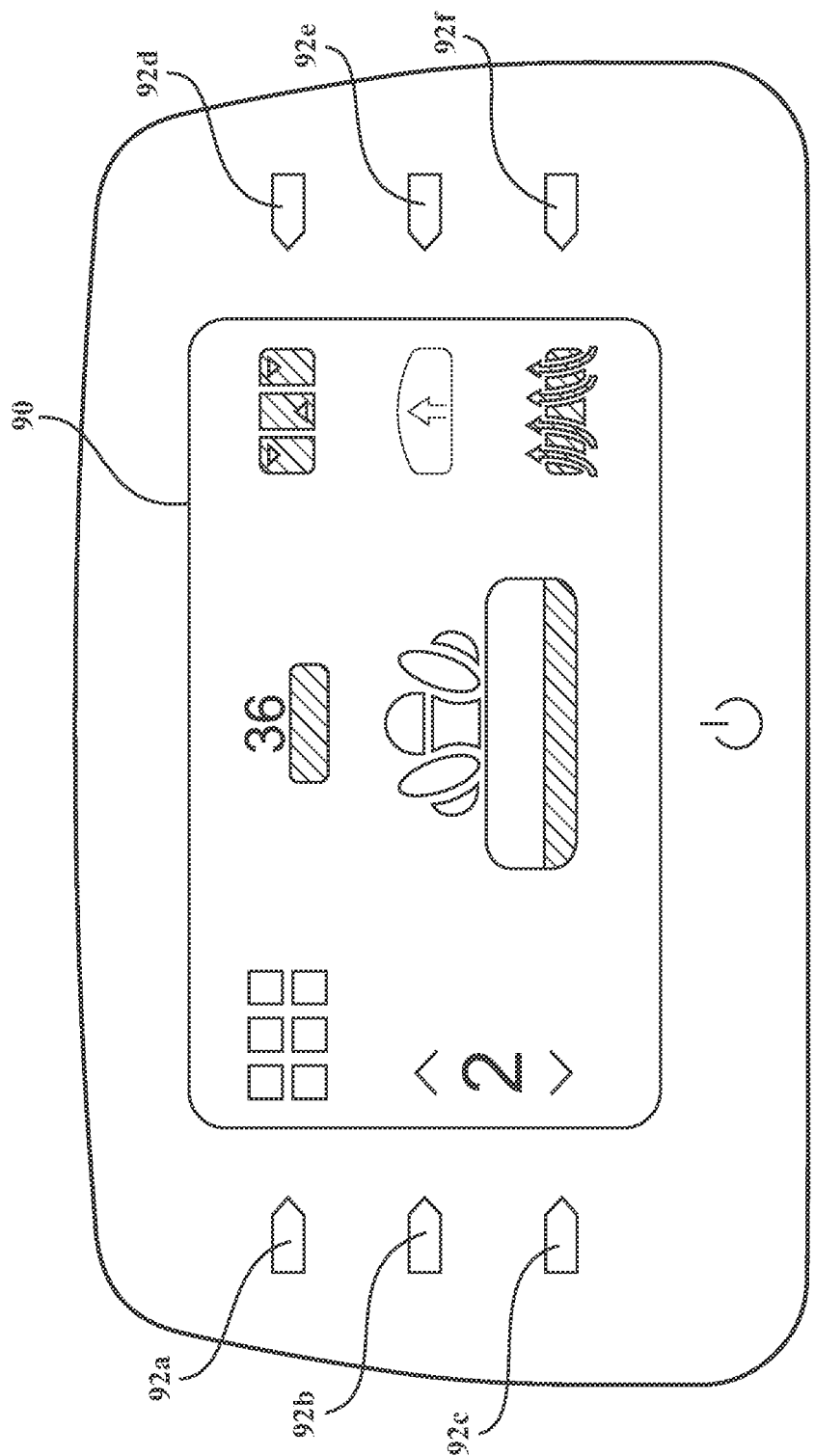
Figure 45G:
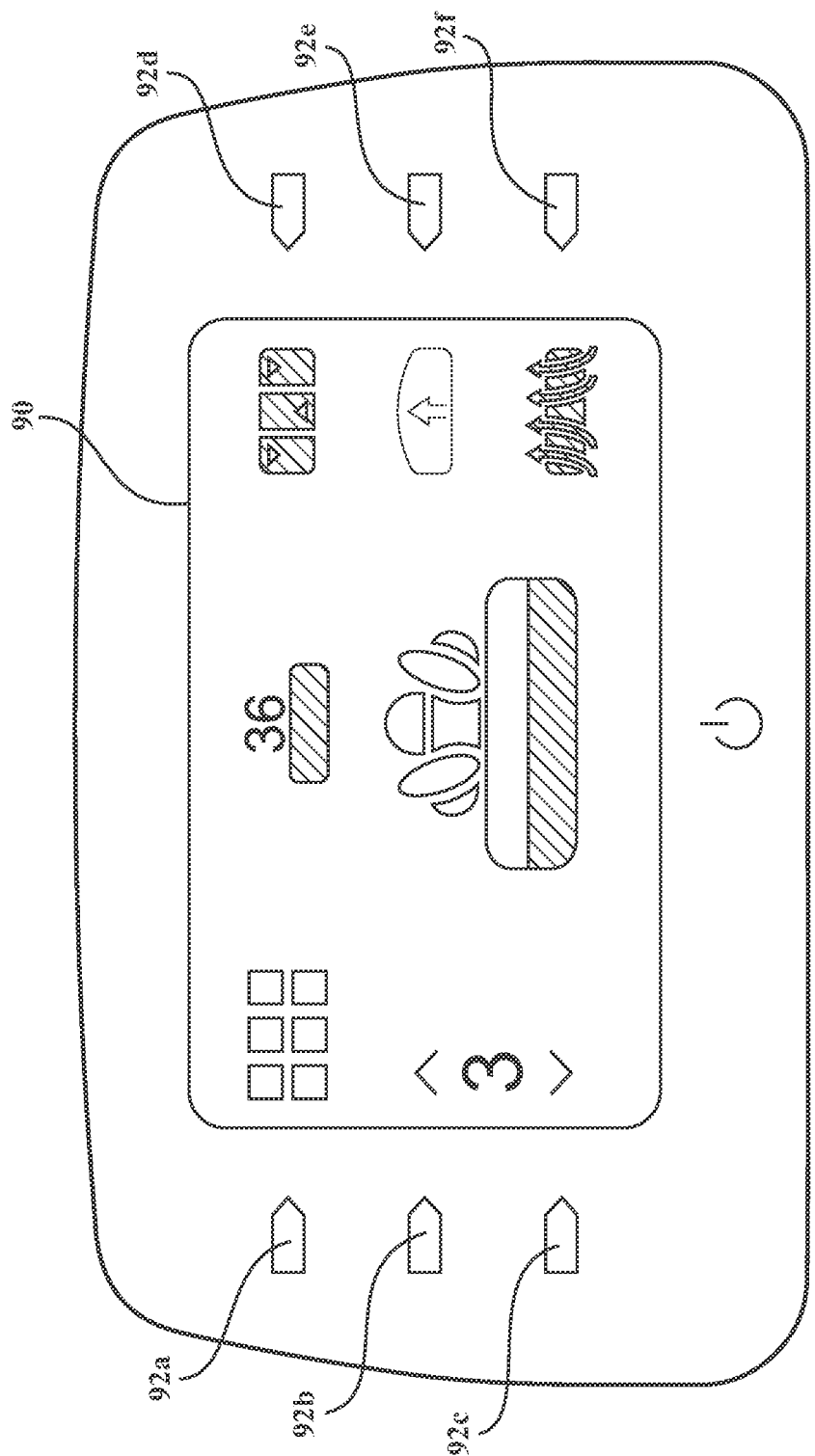
Figure 45H:
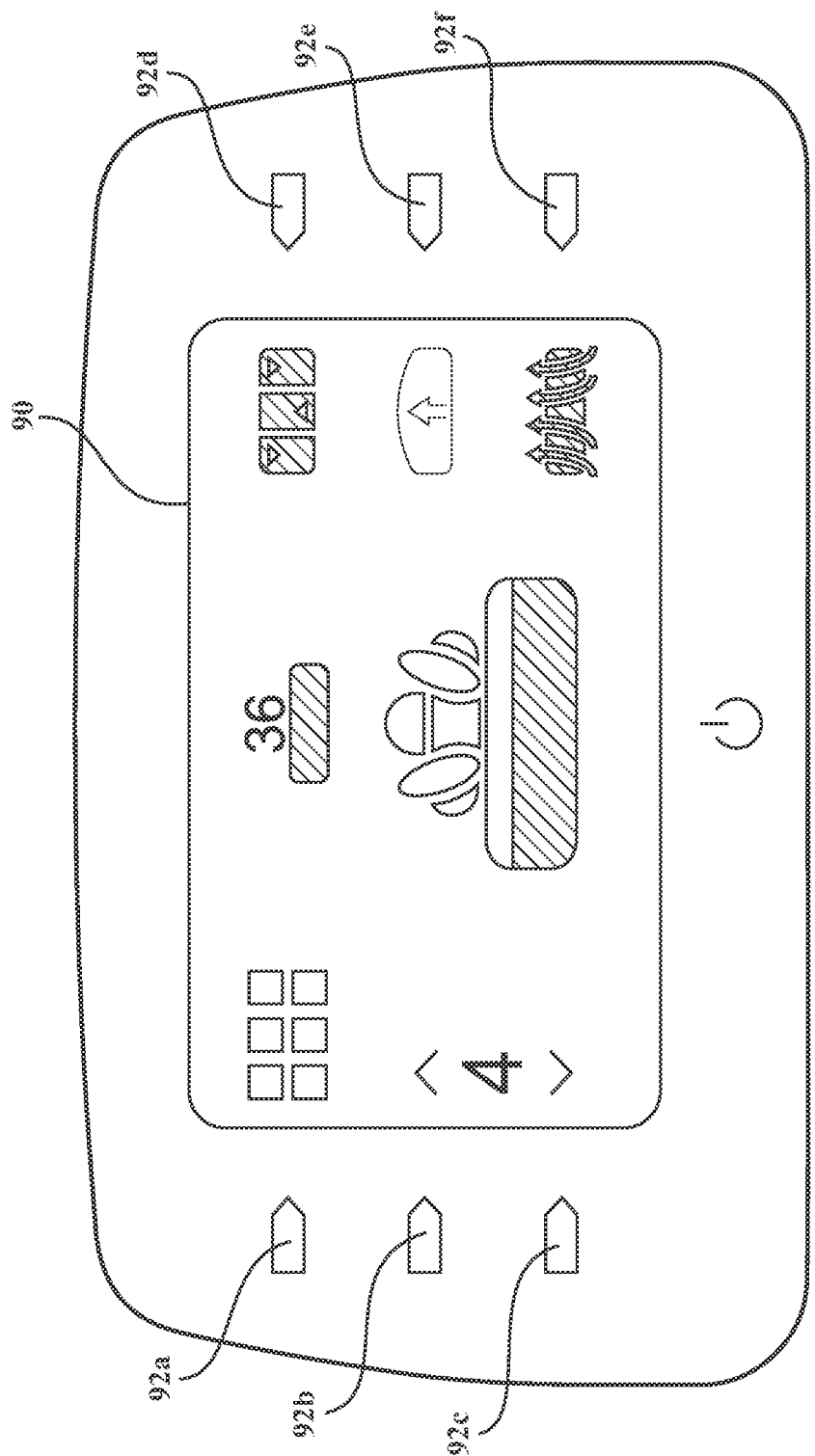
Figure 45I:
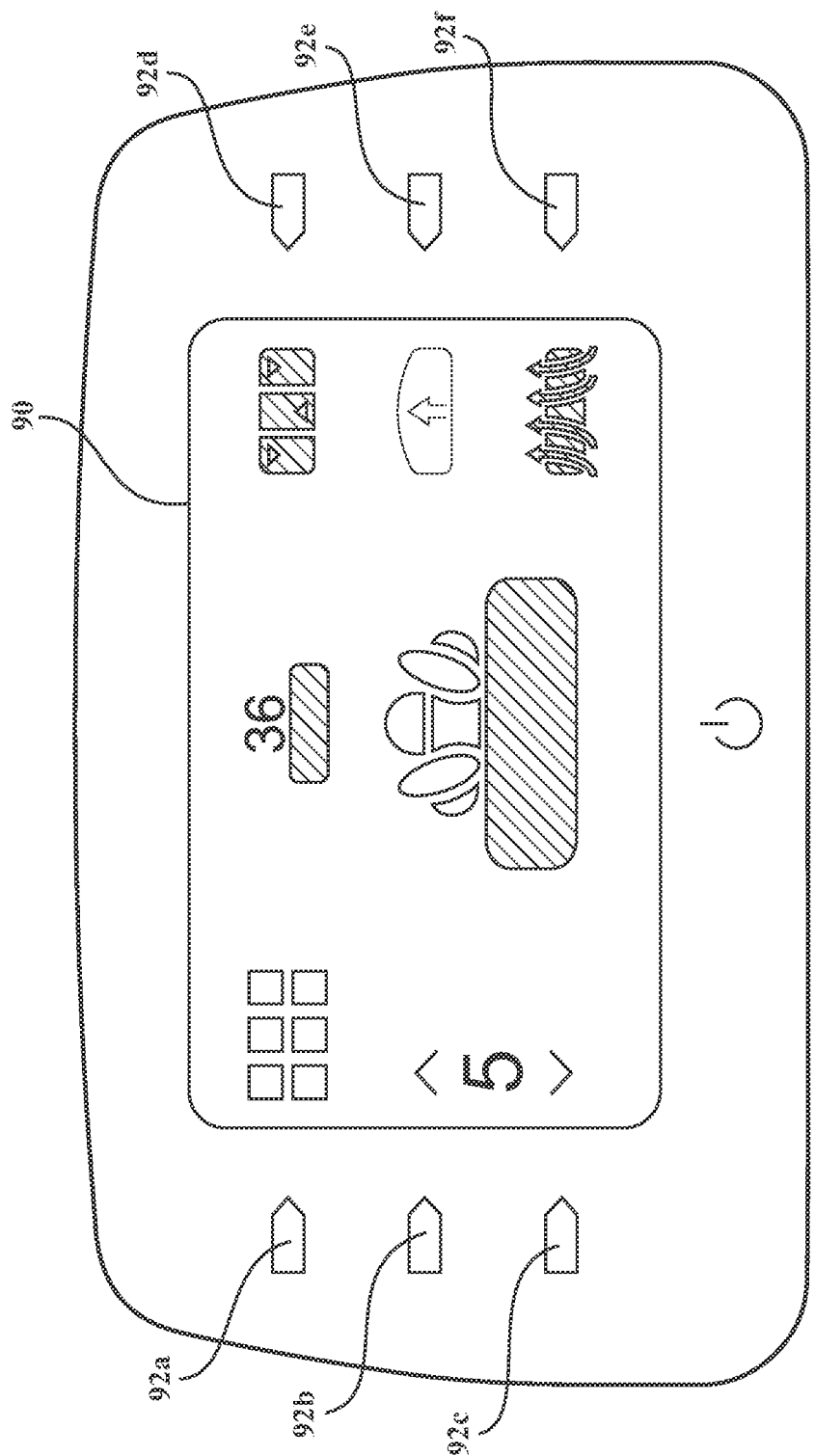
Figure 45J:
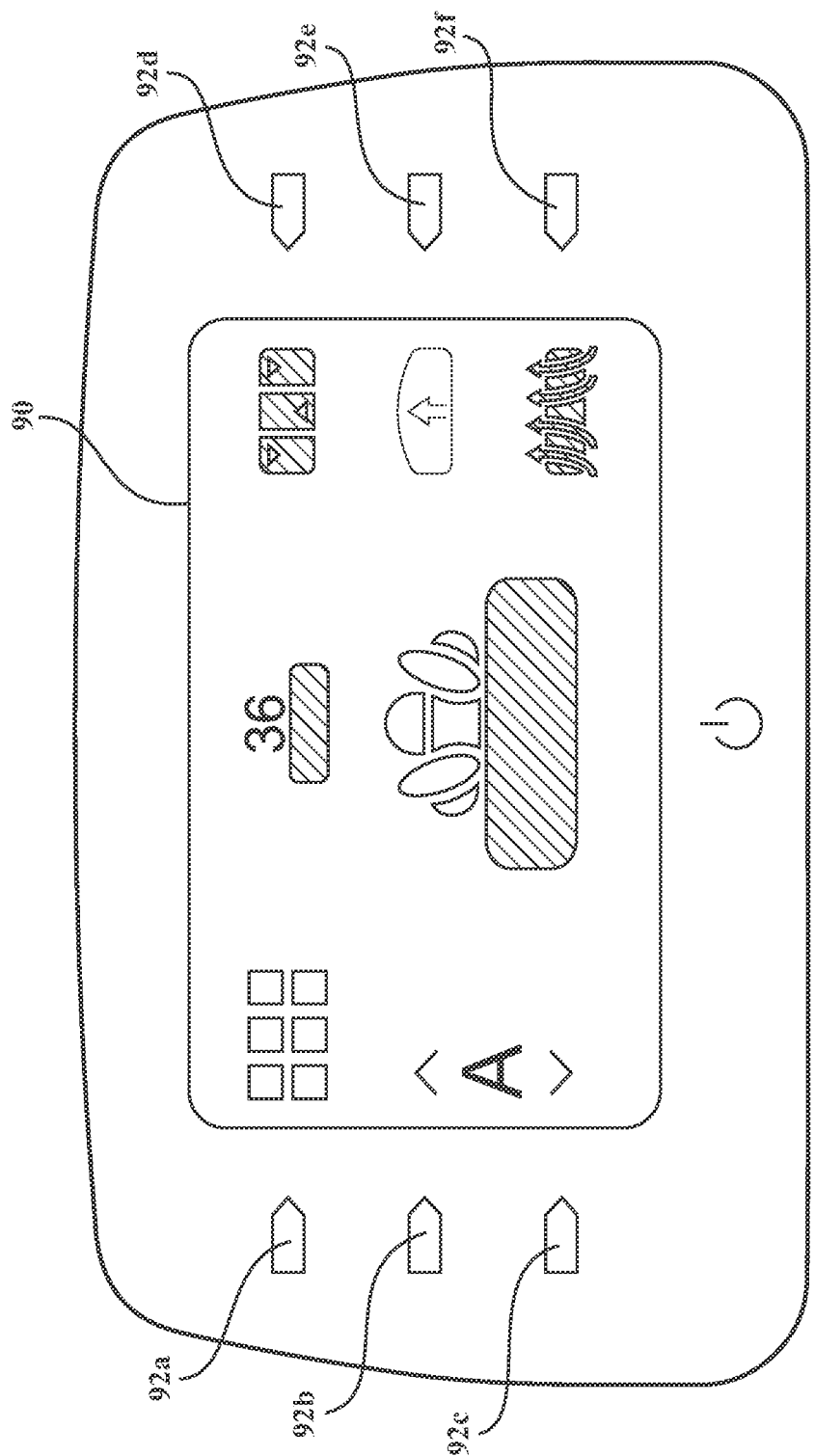
Figure 45K:
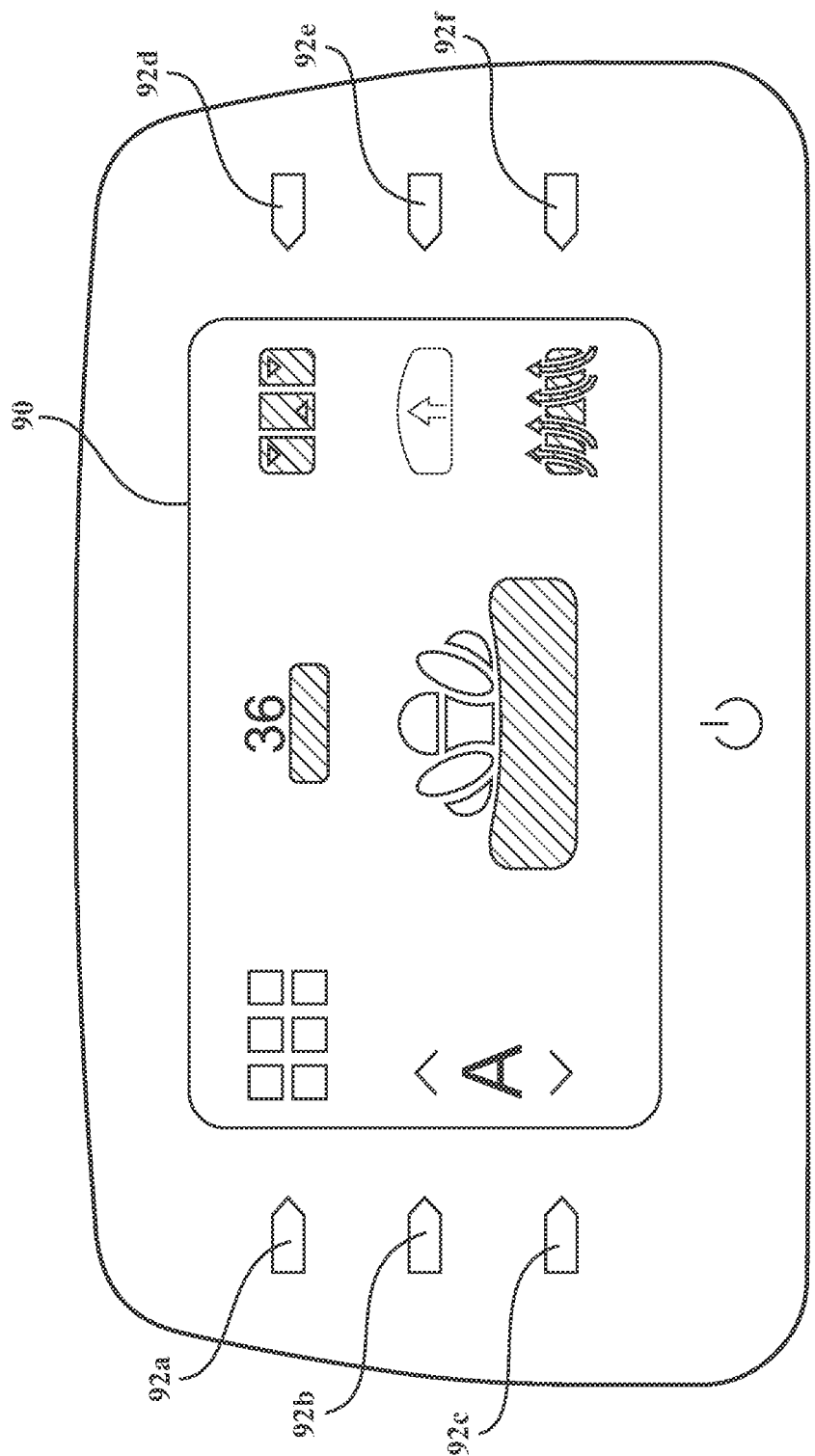
Figure 45L:
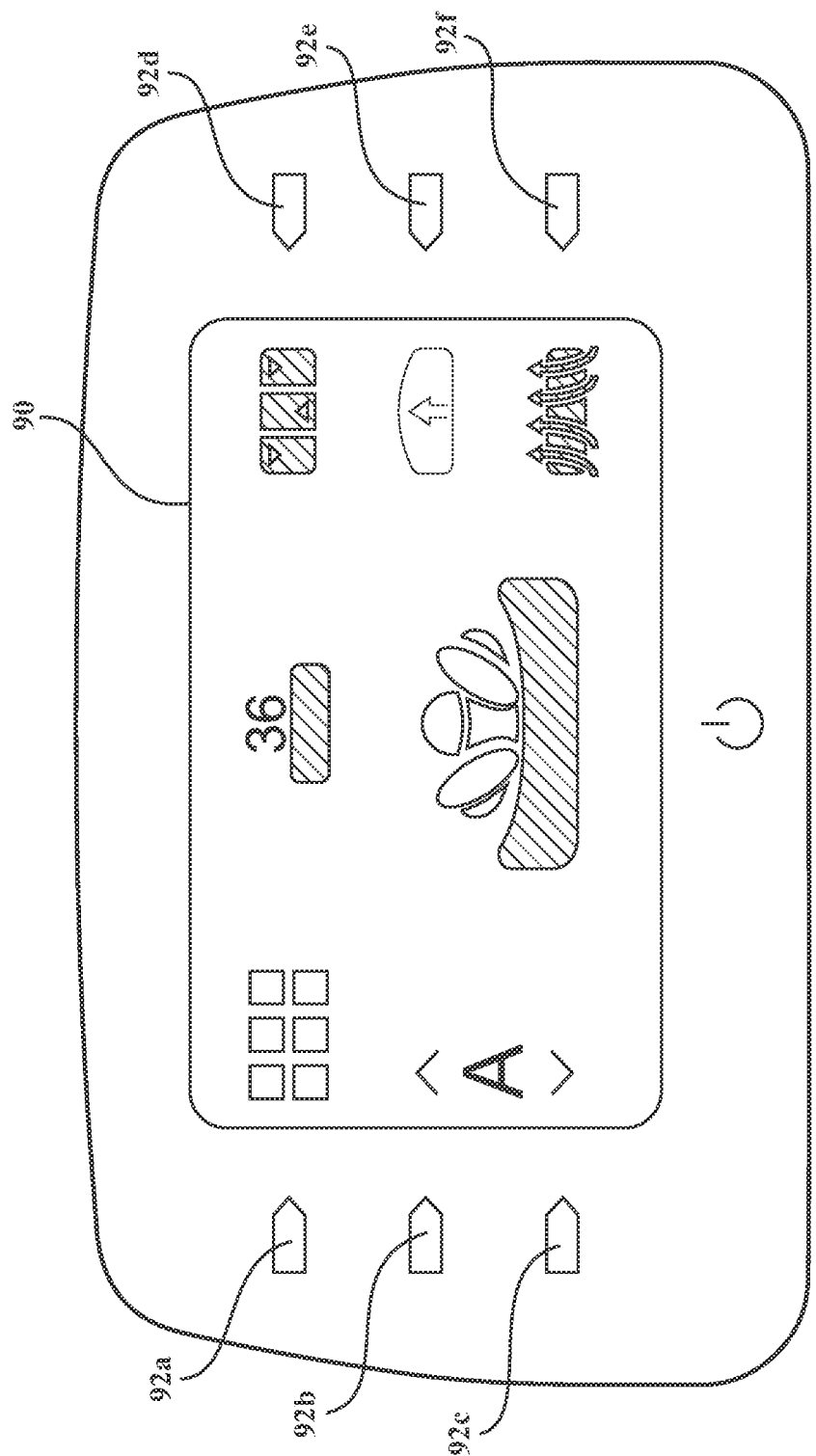
Figure 45M:
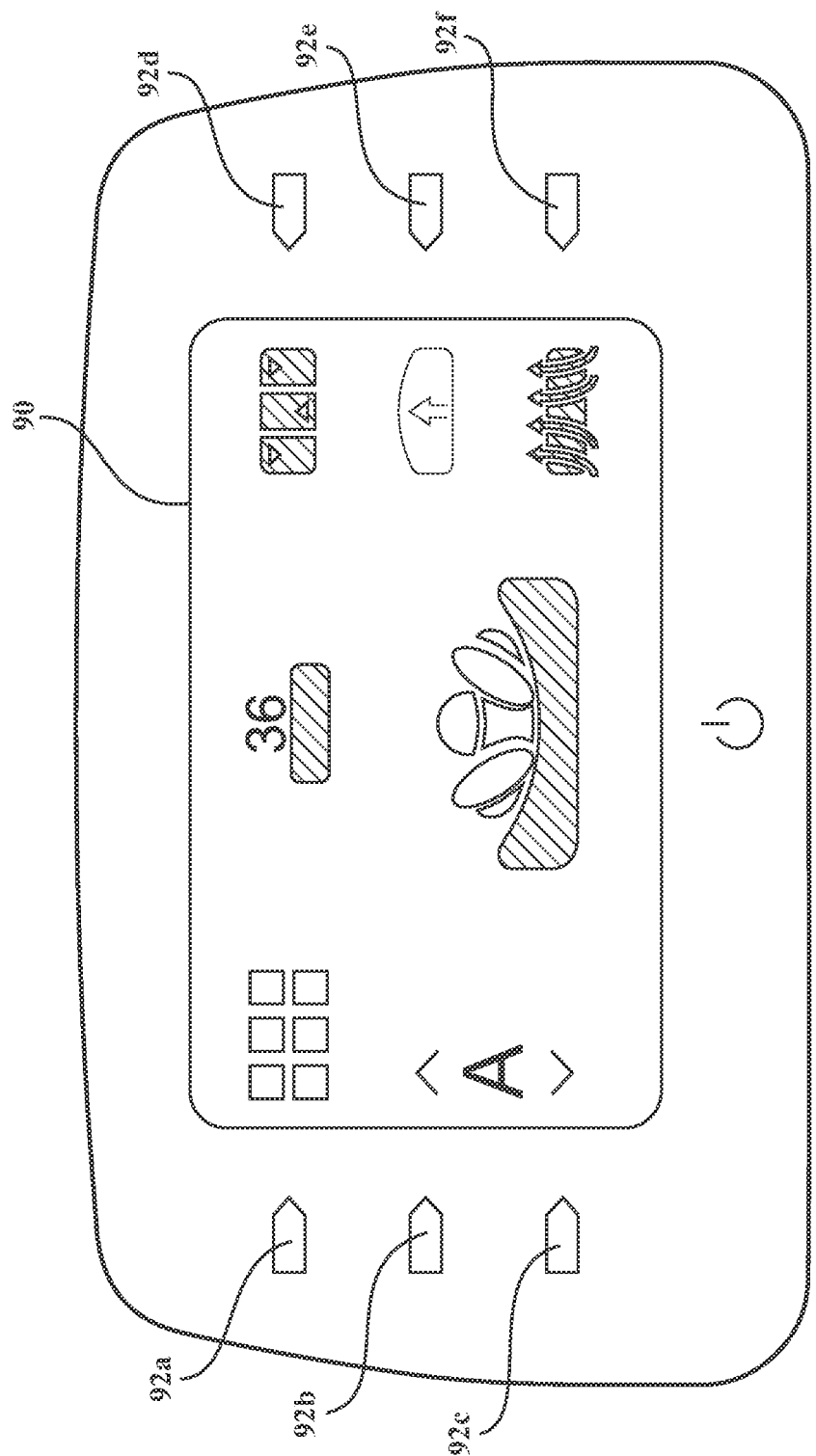

FIGS. 44A-44Q illustrate a sequence of screenshots of the display 90 showing a graphical animation depicting operation of the maximum inflation function in response to the user selecting operation of the maximum inflation function, such as by selecting button 92e in, for example, FIGS. 10A, 18C, 19C, and 23C.

FIGS. 45A-45M illustrate a sequence of screenshots of the display 90 showing a graphical animation depicting operation of the manual firmness selection function from an automatic level (FIG. 45A) to levels 1-5 (e.g., see FIGS. 45B, 45F, 4G, 45H, 45I) and back to the automatic level (FIG. 45M) in response to the user toggling through the levels via the buttons 92b, 92c.

Figure 46:
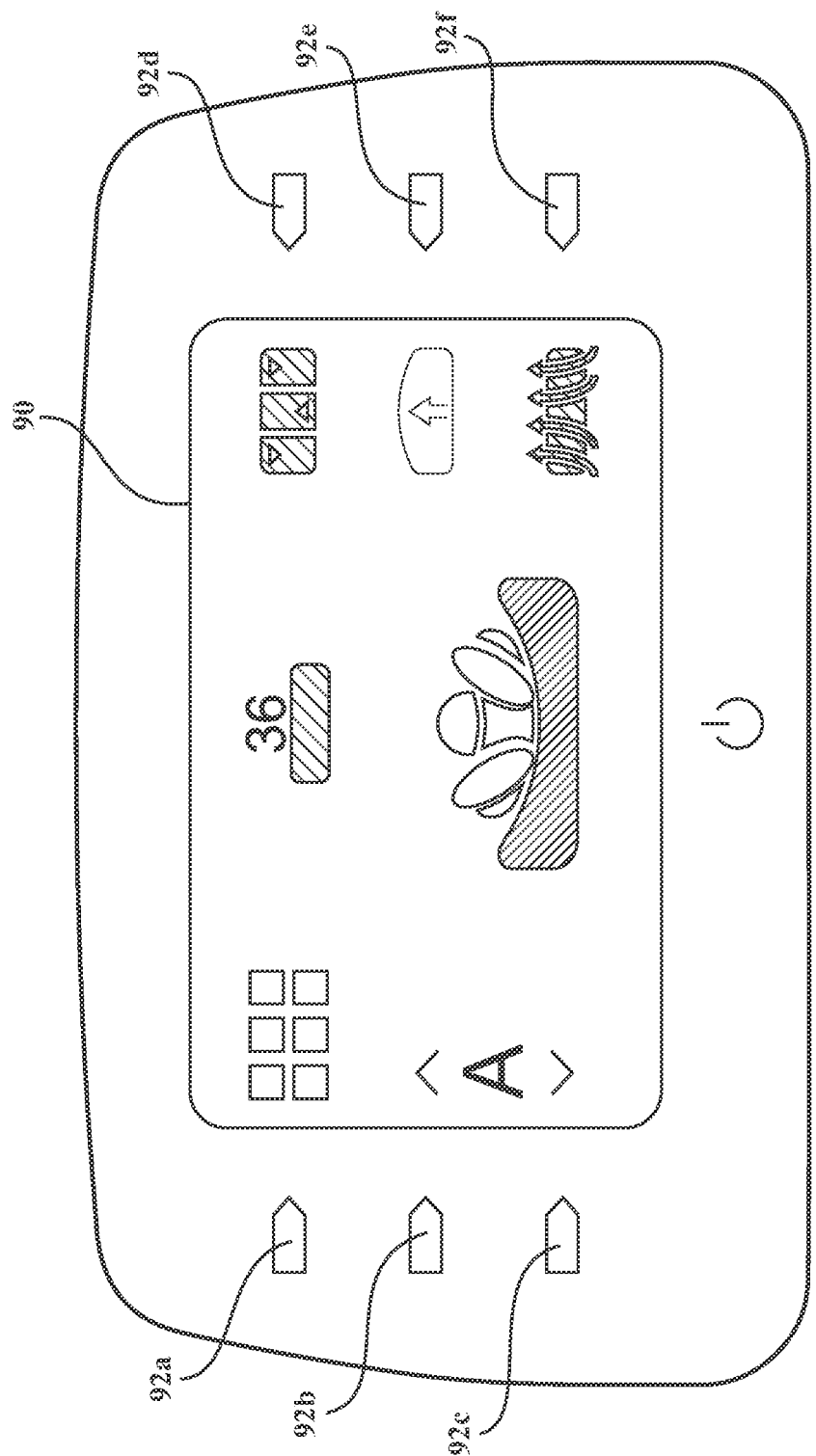
FIG. 46 illustrates one of the home screens when there is an error with the AST function.
Figure 47:
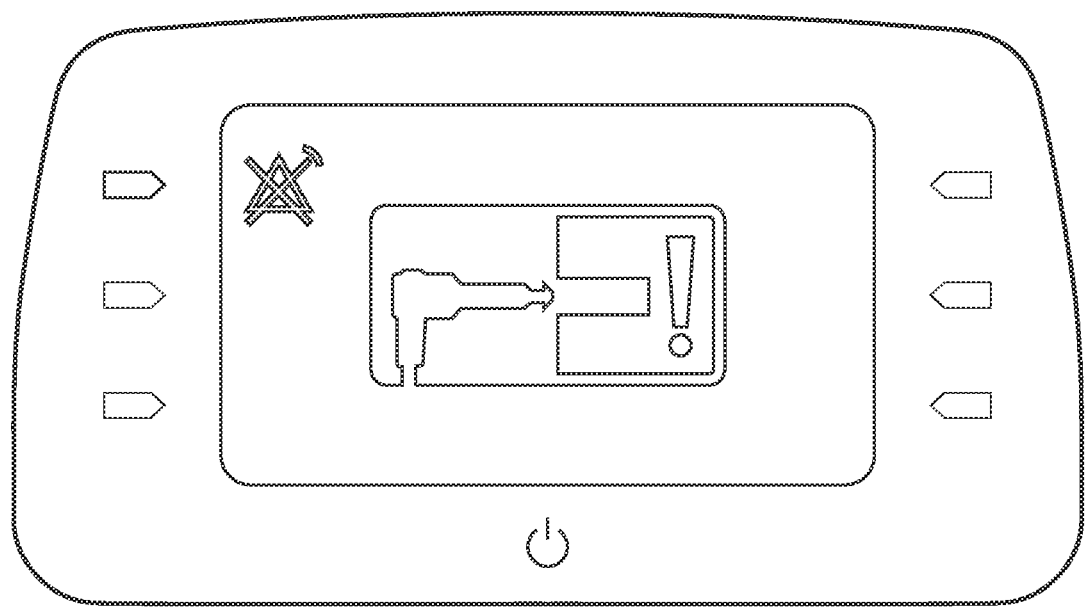
FIG. 47 illustrates a visual alarm and graphic displayed on the user interface when the error with the AST function occurs.
Figure 48:
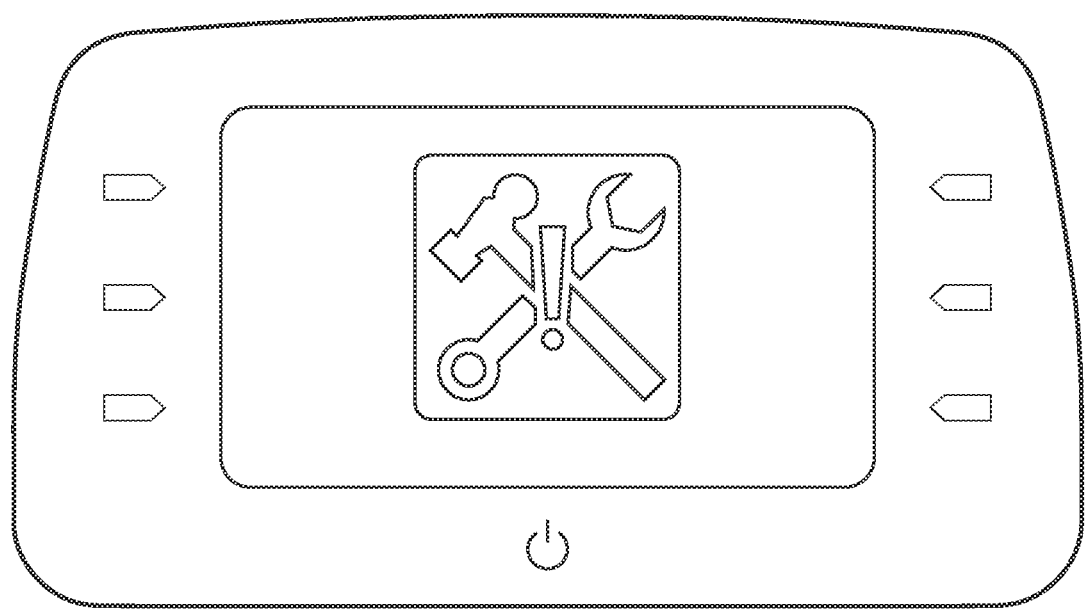
FIG. 48 illustrates a visual alarm and graphic displayed on the user interface when a controller of the expandable patient support determines that an error has occurred with normal functionality.

FIG. 46 illustrates a screenshot of the display 90 when an error occurs with the AST function. FIG. 47 illustrates a screenshot of the display 90 when the error occurs with the AST function. FIG. 48 illustrates a screenshot of the display 90 when an error of normal functionality of the control system 80 has occurred.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient support system for use on a litter of a patient support apparatus, the patient support system comprising:
an expandable patient support including:
a main patient support section having opposing sides and a main patient support surface; and
an auxiliary patient support section having an auxiliary patient support surface, the auxiliary patient support section being expandable away from one of the opposing sides of the main patient support section to expand an overall width of the expandable patient support from a first width to a second width; and
a control assembly connectable to the expandable patient support, the control assembly including:
an expander operatively coupled to the auxiliary patient support section to expand the auxiliary patient support section;
a user interface having a display; and
a controller to be coupled to the expander and the user interface, wherein the controller is configured to display a predetermined sequence of graphical animations on the display to graphically instruct a user to perform a plurality of tasks after the user selects the second width on the user interface and before the controller operates the expander to expand the overall width of the expandable patient support from the first width to the second width, wherein the controller is configured to instruct the user to perform the plurality of tasks by displaying each of the graphical animations of the predetermined sequence at least once before the controller operates the expander to expand the overall width of the expandable patient support.

II. The patient support system of clause I, comprising one or more fastening elements arranged to secure the auxiliary patient support section adjacent to the main patient support section when the auxiliary patient support section is collapsed.

III. The patient support system of clause II, wherein the predetermined sequence of graphical animations includes a deck expansion animation to instruct the user to expand deck sections of the litter to accommodate the expandable patient support at the second width and a fastener release animation to instruct the user to release the one or more fastening elements to allow the auxiliary patient support section to expand away from the main patient support section.

IV. The patient support system of clause III, wherein the controller is configured to:
prompt the user for input, after displaying the deck expansion animation, to confirm that the deck sections of the litter have been expanded to accommodate the expandable patient support at the second width;
initiate one or more additional loops of the deck expansion animation while waiting for the input from the user to confirm that the deck sections have been expanded;
prompt the user for input, after displaying the fastener release animation, to confirm that the one or more fastening elements have been released to allow the auxiliary patient support section to expand away from the main patient support section; and
initiate one or more additional loops of the fastener release animation while waiting for the input from the user to confirm that the one or more fastening elements have been released.

V. The patient support system of any of clauses III-IV, wherein the predetermined sequence of graphical animations includes a patient offloading animation to instruct the user to move a patient off the main patient support surface, wherein the controller is configured to:

prompt the user for input, after displaying the patient offloading animation, to confirm that the patient is off the main patient support surface; and initiate one or more additional loops of the patient offloading animation while waiting for the input from the user to confirm that the patient is off the main patient support surface.

VI. The patient support system of any of clauses III-V, wherein the controller is configured to:

display an auxiliary section expansion animation on the display to graphically depict expansion of the auxiliary patient support section away from the main patient support section;

prompt the user for input, after displaying the auxiliary section expansion animation, to confirm that the auxiliary patient support section is fully expanded away from the main patient support section; and initiate one or more additional loops of the auxiliary section expansion animation while waiting for the input from the user to confirm that the auxiliary patient support section is fully expanded away from the main patient support section.

VII. The patient support system of clause VI, wherein the controller is configured to:

display a patient loading animation on the display to graphically instruct the user to move a patient onto the main patient support surface and the auxiliary patient support surface after the controller operates the expander to expand the overall width of the expandable patient support from the first width to the second width;

prompt the user for input, after displaying the patient loading animation, to confirm that the patient is on the main patient support surface and the auxiliary patient support surface; and initiate one or more additional loops of the patient loading animation while waiting for the input from the user to confirm that the patient is on the main patient support surface and the auxiliary patient support surface.

VIII. The patient support system of clause II, wherein the auxiliary patient support section is collapsible toward the one of the opposing sides of the main patient support section to reduce the overall width of the expandable patient support from the second width to the first width.

IX. The patient support system of clause VIII, wherein the controller is configured to display a second predetermined sequence of graphical animations on the display to graphically instruct the user to perform a second plurality of tasks after the user selects the first width on the user interface, wherein the controller is configured to instruct the user to perform the second plurality of tasks by displaying each of the graphical animations of the second predetermined sequence at least once before the controller seeks input from the user that each of the second plurality of tasks was completed.

X. The patient support system of clause IX, wherein the second predetermined sequence of graphical animations includes a fastener engagement animation to instruct the user to engage the one or more fastening elements to secure the auxiliary patient support section to the main patient support section and a deck collapsing animation to instruct the user to collapse deck sections of the litter to accommodate the expandable patient support at the first width.

XI. The patient support system of clause X, wherein the controller is configured to:

prompt the user for input, after displaying the fastener engagement animation, to confirm that the one or more fastening elements have been engaged to secure the auxiliary patient support section to the main patient support section;

initiate one or more additional loops of the fastener engagement animation while waiting for the input from the user to confirm that the one or more fastening elements have been engaged;

prompt the user for input, after displaying the deck collapsing animation, to confirm that the deck sections of the litter have been collapsed to accommodate the expandable patient support at the first width; and initiate one or more additional loops of the deck collapsing animation while waiting for the input from the user to confirm that the deck sections have been collapsed.

XII. The patient support system of any of clauses X-XI, wherein the second predetermined sequence of graphical animations includes a patient offloading animation to instruct the user to move a patient off the main patient support surface and the auxiliary patient support surface, wherein the controller is configured to:

prompt the user for input, after displaying the patient offloading animation, to confirm that the patient is off the main patient support surface and the auxiliary patient support surface; and initiate one or more additional loops of the patient offloading animation while waiting for the input from the user to confirm that the patient is off the main patient support surface and the auxiliary patient support surface.

XIII. The patient support system of any of clauses X-XII, wherein the controller is configured to:

display an auxiliary section collapsing animation on the display to graphically depict collapsing of the auxiliary patient support section;

prompt the user for input, after displaying the auxiliary section collapsing animation, to confirm that the auxiliary patient support section is fully collapsed; and initiate one or more additional loops of the auxiliary section collapsing animation while waiting for the input from the user to confirm that the auxiliary patient support section is fully collapsed.

XIV. The patient support system of any of clauses XII-XIII, wherein the second predetermined sequence of graphical animations includes a patient loading animation to graphically instruct the user to move the patient onto the main patient support surface after the controller operates the expander to reduce the overall width of the expandable patient support from the second width to the first width, wherein the controller is configured to:

prompt the user for input, after displaying the patient loading animation, to confirm that the patient is on the main patient support surface; and initiate one or more additional loops of the patient loading animation while waiting for the input from the user to confirm that the patient is on the main patient support surface.

XV. A method for reconfiguring a patient support system for use on a litter of a patient support apparatus, the patient support system including an expandable patient support having a main patient support section with a main patient support surface and an auxiliary patient support section with an auxiliary patient support surface, and a control assembly including an expander to expand the auxiliary patient support section, and a user interface having a display, the method comprising the steps of:

receiving a user selection to expand an overall width of the expandable patient support from a first width to a second width;

displaying a predetermined sequence of graphical animations on the display to graphically instruct a user to perform a plurality of tasks after the user selects the second width on the user interface; and expanding the overall width of the expandable patient support from the first width to the second width after displaying the predetermined sequence of graphical animations, wherein the user is instructed to perform the plurality of tasks by displaying each of the graphical animations of the predetermined sequence at least once before expanding the overall width of the expandable patient support to the second width.

XVI. The method of clause XV, wherein displaying the predetermined sequence of graphical animations on the display to graphically instruct a user to perform a plurality of tasks after the user selects the second width on the user interface includes displaying a deck expansion animation to instruct the user to expand deck sections of the litter to accommodate the expandable patient support at the second width and displaying a fastener release animation to instruct the user to release one or more fastening elements to allow the auxiliary patient support section to expand away from the main patient support section.

XVII. The method of clause XVI, comprising:

prompting the user for input, after displaying the deck expansion animation, to confirm that the deck sections of the litter have been expanded to accommodate the expandable patient support at the second width;

initiating one or more additional loops of the deck expansion animation while waiting for the input from the user to confirm that the deck sections have been expanded;

prompting the user for input, after displaying the fastener release animation, to confirm that the one or more fastening elements have been released to allow the auxiliary patient support section to expand away from the main patient support section; and initiating one or more additional loops of the fastener release animation while waiting for the input from the user to confirm that the one or more fastening elements have been released.

XVIII. The method of any of clauses XVI-XVII, wherein displaying the predetermined sequence of graphical animations on the display to graphically instruct a user to perform a plurality of tasks after the user selects the second width on the user interface includes displaying a patient offloading animation to instruct the user to move a patient off the main patient support surface.

XIX. The method of clause XVIII, comprising prompting the user for input, after displaying the patient offloading animation, to confirm that the patient is off the main patient support surface; and initiating one or more additional loops of the patient offloading animation while waiting for the input from the user to confirm that the patient is off the main patient support surface.

XX. The method of any of clauses XVI-XIX, comprising:

displaying an auxiliary section expansion animation on the display to graphically depict expansion of the auxiliary patient support section away from the main patient support section;

prompting the user for input, after displaying the auxiliary section expansion animation, to confirm that the auxiliary patient support section is fully expanded away from the main patient support section; and initiating one or more additional loops of the auxiliary section expansion animation while waiting for the input from the user to confirm that the auxiliary patient support section is fully expanded away from the main patient support section.

XXI. The method of clause XX, comprising:

displaying a patient loading animation on the display to graphically instruct the user to move a patient onto the main patient support surface and the auxiliary patient support surface expanding the overall width of the expandable patient support from the first width to the second width;

prompting the user for input, after displaying the patient loading animation, to confirm that the patient is on the main patient support surface and the auxiliary patient support surface; and initiating one or more additional loops of the patient loading animation while waiting for the input from the user to confirm that the patient is on the main patient support surface and the auxiliary patient support surface.

XXII. The method of any of clauses XV-XXI, comprising displaying a second predetermined sequence of graphical animations on the display to graphically instruct the user to perform a second plurality of tasks after the user selects the first width on the user interface, wherein the user is instructed to perform the second plurality of tasks by displaying each of the graphical animations of the second predetermined sequence at least once before seeking input from the user that each of the second plurality of tasks was completed.

XXIII. The method of clause XXII, wherein displaying the second predetermined sequence of graphical animations on the display to graphically instruct the user to perform the second plurality of tasks includes displaying a fastener engagement animation to instruct the user to engage one or more fastening elements to secure the auxiliary patient support section to the main patient support section and displaying a deck collapsing animation to instruct the user to collapse deck sections of the litter to accommodate the expandable patient support at the first width.

XXIV. The method of clause XXIII, comprising:

prompting the user for input, after playing the fastener engagement animation, to confirm that the one or more fastening elements have been engaged to secure the auxiliary patient support section to the main patient support section;

initiating one or more additional loops of the fastener engagement animation while waiting for the input from the user to confirm that the one or more fastening elements have been engaged;

prompting the user for input, after displaying the deck collapsing animation, to confirm that the deck sections of the litter have been collapsed to accommodate the expandable patient support at the first width; and initiating one or more additional loops of the deck collapsing animation while waiting for the input from the user to confirm that the deck sections have been collapsed.

XXV. The method of any of clauses XXIII-XXIV, wherein displaying the second predetermined sequence of graphical animations on the display to graphically instruct the user to perform the second plurality of tasks includes displaying a patient offloading animation to instruct the user to move a patient off the main patient support surface and the auxiliary patient support surface.

XXVI. The method of clause XXV, comprising:
prompting the user for input, after displaying the patient offloading animation, to confirm that the patient is off the main patient support surface and the auxiliary patient support surface; and
initiating one or more additional loops of the patient offloading animation while waiting for the input from the user to confirm that the patient is off the main patient support surface and the auxiliary patient support surface.

XXVII. The method of any of clauses XXIII-XXVI, comprising:
displaying an auxiliary section collapsing animation on the display to graphically depict collapsing of the auxiliary patient support section;
prompting the user for input, after displaying the auxiliary section collapsing animation, to confirm that the auxiliary patient support section is fully collapsed; and
initiating one or more additional loops of the auxiliary section collapsing animation while waiting for the input from the user to confirm that the auxiliary patient support section is fully collapsed.

XXVIII. The method of any of clauses XXVI-XXVII, wherein displaying the second predetermined sequence of graphical animations on the display to graphically instruct the user to perform the second plurality of tasks includes displaying a patient loading animation on the display to graphically instruct the user to move the patient onto the main patient support surface after reducing the overall width of the expandable patient support from the second width to the first width.

XXIX. The method of clause XXVIII, comprising:
prompting the user for input, after playing the patient loading animation, to confirm that the patient is on the main patient support surface; and
initiating one or more additional loops of the patient loading animation while waiting for the input from the user to confirm that the patient is on the main patient support surface.

What is claimed is:

1. A patient support system for use on a litter of a patient support apparatus, the patient support system comprising:
an expandable patient support including:
a main patient support section having opposing sides and a main patient support surface;
an auxiliary patient support section having an auxiliary patient support surface, the auxiliary patient support section being expandable away from one of the opposing sides of the main patient support section to expand an overall width of the expandable patient support from a first width to a second width; and
one or more fastening elements arranged to secure the auxiliary patient support section adjacent to the main patient support section when the auxiliary patient support section is collapsed; and
a control assembly connectable to the expandable patient support, the control assembly including:
an expander operatively coupled to the auxiliary patient support section to expand the auxiliary patient support section;
a user interface having a display; and
a controller to be coupled to the expander and the user interface, wherein the controller is configured to display a predetermined sequence of graphical animations on the display to graphically instruct a user to perform a plurality of tasks after the user selects the second width on the user interface and before the controller operates the expander to expand the overall width of the expandable patient support from the first width to the second width, wherein the controller is configured to instruct the user to perform the plurality of tasks by displaying each of the graphical animations of the predetermined sequence at least once before the controller operates the expander to expand the overall width of the expandable patient support, wherein the predetermined sequence of graphical animations includes a deck expansion animation to instruct the user to expand deck sections of the litter to accommodate the expandable patient support at the second width and a fastener release animation to instruct the user to release the one or more fastening elements to allow the auxiliary patient support section to expand away from the main patient support section.

2. The patient support system of claim 1, wherein the controller is configured to:
prompt the user for input, after displaying the deck expansion animation, to confirm that the deck sections of the litter have been expanded to accommodate the expandable patient support at the second width;
initiate one or more additional loops of the deck expansion animation while waiting for the input from the user to confirm that the deck sections have been expanded;
prompt the user for input, after displaying the fastener release animation, to confirm that the one or more fastening elements have been released to allow the auxiliary patient support section to expand away from the main patient support section; and
initiate one or more additional loops of the fastener release animation while waiting for the input from the user to confirm that the one or more fastening elements have been released.

3. The patient support system of claim 1, wherein the predetermined sequence of graphical animations includes a patient offloading animation to instruct the user to move a patient off the main patient support surface, wherein the controller is configured to:
prompt the user for input, after displaying the patient offloading animation, to confirm that the patient is off the main patient support surface; and
initiate one or more additional loops of the patient offloading animation while waiting for the input from the user to confirm that the patient is off the main patient support surface.

4. The patient support system of claim 1, wherein the controller is configured to:
display an auxiliary section expansion animation on the display to graphically depict expansion of the auxiliary patient support section away from the main patient support section;
prompt the user for input, after displaying the auxiliary section expansion animation, to confirm that the auxiliary patient support section is fully expanded away from the main patient support section; and
initiate one or more additional loops of the auxiliary section expansion animation while waiting for the input from the user to confirm that the auxiliary patient support section is fully expanded away from the main patient support section.

5. The patient support system of claim 4, wherein the controller is configured to:

display a patient loading animation on the display to graphically instruct the user to move a patient onto the main patient support surface and the auxiliary patient support surface after the controller operates the expander to expand the overall width of the expandable patient support from the first width to the second width;

prompt the user for input, after displaying the patient loading animation, to confirm that the patient is on the main patient support surface and the auxiliary patient support surface; and initiate one or more additional loops of the patient loading animation while waiting for the input from the user to confirm that the patient is on the main patient support surface and the auxiliary patient support surface.

6. The patient support system of claim 1, wherein the auxiliary patient support section is collapsible toward the one of the opposing sides of the main patient support section to reduce the overall width of the expandable patient support from the second width to the first width.

7. The patient support system of claim 6, wherein the controller is configured to display a second predetermined sequence of graphical animations on the display to graphically instruct the user to perform a second plurality of tasks after the user selects the first width on the user interface, wherein the controller is configured to instruct the user to perform the second plurality of tasks by displaying each of the graphical animations of the second predetermined sequence at least once before the controller seeks input from the user that each of the second plurality of tasks was completed.

8. The patient support system of claim 7, wherein the second predetermined sequence of graphical animations includes a fastener engagement animation to instruct the user to engage the one or more fastening elements to secure the auxiliary patient support section to the main patient support section and a deck collapsing animation to instruct the user to collapse deck sections of the litter to accommodate the expandable patient support at the first width.

9. The patient support system of claim 8 wherein the controller is configured to:
prompt the user for input, after displaying the fastener engagement animation, to confirm that the one or more fastening elements have been engaged to secure the auxiliary patient support section to the main patient support section;
initiate one or more additional loops of the fastener engagement animation while waiting for the input from the user to confirm that the one or more fastening elements have been engaged;
prompt the user for input, after displaying the deck collapsing animation, to confirm that the deck sections of the litter have been collapsed to accommodate the expandable patient support at the first width; and
initiate one or more additional loops of the deck collapsing animation while waiting for the input from the user to confirm that the deck sections have been collapsed.

10. The patient support system of claim 8, wherein the second predetermined sequence of graphical animations includes a patient offloading animation to instruct the user to move a patient off the main patient support surface and the auxiliary patient support surface, wherein the controller is configured to:
prompt the user for input, after displaying the patient offloading animation, to confirm that the patient is off the main patient support surface and the auxiliary patient support surface; and initiate one or more additional loops of the patient offloading animation while waiting for the input from the user to confirm that the patient is off the main patient support surface and the auxiliary patient support surface.

11. The patient support system of claim 8, wherein the controller is configured to:
display an auxiliary section collapsing animation on the display to graphically depict collapsing of the auxiliary patient support section;
prompt the user for input, after displaying the auxiliary section collapsing animation, to confirm that the auxiliary patient support section is fully collapsed; and
initiate one or more additional loops of the auxiliary section collapsing animation while waiting for the input from the user to confirm that the auxiliary patient support section is fully collapsed.

12. The patient support system of claim 10, wherein the second predetermined sequence of graphical animations includes a patient loading animation to graphically instruct the user to move the patient onto the main patient support surface after the controller operates the expander to reduce the overall width of the expandable patient support from the second width to the first width, wherein the controller is configured to:
prompt the user for input, after displaying the patient loading animation, to confirm that the patient is on the main patient support surface; and
initiate one or more additional loops of the patient loading animation while waiting for the input from the user to confirm that the patient is on the main patient support surface.

13. A method for reconfiguring a patient support system for use on a litter of a patient support apparatus, the patient support system including an expandable patient support having a main patient support section with a main patient support surface, and an auxiliary patient support section with an auxiliary patient support surface, and one or more fastening elements arranged to secure the auxiliary patient support section adjacent to the main patient support section when the auxiliary patient support section is collapsed, and a control assembly including an expander to expand the auxiliary patient support section, and a user interface having a display, the method comprising the steps of:
receiving a user selection to expand an overall width of the expandable patient support from a first width to a second width;
displaying a predetermined sequence of graphical animations on the display to graphically instruct a user to perform a plurality of tasks after the user selects the second width on the user interface; and
expanding the overall width of the expandable patient support from the first width to the second width after displaying the predetermined sequence of graphical animations,
wherein the user is instructed to perform the plurality of tasks by displaying each of the graphical animations of the predetermined sequence at least once before expanding the overall width of the expandable patient support to the second width, wherein the predetermined sequence of graphical animations includes a deck expansion animation to instruct the user to expand deck sections of the litter to accommodate the expandable patient support at the second width and a fastener release animation to instruct the user to release the one or more fastening elements to allow the auxiliary patient support section to expand away from the main patient support section.

* * * * *